United States Patent
Iguchi et al.

(10) Patent No.: US 11,284,136 B2
(45) Date of Patent: *Mar. 22, 2022

(54) TRANSMITTING METHOD, RECEIVING METHOD, TRANSMITTING DEVICE AND RECEIVING DEVICE

(71) Applicant: Panasonic Intellectual Property Corporation of America, Torrance, CA (US)

(72) Inventors: Noritaka Iguchi, Osaka (JP); Tadamasa Toma, Osaka (JP); Hisaya Katou, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/034,248

(22) Filed: Sep. 28, 2020

(65) Prior Publication Data
US 2021/0014546 A1  Jan. 14, 2021

Related U.S. Application Data

(63) Continuation of application No. 15/177,482, filed on Jun. 9, 2016, now Pat. No. 10,827,208, which is a
(Continued)

(30) Foreign Application Priority Data

Dec. 2, 2014 (JP) .................................. 2014-244503

(51) Int. Cl.
*H04N 21/236* (2011.01)
*H04N 21/434* (2011.01)
(Continued)

(52) U.S. Cl.
CPC ..... *H04N 21/23614* (2013.01); *G10L 19/167* (2013.01); *H04N 5/38* (2013.01);
(Continued)

(58) Field of Classification Search
CPC ....... H04N 21/23614; H04N 21/23605; H04N 21/4343; H04N 21/4348; H04N 21/85406; H04N 19/188
See application file for complete search history.

(56) References Cited

U.S. PATENT DOCUMENTS 7,039,116 B1   5/2006   Zhang
7,096,481 B1   8/2006   Forecast et al.
(Continued)

FOREIGN PATENT DOCUMENTS

JP   10-200854     7/1998
JP   2001-144775   5/2001
(Continued)

OTHER PUBLICATIONS

Office Action dated Oct. 31, 2017 in European Application No. 14872559.1.
(Continued)

*Primary Examiner* — Pinkal R Chokshi
(74) *Attorney, Agent, or Firm* — Wenderoth, Lind & Ponack, L.L.P.

(57) ABSTRACT

A transmitting method according to one aspect of the present disclosure includes: encoding a video signal and generating encoded data including a plurality of access units; storing the plurality of access units in a packet in a unit that defines one access unit as one unit or in a unit defined by dividing one access unit, and generating a packet group; transmitting the generated packet group as data; generating first information and second information, the first information indicating a presentation time of a first access unit that is
(Continued)

presented first among the plurality of access units, and the second information being used to calculate a decoding time of the plurality of access units; and transmitting the first information and the second information as control information.

4 Claims, 46 Drawing Sheets

Related U.S. Application Data continuation of application No. PCT/JP2014/006155, filed on Dec. 10, 2014.

(60) Provisional application No. 61/982,938, filed on Apr. 23, 2014, provisional application No. 61/979,558, filed on Apr. 15, 2014, provisional application No. 61/969,857, filed on Mar. 25, 2014, provisional application No. 61/954,871, filed on Mar. 18, 2014, provisional application No. 61/916,400, filed on Dec. 16, 2013.

(51) Int. Cl.
| | |
|---|---|
| *H04N 19/169* | (2014.01) |
| *H04N 21/854* | (2011.01) |
| *G10L 19/16* | (2013.01) |
| *H04N 19/436* | (2014.01) |
| *H04N 19/70* | (2014.01) |
| *H04N 5/38* | (2006.01) |
| *H04N 5/44* | (2011.01) |

(52) U.S. Cl.
CPC .............. *H04N 5/44* (2013.01); *H04N 19/188* (2014.11); *H04N 19/436* (2014.11); *H04N 19/70* (2014.11); *H04N 21/23605* (2013.01); *H04N 21/4343* (2013.01); *H04N 21/4348* (2013.01); *H04N 21/85406* (2013.01)

(56) References Cited

U.S. PATENT DOCUMENTS

| 9,813,705 | B2 | 11/2017 | Wang | |
|---|---|---|---|---|
| 10,070,125 | B2* | 9/2018 | Hannuksela | ........... H04N 19/30 |
| 2004/0170162 | A1 | 9/2004 | Hung | |
| 2005/0254526 | A1 | 11/2005 | Wang et al. | |
| 2006/0072627 | A1 | 4/2006 | Kugumiya | |
| 2007/0086481 | A1 | 4/2007 | Klemets | |
| 2009/0164652 | A1 | 6/2009 | Slobotskoy | |
| 2010/0189131 | A1 | 7/2010 | Branam | |
| 2011/0096775 | A1 | 4/2011 | Lee | |
| 2011/0116722 | A1 | 5/2011 | Seki | |
| 2011/0188652 | A1 | 8/2011 | Yamaguchi et al. | |
| 2012/0128331 | A1 | 5/2012 | Tsuruga | |
| 2012/0219069 | A1 | 8/2012 | Lim et al. | |
| 2012/0240174 | A1 | 9/2012 | Rhyu | |
| 2012/0293618 | A1 | 11/2012 | Tsukagoshi | |
| 2013/0100248 | A1 | 4/2013 | Kadono | |
| 2013/0195205 | A1 | 8/2013 | Wang | |
| 2014/0317664 | A1 | 10/2014 | Park | |
| 2015/0003525 | A1 | 1/2015 | Sasai et al. | |
| 2015/0078456 | A1 | 3/2015 | Hannuksela | |
| 2015/0208095 | A1 | 7/2015 | Schierl | |
| 2015/0288975 | A1 | 10/2015 | Choi | |
| 2015/0373380 | A1 | 12/2015 | Tsukagoshi | |
| 2016/0057494 | A1 | 2/2016 | Hwang | |
| 2016/0227233 | A1 | 8/2016 | Cho | |
| 2016/0249056 | A1 | 8/2016 | Tsukuba | |
| 2016/0294520 | A1 | 10/2016 | Tsukagoshi | |
| 2016/0301954 | A1 | 10/2016 | Oh | |
| 2017/0180766 | A1 | 6/2017 | Iguchi | |

FOREIGN PATENT DOCUMENTS

| JP | 2014-200054 | 10/2014 |
|---|---|---|
| WO | 2010/044146 | 4/2010 |
| WO | 2012/153450 | 11/2012 |
| WO | 2013/140722 | 9/2013 |
| WO | 2014/142203 | 9/2014 |

OTHER PUBLICATIONS

Minutes of the oral proceedings dated Sep. 23, 2019 for the corresponding European patent Application No. 14872559.1.
ISO/IEC FDIS 23008-1 "Information technology—High efficiency coding and media delivery in heterogeneous environments—Part 1:MPEG media transport (MMT)" dated Apr. 26, 2013.
Shuichi AOKI, "Media Transport Technologies for Next Generation Broadcasting Systems", NHK Science and Technical Research Laboratories R&D Report, Jul. 15, 2013, No. 140, pp. 22 to 31 with English Abstract.
"Cho Koseisaido Television Hoso System Nikansuru Chukan Hokoku(Tajuka Hoshiki)", Association of Radio Industries and Businesses Digital Hoso System Kaihatsu Bukai, Broadcasting System, Ministry of Internal Affairs and Communications, Japan, Dec. 1, 2013, pp. 1 to 60 (especially pp. 7 to 34, 48) Retrieved from the Internet <URL :http:/ /warp.ndl.go.jp/info :ndljp/pid/8380046/ www.soumu.go.jp/main _ content/000262096. pdf> with Partial English translation.
Extended European Search Report dated Oct. 21, 2016 in European Application No. 14872559.1.
International Search Report of PCT application No. PCT/JP2014/ 006155 dated Mar. 17, 2015.
"Information technology—High efficiency coding and media delivery in heterogeneous environments—Part1: MPEG media transport(MMT)", ISO-IEC FDIS 23008-1, 2013.

* cited by examiner

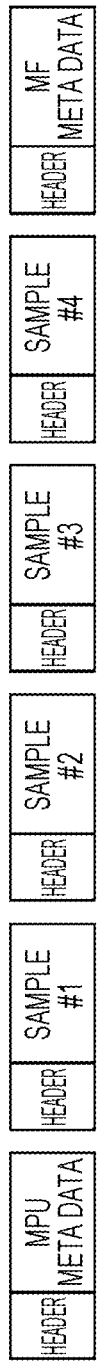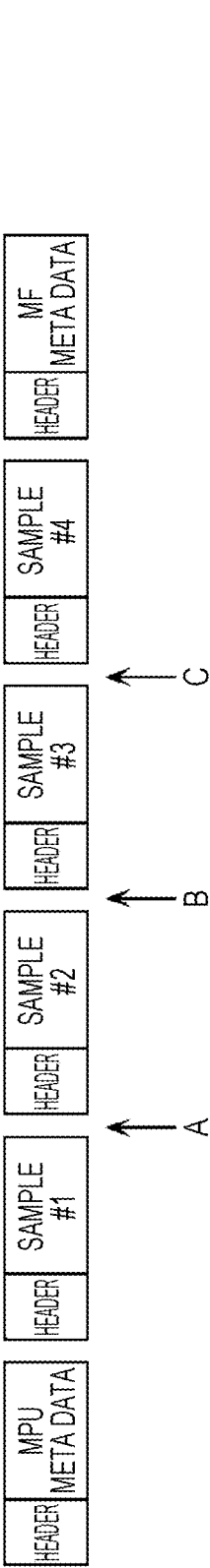
FIG. 29A
FIG. 29B
FIG. 29C

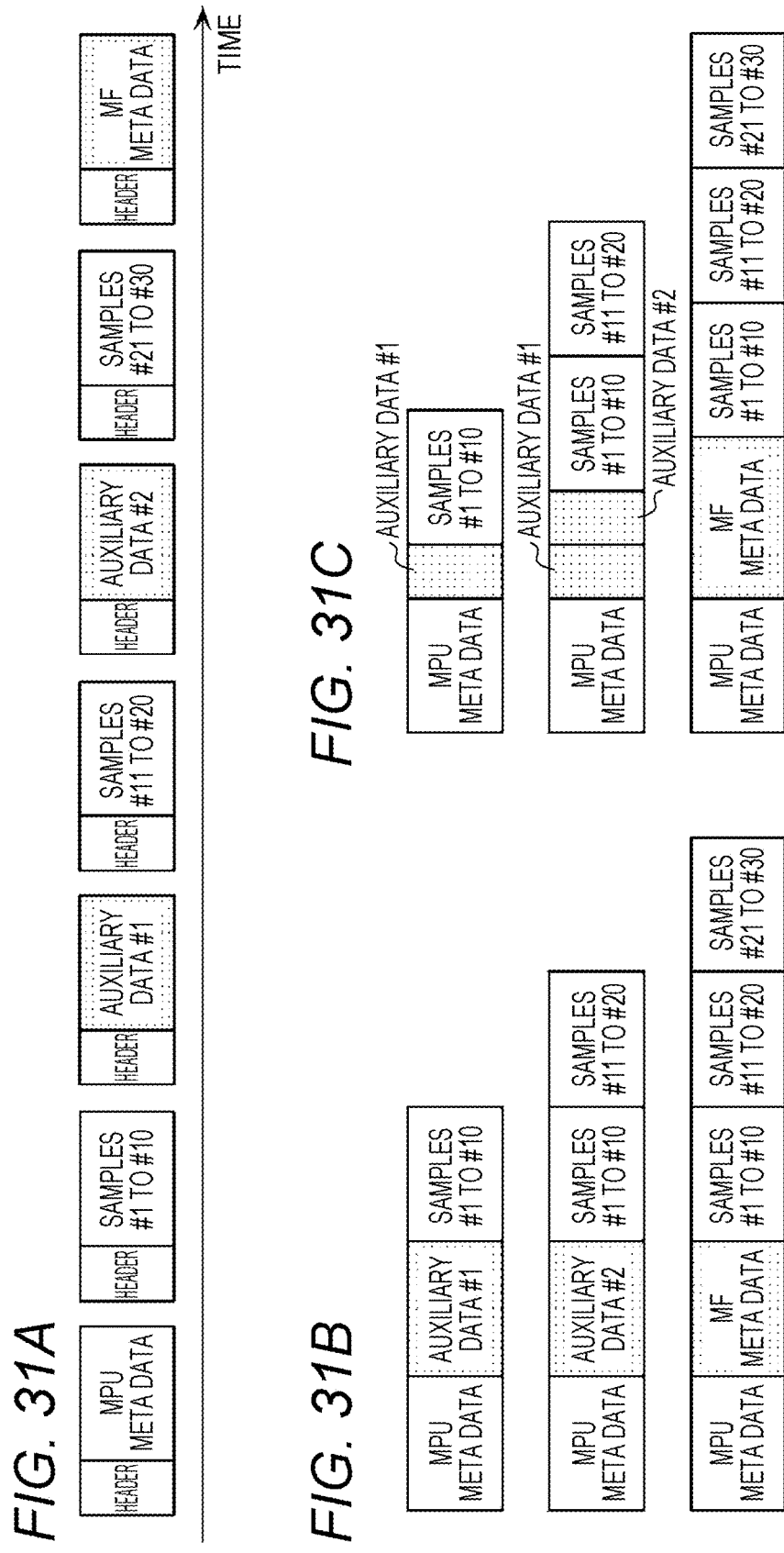

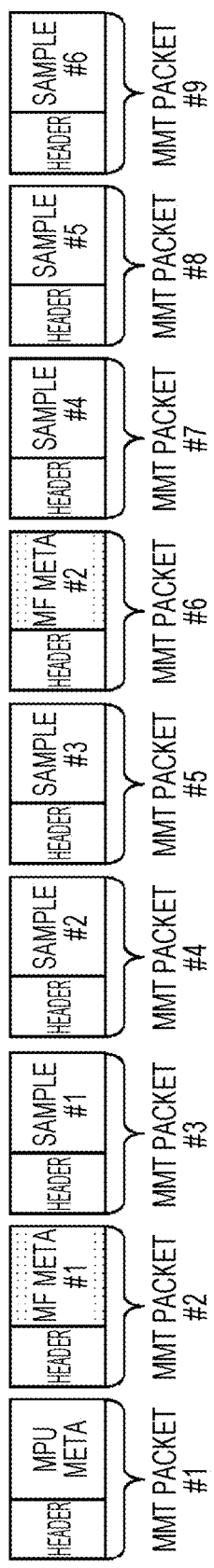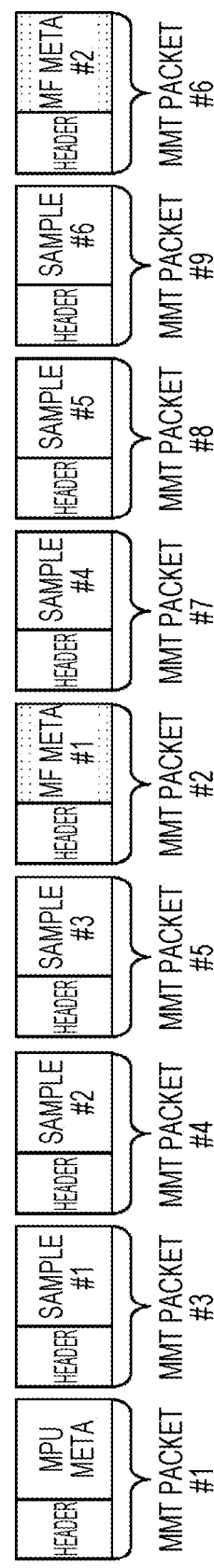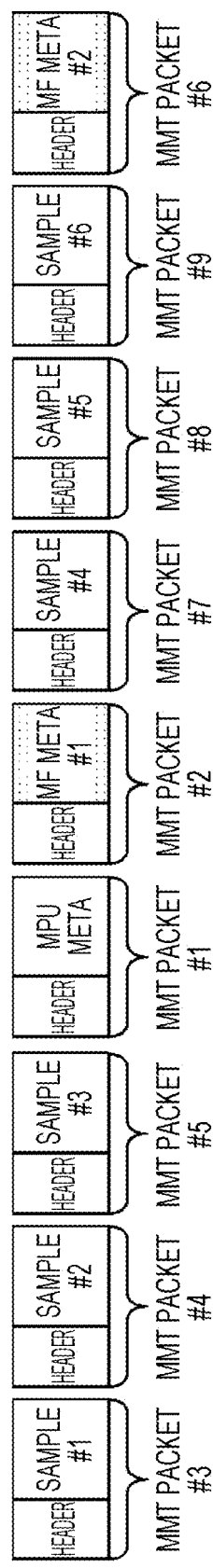

FIG. 36A

| MPU METF | MF META #1 | SAMPLE #1 | SAMPLE #2 | SAMPLE #3 |

FIG. 36B

| MPU META | MF META #2 | SAMPLE #4 | SAMPLE #5 | SAMPLE #6 |

FIG. 36C

| MPU META | MF META #1 | SAMPLE #1 | SAMPLE #2 | SAMPLE #3 | MF META #2 | SAMPLE #4 | SAMPLE #5 | SAMPLE #6 |

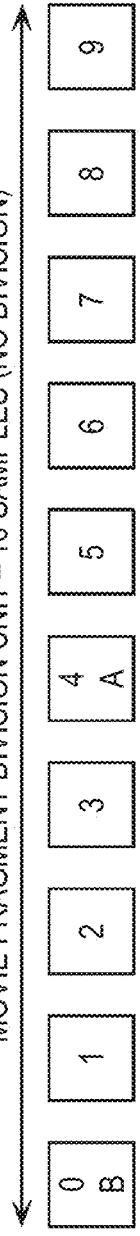
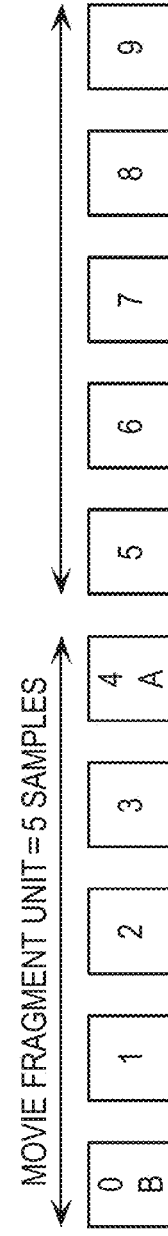
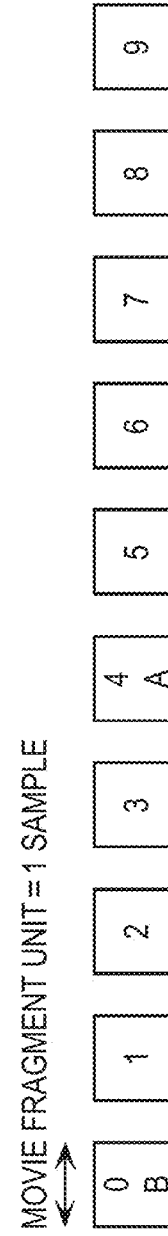
FIG. 46A
FIG. 46B
FIG. 46C

TRANSMITTING METHOD, RECEIVING METHOD, TRANSMITTING DEVICE AND RECEIVING DEVICE

BACKGROUND

1. Technical Field

The present invention relates to a transmitting method, a receiving method, a transmitting device and a receiving device.

2. Description of the Related Art

As broadcasting and communication services are sophisticated, introduction of super-high definition moving image content such as 8K (7680×4320 pixels: also referred to as 8K4K) and 4K (3840×2160 pixels: also referred to as 4K2K) has been studied. A receiving device needs to decode and display encoded data of the received ultra-high definition moving image in real time. A processing load of a moving image of a resolution such as 8K in particular is great during decoding, and it is difficult to decode such a moving image in real time by using one decoder. Hence, a method for reducing a processing load of one decoder by parallelizing decoding processing by using a plurality of decoders, and achieving processing in real time has been studied.

Further, encoded data is multiplexed based on a multiplexing method such as MPEG-2 TS (Transport Stream) or MMT (MPEG Media Transport), and is transmitted For example, Non-Patent Literature 1 discloses a technique of transmitting encoded media data per packet according to MMT.

CITATION LIST

Non-Patent Literature

NPL 1: Information technology—High efficiency coding and media delivery in heterogeneous environment—Part1: MPEG media transport (MMT), ISO/IEC DIS 23008-1

SUMMARY

In one general aspect, the techniques disclosed here feature a transmitting method according to one general aspect of the present disclosure includes: encoding a video signal and generating encoded data including a plurality of access units; storing the plurality of access units in a packet in a unit that defines one access unit as one unit or in a unit defined by dividing one access unit, and generating a packet group; generating first information and second information, while the first information indicates a presentation time of a first access unit that is presented first among the plurality of access units, and the second information is used to calculate a decoding time of the plurality of access units; and transmitting the first information and second information as control information.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 29A is a view illustrating an example of an MMT packet transmission order in case where auxiliary data is transmitted;

FIG. 29B is a view illustrating an example of an MMT packet transmission order in case where auxiliary data is transmitted;

FIG. 29C is a view illustrating an example of an MMT packet transmission order in case where auxiliary data is transmitted;

FIG. 31A is a view for explaining reception of auxiliary data;

FIG. 31B is a view for explaining reception of auxiliary data;

FIG. 31C is a view for explaining reception of auxiliary data;

FIG. 34A is a view for explaining an MMT packet transmission order in a case where the MPU configured as in FIG. 33 is transmitted;

FIG. 34B is a view for explaining an MMT packet transmission order in a case where the MPU configured as in FIG. 33 is transmitted;

FIG. 34C is a view for explaining an MMT packet transmission order in a case where the MPU configured as in FIG. 33 is transmitted;

FIG. 36A is a second view for explaining an operation example of the receiving device in a case where one MPU is configured by a plurality of movie fragments;

FIG. 36B is a second view for explaining an operation example of the receiving device in a case where one MPU is configured by a plurality of movie fragments;

FIG. 36C is a second view for explaining an operation example of the receiving device in a case where one MPU is configured by a plurality of movie fragments;

FIG. 46A is a view for explaining a method for calculating a PTS and a DTS and a task;

FIG. 46B is a view for explaining a method for calculating a PTS and a DTS and a task;

FIG. 46C is a view for explaining a method for calculating a PTS and a DTS and a task;

DETAILED DESCRIPTION

Figure 1:
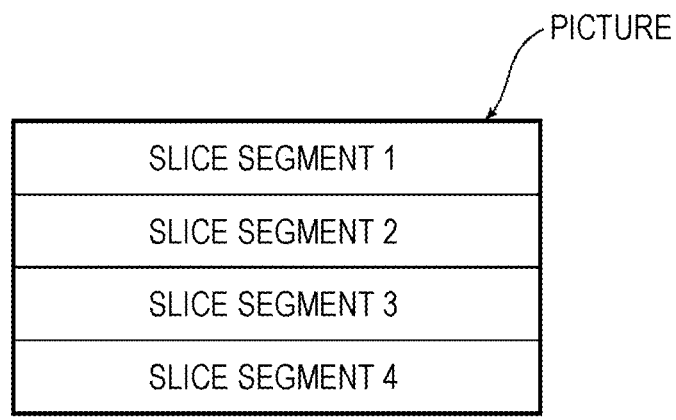
FIG. 1 is a view illustrating an example where a picture is divided into slice segments.

A transmitting method according to one general aspect of the present disclosure includes: a packetizing step of packetizing (1) sample data, (2) first meta data and (3) second meta data that configure a file of an MP4 format, while the sample data is data obtained by encoding a video signal or an audio signal, the first meta data is used to decode the sample data, and the second meta data includes data that can be generated after generation of the sample data and is used to decode the sample data; and a transmitting step of transmitting the packetized first meta data, the packetized sample data and the packetized second meta data in order.

Consequently, it is possible to reduce an End-to-End delay during transmission of MP4 format files.

Further, the data that can be generated after the generation of the sample data may be at least part of data other than the sample data among items of data to be stored in mdat in the MP4 format.

Furthermore, the first meta data may be MPU (Media Processing Unit) meta data, and the second meta data may be movie fragment meta data.

Still further, in the packetizing step, the packetization may be performed according to an MMT (MPEG Media Transport) method.

Moreover, a receiving method according to one general aspect of the present disclosure includes: a receiving step of receiving packetized first meta data, packetized sample data and packetized second meta data in order; a reconfiguring step of reconfiguring a file of an MP4 format including the received first meta data, the received second meta data and the received sample data; and a decoding step of decoding the sample data included in the reconfigured file of the MP4 format by using the first meta data and the second meta data, and the second meta data includes data that can be generated after generation of the sample data at a transmission side.

A transmitting device according to one general aspect of the present disclosure includes: a multiplexer that packetizes (1) sample data, (2) first meta data and (3) second meta data that configure a file of an MP4 format, while the sample data is data obtained by encoding a video signal or an audio signal, the first meta data is used to decode the sample data, and the second meta data includes data that can be generated after generation of the sample data and is used to decode the sample data; and a transmitter that transmits the packetized first meta data, the packetized sample data and the packetized second meta data in order.

A receiving device according to one general aspect of the present disclosure includes: a receiver that receives packetized first meta data, packetized sample data and packetized second meta data in order; a reconfiguring unit that reconfigures a file of an MP4 format including the received first meta data, the received second meta data and the received sample data; and a decoder that decodes the sample data included in the reconfigured file of the MP4 format by using the first meta data and the second meta data, and the second meta data includes data that can be generated after generation of the sample data at a transmission side.

A transmitting method according to one general aspect of the present disclosure includes: encoding a video signal and generating encoded data including a plurality of access units; storing the plurality of access units in a packet in a unit that defines one access unit as one unit or in a unit defined by dividing one access unit, and generating a packet group; generating first information and second information, while the first information indicates a presentation time of a first access unit that is presented first among the plurality of access units, and the second information is used to calculate a decoding time of the plurality of access units; and transmitting the first information and the second information as control information.

A receiving method according to one general aspect of the present disclosure includes: receiving a packet group, while the packet group is obtained by packetizing encoded data including a plurality of access units in a unit that defines one access unit as one unit or in a unit defined by dividing one access unit; receiving control information including first information and second information, while the first information indicates a presentation time of a first access unit that is presented first among the plurality of access units, and the second information is used to calculate a decoding time of the plurality of access units; and decoding the access units included in the received packet group based on the first information and the second information.

A transmitting device according to one general aspect of the present disclosure includes: encoding circuitry which, in operation, encodes a video signal and generates encoded data including a plurality of access units; packet generating circuitry which, in operation, stores the plurality of access units in a packet in a unit that defines one access unit as one unit or in a unit defined by dividing one access unit, and generates a packet group; first transmitting circuitry which, in operation, transmits the generated packet group as data; information generating circuitry which, in operation, generates first information and second information, while the first information indicates a presentation time of a first access unit that is presented first among the plurality of access units, and the second information is used to calculate a decoding time of the plurality of access units; and second transmitting circuitry which, in operation, transmits the first information and the second information as control information.

A receiving device according to one general aspect of the present disclosure includes: first receiving circuitry which, in operation, receives a packet group, while the packet group is obtained by packetizing encoded data including a plurality of access units in a unit that defines one access unit as one unit or in a unit defined by dividing one access unit; second receiving circuitry which, in operation, receives control information including first information and second information, while the first information indicates a presentation time of a first access unit that is presented first among the plurality of access units, and the second information is used to calculate a decoding time of the plurality of access units; and decoding circuitry which, in operation, decodes the access units included in the received packet group based on the first information and the second information.

In addition, these comprehensive or specific aspects may be realized by a system, a method, an integrated circuit, a computer program or a computer-readable recording medium such as a CD-ROM, and may be realized by an arbitrary combination of the system, the method, the integrated circuit, the computer program and the recording medium.

Exemplary embodiments will be specifically described below with reference to the drawings.

In addition, the exemplary embodiments described below are each a comprehensive or specific example. Numerical values, shapes, materials, components, placement positions and connection modes of the components, steps and a step order described in the following exemplary embodiments are exemplary, and by no means limit the present disclosure. Further, components which are not recited in the independent claims representing the uppermost generic concepts among components in the following exemplary embodiments will be described as arbitrary components.

(Underlying Knowledge Forming Basis of the Present Disclosure)

In recent years, more displays of TVs, smart phones and table terminals have higher resolutions. Broadcast in Japan in particular schedules a service for 8K4K (a resolution is 8K×4K) in 2020. A single decode has difficulty in decoding a moving image of a ultra-high resolution such as 8K4K in real time.

Therefore, a method of performing decoding processing in parallel by using a plurality of decoders has been studied.

Encoded data is multiplexed based on a multiplexing method such as MPEG-2 TS or MMT and transmitted.

Therefore, a receiving device needs to demultiplex encoded data of a moving image from multiplexed data. Processing of demultiplexing encoded data from multiplexed data will be referred to as demultiplexing.

It is necessary to sort decoding target encoded data to each decoder to parallelize decoding processing. It is necessary to analyze the encoded data to sort the encoded data, a bit rate of content such as 8K in particular is very high, and therefore a processing load related to the analysis is great. Therefore, demultiplexing processing is a bottleneck and it is not possible to perform playback in real time, and therefore a countermeasure needs to be taken.

By the way, according to moving image encoding methods such as H.264 and H.265 standardized by MPEG and ITU (International Telecommunication Union), a transmitting device can divide a picture into a plurality of areas called slices or slice segments, and encode the areas such that the divided areas can be independently decoded. Hence, in the case of H.265, for example, a receiving device which receives a broadcast can parallelize decoding processing by demultiplexing data of each slice segment from received data, and outputting data of each slice segment to different decoders.

FIG. 1 is a view illustrating an example where one picture is divided into four slice segments according to HEVC (High Efficiency Video Coding). For example, a receiving device includes four decoders, and each decoder decodes one of four slice segments.

According to a conventional broadcast, a transmitting device stores one picture (an access unit according to MPEG system standards) in one PES packet, and multiplexes a PES packet on a TS packet train. Hence, the receiving device needs to demultiplex each slice segment by demultiplexing a payload of the PES packet and analyzing data of the access unit stored in the payload, and output data of each demultiplexed slice segment to each decoder.

However, the inventors of the present invention found that a processing amount for analyzing the data of the access unit and demultiplexing slice segments is great, and therefore it is difficult to perform this processing in real time and it is necessary to take a countermeasure.

Figure 2:
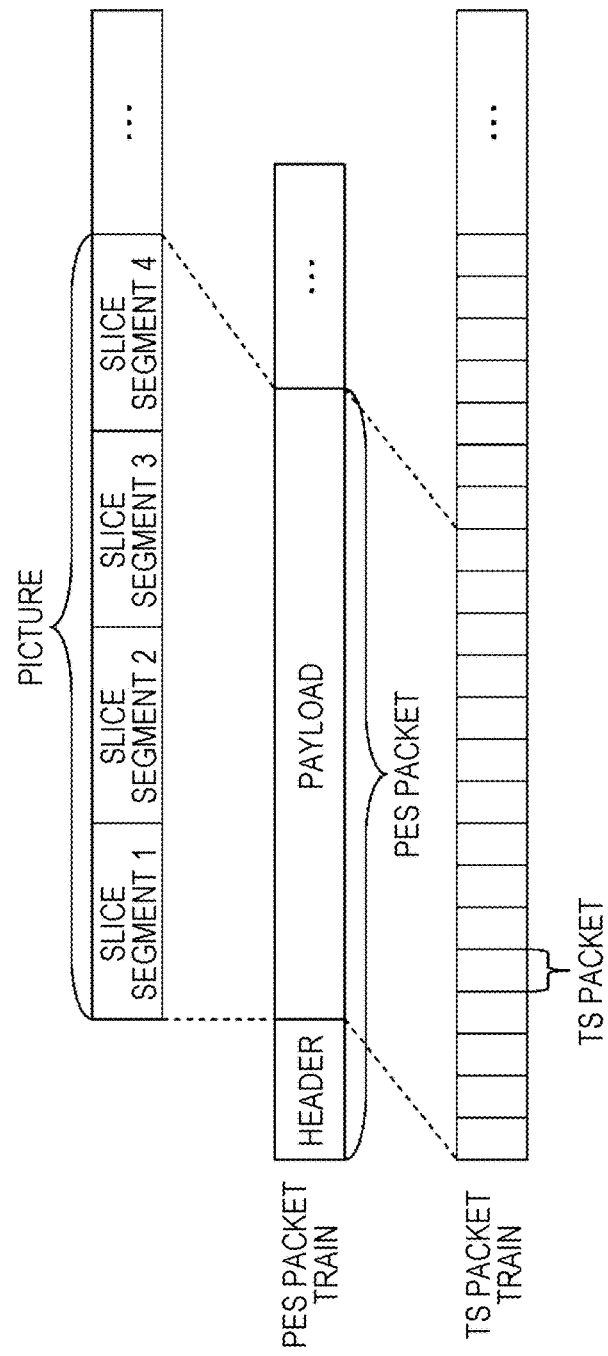
FIG. 2 is a view illustrating an example of a PES (Packetized Elementary Stream) packet train in which picture data is stored.

FIG. 2 is a view illustrating an example where data of a picture divided into slice segments is stored in a payload of a PES packet.

As illustrated in FIG. 2, for example, items of data of a plurality of slice segments (slice segments 1 to 4) are stored in a payload of one PES packet. Further, the PES packet is multiplexed on a TS packet train.

First Exemplary Embodiment

A case where H.265 is used as a moving image encoding method will be described below as an example.
However, the present exemplary embodiment is applicable to a case where another encoding method such as H.264 is used, too.

Figure 3:
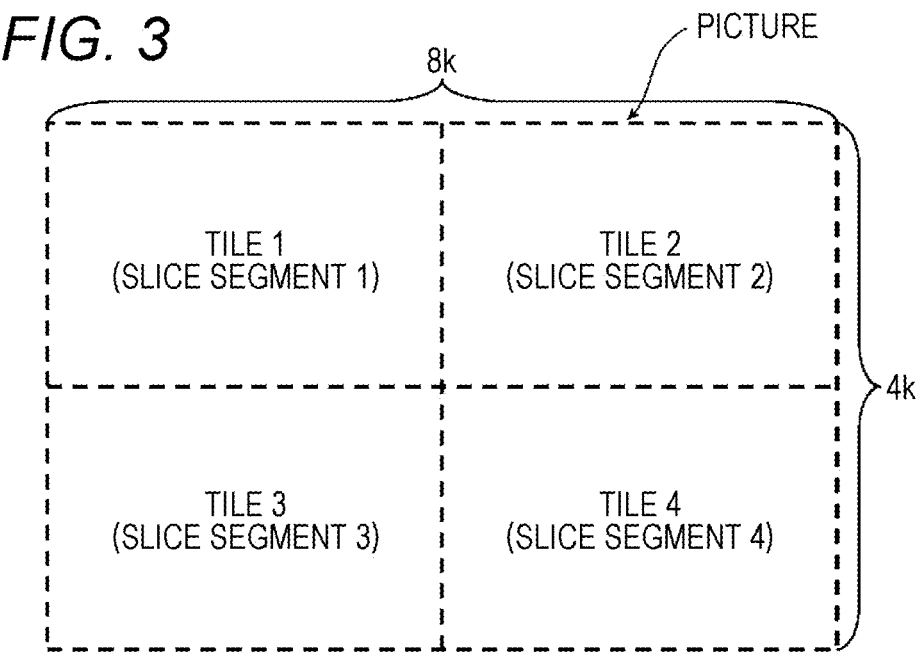
FIG. 3 is a view illustrating a picture division example according to a first exemplary embodiment.

FIG. 3 is a view illustrating an example where an access unit (picture) according to the present embodiment is divided in division units. The access unit is equally divided into two in horizontal and vertical directions by a function called a tile introduced by H.265, and is divided into four tiles in total. Further, each slice segment and each tile are associated on a one-to-one basis.

A reason for equally dividing an access unit into two in the horizontal and vertical directions will be described. First, during general decoding, a line memory which stores data of one horizontal line is necessary. However, in the case of an ultra-high resolution such as 8K4K, a horizontal direction size increases, and therefore a line memory size increases. It is desirable to reduce the line memory size for implementation on the receiving device. It is necessary to divide an access unit in the vertical direction to reduce a line memory size. A data structure which is a tile is necessary to perform division in the vertical direction. For these reasons, tiles are used.

Meanwhile, general images have a high correlation in the horizontal direction, and therefore when a reference can be made in a wide range in the horizontal direction, encoding efficiency improves. Therefore, it is desirable to divide an access unit in the horizontal direction from a viewpoint of encoding efficiency.

By equally dividing an access unit into two in the horizontal and vertical directions, it is possible to realize both of these two characteristics, and take into account both of mounting and encoding efficiency. When a single decoder can decode a 4K2K moving image in real time, the receiving device can decode 8K4K images in real time by equally dividing an 8K4K image into four, and dividing each slice segment to realize 4K2K.

Next, a reason for associating each tile obtained by dividing an access unit in the horizontal and vertical directions, and each slice segment on a one-to-one basis will be described. According to H.265, an access unit is configured by units called a plurality of NAL (Network Adaptation Layer) units.

In a payload of each NAL unit, one of an access unit delimiter indicating a start position of the access unit, an SPS (Sequence Parameter Set) which is initialization information which is commonly used in sequence units during decoding, a PPS (Picture Parameter Set) which is initialization information which is commonly used in a picture during decoding, SEI (Supplemental Enhancement Information) which is unnecessary for decoding processing yet is necessary to process and display a decoding result, and encoded data of each slice segment is stored. A header of each NAL unit includes type information for identifying data to be stored in a payload.

In this regard, the transmitting device can set a basic unit to an NAL unit when encoded data is multiplexed in a multiplexing format such as MPEG-2 TS, MMT (MPEG Media Transport), MPEG DASH (Dynamic Adaptive Streaming over HTTP) or RTP (Real-time Transport Protocol). In order to store one slice segment in one NAL unit, it is desirable to divide an access unit in slice segment units when the access unit is divided into areas. For this reason, the transmitting device associates each tile and each slice segment on one-to-one basis.

Figure 4:
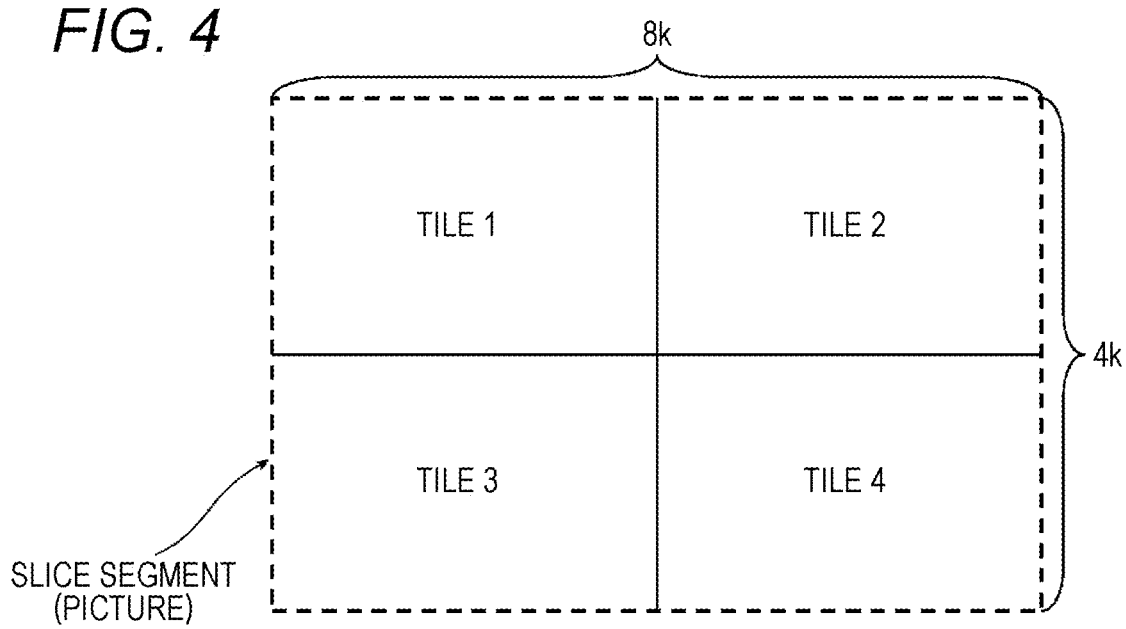
FIG. 4 is a view illustrating a picture division example according to a comparative example of the first exemplary embodiment.

In addition, as illustrated in FIG. 4, the transmitting device can also collectively set tile 1 to tile 4 to one slice segment. However, in this case, all tiles are stored in one NAL unit, and the receiving device has difficulty in demultiplexing the tiles in a multiplexing layer.

In addition, slice segments include independent slice segments which can be independently decoded, and reference slice segments which refer to the independent slice segments.
Hereinafter, a case where the independent slice segments are used will be described.

Figure 5:
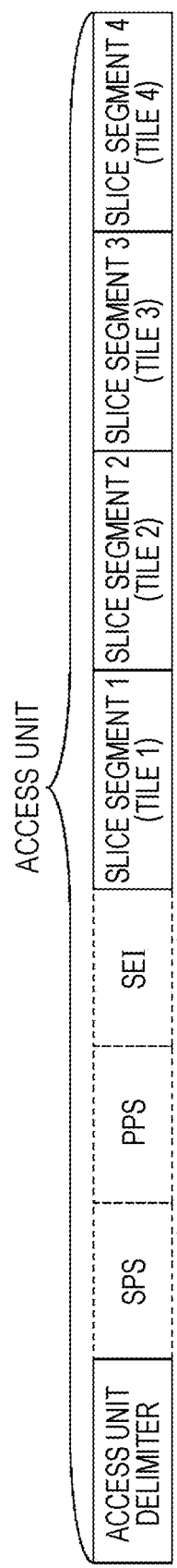
FIG. 5 is a view illustrating an example of data of an access unit according to the first exemplary embodiment.

FIG. 5 is a view illustrating an example of data of an access unit divided such that boundaries of tiles and slice segments match as shown in FIG. 3. The data of the access unit includes an NAL unit in which an access unit delimiter disposed at a head is stored, NAL units of an SPS, a PPS and SEI which are subsequently disposed, and data of slice segments in which items of data of subsequently disposed tile 1 to tile 4 are stored. In addition, data of the access unit may not include part or all of NAL units of an SPS, a PPS and SEI.

Figure 6:
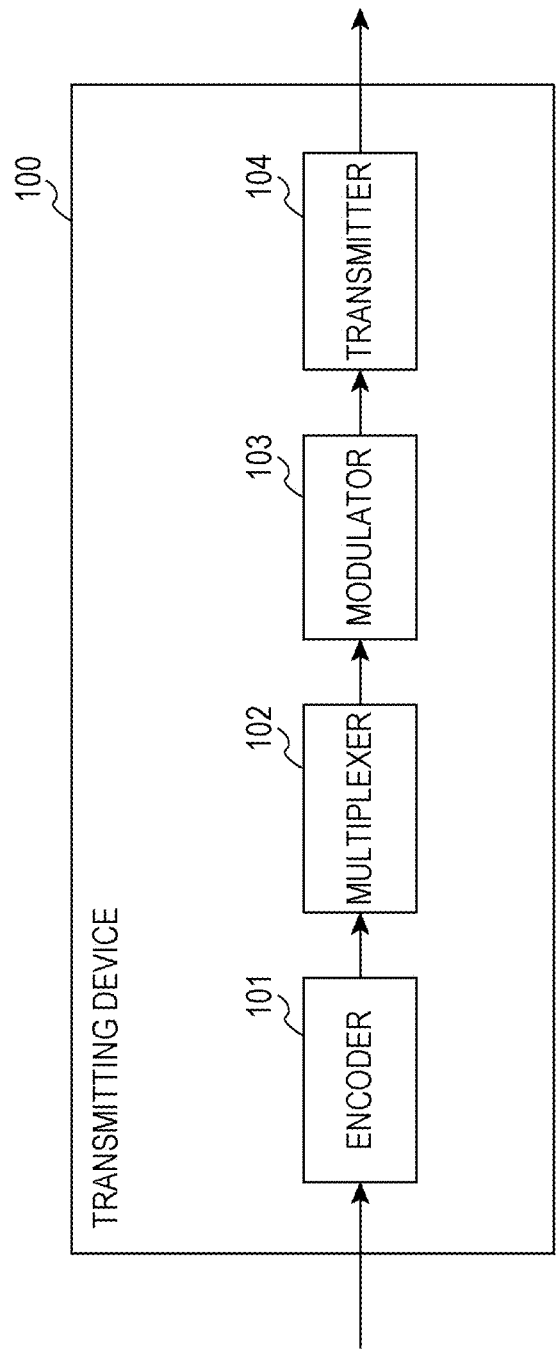
FIG. 6 is a block diagram of a transmitting device according to the first exemplary embodiment.

Next, a configuration of transmitting device 100 according to the present exemplary embodiment will be described. FIG. 6 is a block diagram illustrating a configuration example of transmitting device 100 according to the present exemplary embodiment. This transmitting device 100 includes encoder 101, multiplexer 102, modulator 103 and transmitter 104.

Encoder 101 generates encoded data by encoding an input image according to H.265, for example. Further, as illustrated in, for example, FIG. 3, encoder 101 divides an access unit into four slice segments (tiles), and encodes each slice segment.

Multiplexer 102 multiplexes the encoded data generated by encoder 101. Modulator 103 modulates the data obtained by the multiplexing. Transmitter 104 transmits the modulated data as a broadcast signal.

Figure 7:
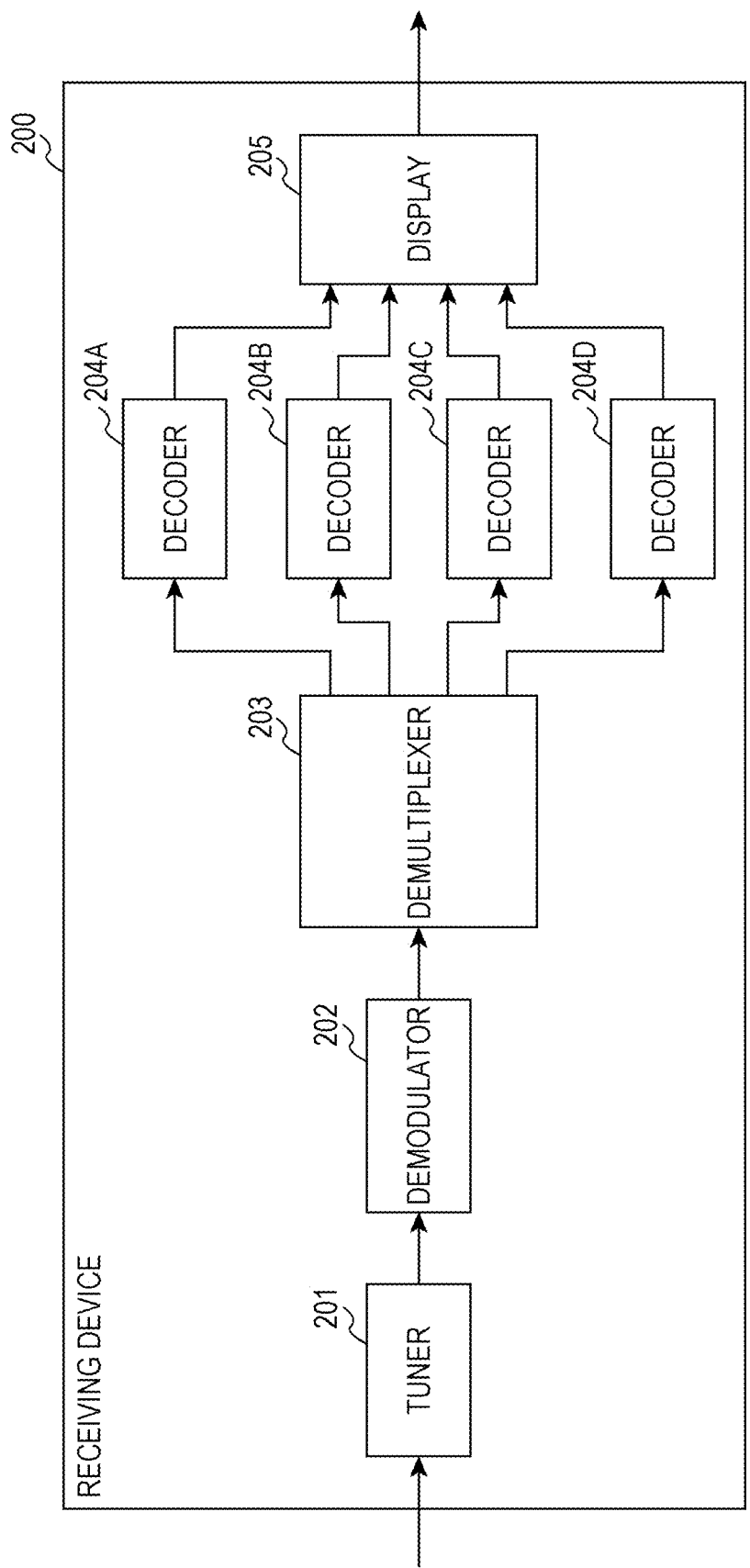
FIG. 7 is a block diagram of a receiving device according to the first exemplary embodiment.

Next, a configuration of receiving device 200 according to the present embodiment will be described. FIG. 7 is a block diagram illustrating a configuration example of receiving device 200 according to the present exemplary embodiment. This receiving device 200 includes tuner 201, demodulator 202, demultiplexer 203, a plurality of decoders 204A and 204D and display 205.

Tuner 201 receives a broadcast signal. Demodulator 202 demodulates the received broadcast signal. The demodulated data is input to demultiplexer 203.

Demultiplexer 203 demultiplexes the demodulated data in division units, and outputs the data of each division unit to decoders 204A to 204D. In this regard, the division units refer to division areas obtained by dividing an access unit, and are, for example, slice segments according to H.265. Further, an 8K4K image is divided into four 4K2K images. Therefore, there are four decoders 204A to 204D.

A plurality of decoders 204A to 204D operates in synchronization with each other based on a predetermined reference clock. Each decoder decodes encoded data in each division unit according to a DTS (Decoding Time Stamp) of the access unit, and outputs a decoding result to display 205.

Display 205 generates an 8K4K output image by integrating a plurality of decoding results output from a plurality of decoders 204A to 204D. Display 205 displays the generated output image according to a PTS (Presentation Time Stamp) of an additionally obtained access unit. In addition, display 205 may perform filtering processing such as deblock filtering to make a tile boundary indistinctive in a boundary area of neighboring division units when integrating decoding results.

In addition, an example of transmitting device 100 and receiving device 200 which transmit and receive broadcast content has been described above.

However, content may be transmitted and received via a communication network. When receiving device 200 receives content via the communication network, receiving device 200 demultiplexes multiplexed data from IP packets received from a network such as the Ethernet.

A broadcast has a fixed channel delay caused until a broadcast signal arrives at receiving device 200 after being transmitted. Meanwhile, due to an influence of congestion in a communication network such as the Internet, a channel delay caused until data transmitted from a server arrives at receiving device 200 is not fixed. Hence, receiving device 200 does not usually perform strict synchronization and playback based on a reference clock such as a PCR (Program Clock Reference) according to MPEG-2 TS for a broadcast. Hence, receiving device 200 may cause the display to display an 8K4K output image according to the PTS without strictly synchronizing each decoder.

Further, due to communication network congestion, decoding processing for all division units is not finished at a time indicated by a PTS of an access unit in some cases. In this case, receiving device 200 skips displaying the access unit or finishes decoding at least four division units, and delays the display of the access unit until generation of the 8K4K image is finished.

In addition, content may be transmitted and received by using broadcasting and communication in combination. Further, this method is applicable to play back multiplexed data stored in a recording medium such as a hard disk or a memory.

Next, a method for multiplexing access units divided into slice segments when MMT is used for a multiplexing method will be described.

Figure 8:
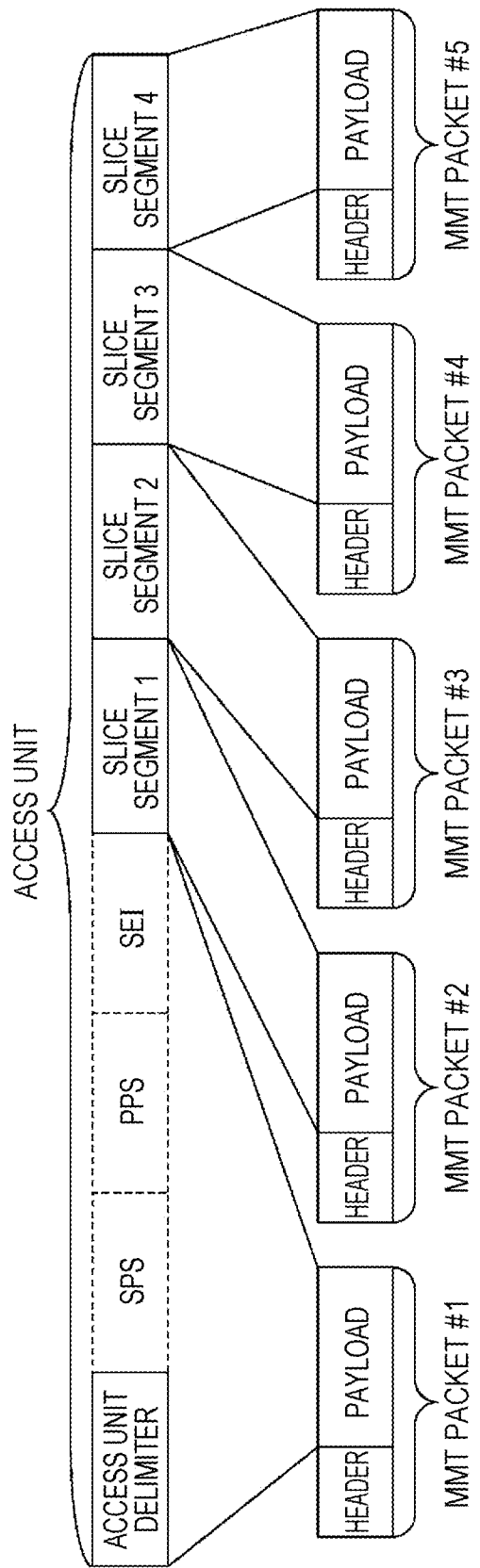
FIG. 8 is a view illustrating an example of an MMT packet according to the first exemplary embodiment.

FIG. 8 is a view illustrating an example where data of an access unit according to HEVC is packetized as an MMT packet. An SPS, a PPS and SEI do not necessarily need to be included in an access unit, yet a case where an SPS, a PPS and SEI are in an access unit will be described.

NAL units such as an access unit delimiter, an SPS, a PPS and SEI disposed before a head slice segment in the access unit are collectively stored in MMT packet #1. Subsequent slice segments are stored in different MMT packets per slice segment.

Figure 9:
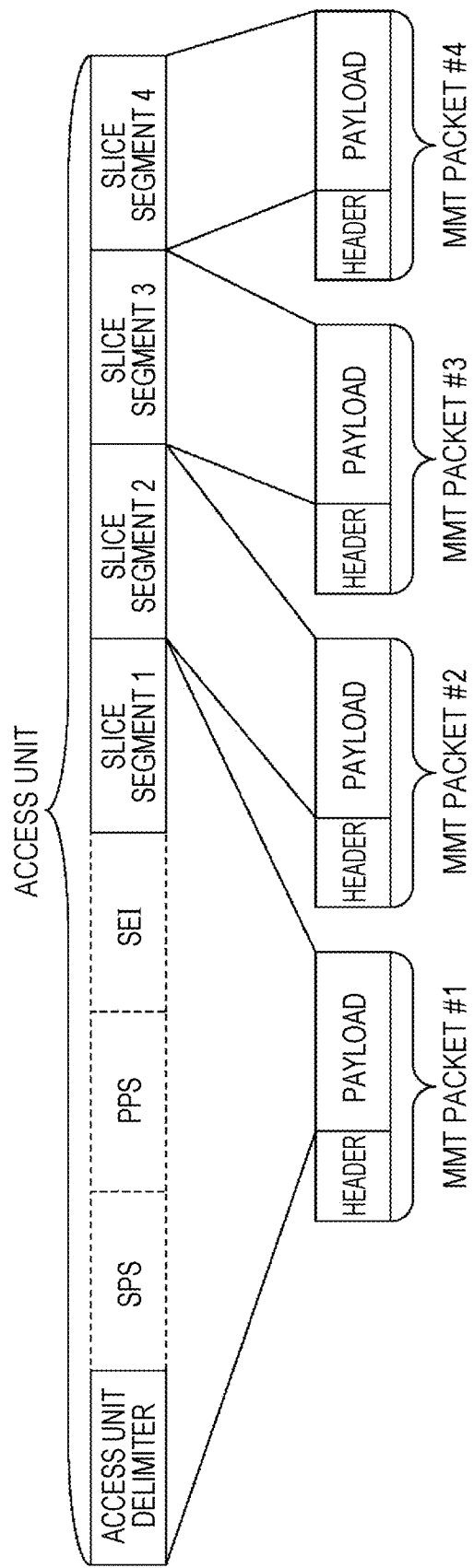
FIG. 9 is a view illustrating another example of the MMT packet according to the first exemplary embodiment.

In addition, as illustrated in FIG. 9, NAL units disposed before a head slice segment in an access unit may be stored in the same MMT packet as that of the head slice segment.

Further, when an NAL unit such as End-of-Sequence or End-of-Bit stream indicating an end of a sequence or a stream is added at a tail of a last slice segment, this NAL unit is stored in the same MMT packet as that of the last slice segment. In this regard, the NAL unit such as End-of-Sequence or End-of-Bit stream is inserted in a decoding process end point or a connection point of two streams. Therefore, desirably, receiving device 200 can easily obtain these NAL units in a multiplexing layer. In this case, these NAL units may be stored in an MMT packet different from slice segments. Consequently, receiving device 200 can easily demultiplex these NAL units in the multiplexing layer.

In addition, TS (Transport Stream), DASH (Dynamic Adaptive Streaming over HTTP) or RTP may be used for a multiplexing method. According to these methods, too, transmitting device 100 stores different slice segments in different packets. Consequently, it is possible to guarantee that receiving device 200 can demultiplex slice segments in a multiplexing layer.

When, for example, TS is used, encoded data is packetized as a PES packet in slice segment units. When RTP is used, encoded data is packetized as an RTP packet in slice segment units. In these cases, similar to MMT packet #1 illustrated in FIG. 8, NAL units disposed before slice segments, and slice segments may be separately packetized.

When TS is used, transmitting device 100 indicates units of data to be stored in a PES packet by using a data alignment descriptor. Further, DASH is a method for downloading data units in an MP4 format called a segment by HTTP, and therefore transmitting device 100 does not packetize encoded data when performing transmission. Hence, transmitting device 100 may create a subsample in slice segment units and store information indicating a subsample storage position in an MP4 header to enable receiving device 200 to detect slice segments in a multiplexing layer according to MP4.

MMT packetization of slice segments will be described below in detail.

As illustrated in FIG. 8, when encoded data is packetized, items of data such as an SPS and a PPS which are commonly referred to during decoding of all slice segments in an access unit are stored in MMT packet #1. In this case, receiving device 200 couples payload data of MMT packet #1 and data of each slice segment, and outputs the obtained data to the decoders. Thus, receiving device 200 can easily generate items of data input to the decoders by coupling payloads of a plurality of MMT packets.

Figure 10:
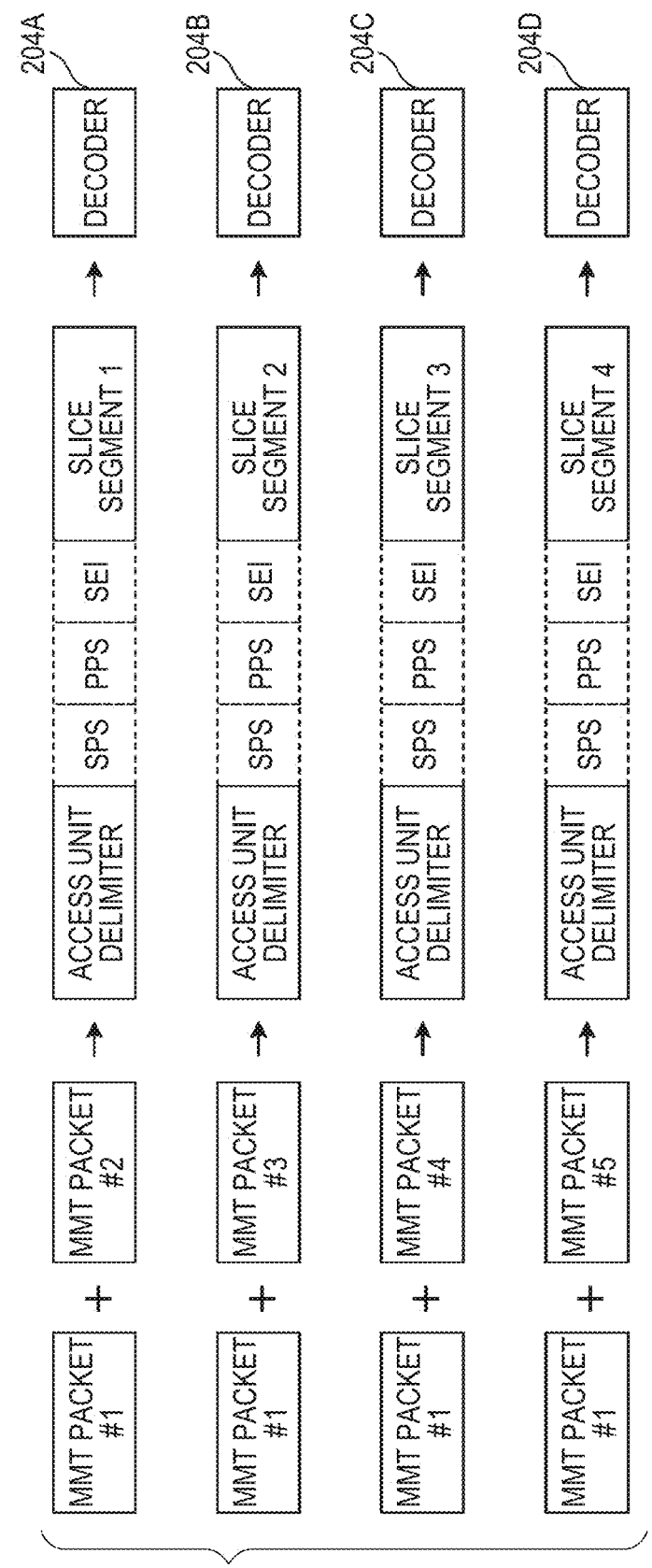
FIG. 10 is a view illustrating an example of data input to each decoder according to the first exemplary embodiment.

FIG. 10 is a view illustrating an example where items of data input to decoders 204A to 204D are generated from MMT packets illustrated in FIG. 8. Demultiplexer 203 generates data which is necessary for decoder 204A to decode slice segment 1 by coupling items of payload data of MMT packet #1 and MMT packet #2. Demultiplexer 203 generates items of input data likewise for decoder 204B to decoder 204D, too. That is, demultiplexer 203 generates data input to decoder 204B by coupling items of payload data of MMT packet #1 and MMT packet #3. Demultiplexer 203 generates data input to decoder 204C by coupling items of payload data of MMT packet #1 and MMT packet #4. Demultiplexer 203 generates data input to decoder 204D by coupling items of payload data of MMT packet #1 and MMT packet #5.

In addition, demultiplexer 203 may remove NAL units such as an access unit delimiter and SEI which are not necessary for decoding processing, from the payload data of MMT packet #1, demultiplex NAL units such as an SPS and a PPS which are necessary for decoding processing, and add the NAL units to data of slice segments.

When encoded data is packetized as illustrated in FIG. 9, demultiplexer 203 outputs to first decoder 204A MMT packet #1 including the head data of the access unit in the multiplexing layer. Further, demultiplexer 203 generates data input to each of the second and subsequence decoders by analyzing an MMT packet including head data of an access unit in a multiplexing layer, demultiplexing NAL units of an SPS and a PPS, and adding the demultiplexed NAL units of the SPS and the PPS to items of data of second and subsequent slice segments.

Furthermore, desirably, by using information included in the header of the MMT packet, receiving device 200 can identify a type of data stored in an MMT payload, and an index number of a slice segment in an access unit in a case where the slice segment is stored in the payload. In this regard, the data type refers to one of slice segment previous data (NAL units disposed before a head slice segment in an access unit will be collectively referred in this way), and slice segment data. When units such as slice segments obtained by fragmenting an MPU are stored in an MMT packet, a mode for storing an MFU (Media Fragment Unit) is used. When this mode is used, transmitting device 100 can set, for example, Data Unit which is a data basic unit of the MFU to a sample (a data unit according to MMT and corresponding to an access unit) or a subsample (a unit obtained by dividing a sample).

In this case, a header of the MMT packet includes a field called Fragmentation indicator, and a field called Fragment counter.

Fragmentation indicator indicates whether or not data to be stored in a payload of an MMT packet is obtained by fragmenting Data unit, and indicates whether the fragment is a head or last fragment of Data unit or a fragment which is not the head or last fragment when the fragment is obtained by fragmenting Data unit. In other words, Fragmentation indicator included in a header of a given packet is identification information indicating one of that (1) this packet is included in Data unit which is a basic data unit, that (2) Data unit is divided into a plurality of packets and stored and the packets are head packets of Data unit, that (3) Data unit is divided into a plurality of packets and stored and the packets are packets other than head and last packets of Data unit, and that (4) Data unit is divided into a plurality of packets and stored and the packets are last packets of Data unit.

Fragment counter is an index number indicating which fragment of Data unit data to be stored in an MMT packet corresponds to.

Hence, transmitting device 100 sets a sample according to MMT, to Data unit, and sets slice segment previous data and each slice segment to fragment units of Data unit, respectively, so that receiving device 200 can identify a type of data stored in a payload by using information included in a header of an MMT packet. That is, demultiplexer 203 can generate data input to each of decoders 204A to 204D by referring to a header of an MMT packet.

Figure 11:
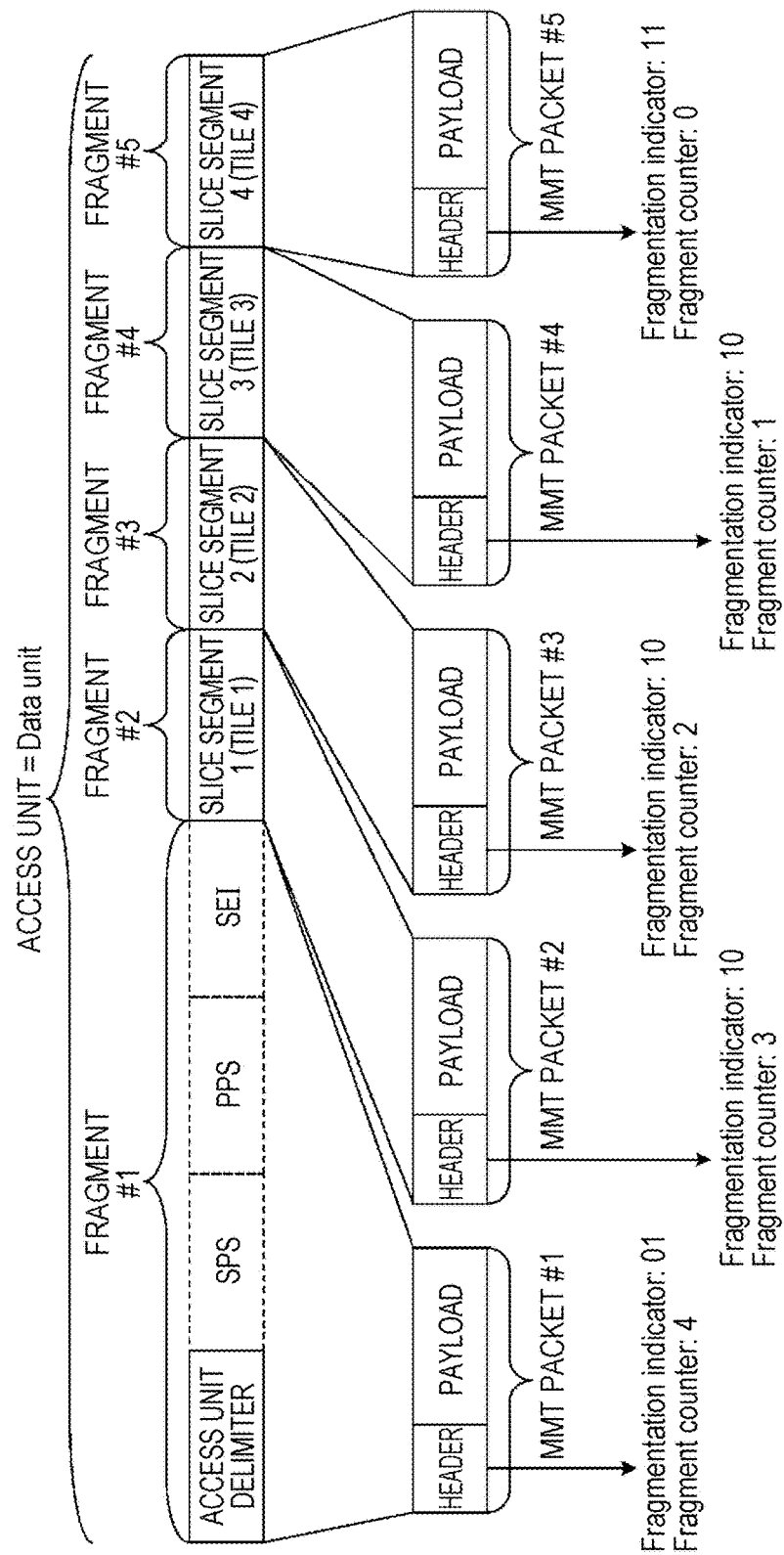
FIG. 11 is a view illustrating an example of an MMT packet and header information according to the first exemplary embodiment.

FIG. 11 is a view illustrating an example where a sample is set to Data unit, and slice segment previous data and slice segments are packetized as fragments of Data unit.

The slice segment previous data and the slice segments are divided into five segments of fragment #1 to fragment #5. Each fragment is stored in an individual MMT packet. In this case, values of Fragmentation indicator and Fragment counter included in a header of the MMT packet are as illustrated in FIG. 11.

For example, Fragment indicator is a 2-bit value of a binary digit. Fragment indicator of MMT packet #1 which is a head of Data unit, Fragment indicator of last MMT packet #5 and Fragment indicators of MMT packet #2 to MMT packet #4 which are in-between packets are set to different values. More specifically, Fragment indicator of MMT packet #1 which is a head of Data unit is set to 01, Fragment indicator of last MMT packet #5 are set to 11, and Fragment indicators of MMT packet #2 to MMT packet #4 which are in-between packets are set to 10. In addition, when Data unit includes one MMT packet, Fragment indicator is set to 00.

Further, Fragment counter is 4 which is a value obtained by subtracting 1 from 5 which is a total number of fragments in MMT packet #1, values of subsequent packets decrease one by one in order, and the value is 0 in last MMT packet #5.

Hence, receiving device 200 can identify an MMT packet in which slice segment previous data is stored, by using one of Fragment indicator and Fragment counter. Further, receiving device 200 can identify an MMT packet in which an Nth slice segment is stored, by referring to Fragment counter.

A header of an MMT packet additionally includes a sequence number in an MPU of Movie Fragment to which Data unit belongs, a sequence number of the MPU and a sequence number in Movie Fragment of a sample to which Data unit belongs. Demultiplexer 203 can uniquely determine the sample to which Data unit belongs by referring to these sequence numbers.

Further, demultiplexer 203 can determine an index number of a fragment in Data unit based on Fragment counter, and, consequently, can uniquely determine a slice segment to be stored in the fragment even when packet loss occurs. When, for example, fragment #4 illustrated in FIG. 11 cannot be obtained due to packet loss, demultiplexer 203 learns that a fragment received next to fragment #3 is fragment #5, and, consequently, can output slice segment 4 stored in fragment #5 to decoder 204D, not to decoder 204C.

In addition, when a channel which is guaranteed not to cause packet loss is used, demultiplexer 203 only needs to periodically process arriving packets without determining a type of data stored in an MMT packet or an index number of a slice segment by referring to a header of the MMT packet. When, for example, an access unit is transmitted by using five MMT packets in total including slice segment previous data and fours slice segments, receiving device 200 can obtain the slice segment previous data and items of data of the four slice segments in order by determining the slice segment previous data of the access unit which starts being decoded, and then processing the received MMT packet in order.

A modified example of packetization will be described below.

A slice segment does not need to be obtained by dividing a plane of an access unit in both of the horizontal direction and the vertical direction, and, as illustrated in FIG. 1, may be obtained by dividing an access unit in the horizontal direction or may be obtained by dividing an access unit in the vertical direction as illustrated in FIG. 1.

Further, when an access unit is divided in the horizontal direction, it is not necessary to use tiles.

Furthermore, the number of divisions of a plane of an access unit is arbitrary and is not limited to four. In this regard, area sizes of slice segments and tiles need to be a lower limit of encoding standards of H.265 or more.

Transmitting device 100 may store identification information indicating a method for dividing a plane of an access unit, in an MMT message or a TS descriptor. For example, information indicating the numbers of divisions of a plane in the horizontal direction and the vertical direction may be stored. Further, unique identification information indicating that a plane is equally divided into two in the horizontal direction and the vertical direction, respectively, as illustrated in FIG. 3 or that a plane is equally divided into four in the horizontal direction as illustrated in FIG. 1 may be allocated to a dividing method. When, for example, an access unit is divided as illustrated in FIG. 3, identification information indicates mode 1, and, when an access unit is divided as illustrated in FIG. 1, the identification information indicates mode 1.

Further, information indicating a limitation of encoding conditions related to a plane dividing method may be included in a multiplexing layer. For example, information indicating that one slice segment is configured by one tile may be used. Further, information indicating that a reference block for motion compensation during decoding of slice segments or tiles is limited to a slice segment or a tile at the same position in a screen or is limited to a block within a predetermined range of neighboring slice segments may be used.

Furthermore, transmitting device 100 may switch whether or not to divide an access unit into a plurality of slice segments according to a resolution of a moving image. For example, transmitting device 100 may divide an access unit into four when a processing target moving image is 8K4K without dividing a plane when a processing target moving image has a 4K2K resolution. Defining a dividing method in advance in the case of an 8K4K moving image enables receiving device 200 to determine whether or not to divide a plane, and the dividing method, and to switch a decoding operation by obtaining a resolution of a moving image to be received.

Further, receiving device 200 can detect whether or not to divide a plane by referring to a header of an MMT packet. When, for example, an access unit is not divided, if Data unit of MMT is set to a sample, Data unit is not fragmented. Hence, receiving device 200 can determine that an access unit is not divided when a value of Fragment counter included in the header of the MMT packet is zero. Alternatively, receiving device 200 may detect whether or not the value of Fragmentation indicator is 01 at all times. Receiving device 200 can determine that the access unit is not divided when the value of Fragmentation indicator is 01.

Further, receiving device 200 can support a case where a number of divisions of a plane of an access unit and a number of decoders do not match. When, for example, receiving device 200 includes two decoders 204A and 204B which can decode 8K2K encoded data in real time, demultiplexer 203 outputs to decoder 204A two of four slice segments configuring the 8K4K encoded data.

Figure 12:
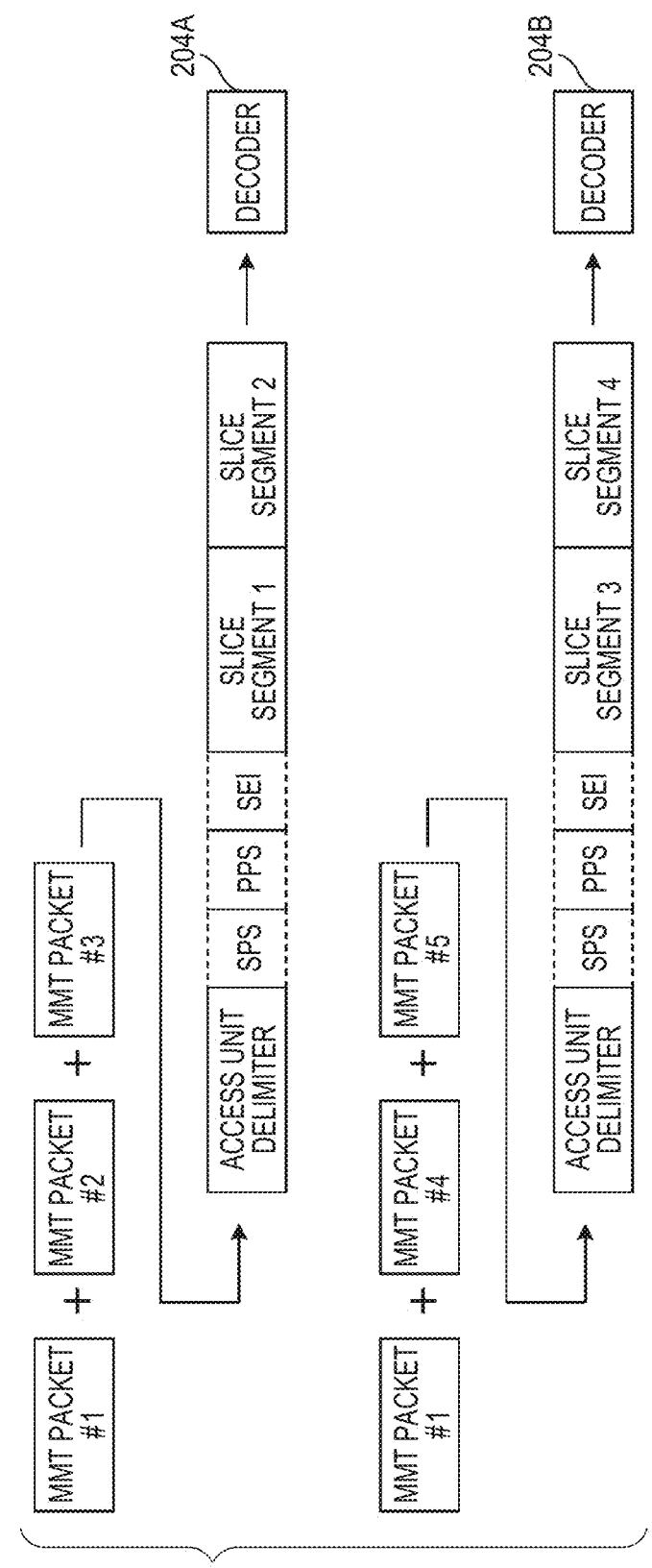
FIG. 12 is a view illustrating another example of data input to each decoder according to the first exemplary embodiment.

FIG. 12 is a view illustrating an operation example in a case where data packetized as an MMT packet as illustrated in FIG. 8 is input to two decoders 204A and 204B. In this regard, desirably, receiving device 200 can directly integrate and output decoding results of decoders 204A and 204B. Hence, demultiplexer 203 selects slice segments to output to decoders 204A and 204B, respectively, such that the decoding results of decoders 204A and 204B spatially continue.

Further, demultiplexer 203 may select a decoder to use according to a resolution or a frame rate of moving image encoded data. When, for example, receiving device 200 includes four 4K2K decoders, and a resolution of an input image is 8K4K, receiving device 200 performs decoding processing by using all of the four decoders. Further, when a resolution of an input image is 4K2K, receiving device 200 performs decoding processing by using one decoder. Alternatively, even when a plane is divided into four and when 8K4K can be decoded in real time by a single decoder, demultiplexer 203 integrates all division units to output to one decoder.

Further, receiving device 200 may determine a decoder for use by taking into account a frame rate. There is a case where, when, for example, receiving device 200 includes two decoders whose upper limit of a frame rate which enables decoding in real time is 60 fps when a resolution is 8K4K, 8K4K encoded data of 120 fps is input. In this case, when a plane is configured by four division units, similar to the example in FIG. 12, slice segment 1 and slice segment 2 are input to decoder 204A, and slice segment 3 and slice segment 4 are input to decoders 204B. Each of decoders 204A and 204B can decode 8K2K encoded data (the resolution is a half of 8K4K) up to 120 fps in real time, and therefore these two decoders 204A and 204B perform decoding processing.

Further, even when the resolution and the frame rate are the same, if a profile or a level of an encoding method or an encoding method such as H.264 or H.265 is different, a processing amount is different. Hence, receiving device 200 may select a decoder to be used based on these pieces of information. In addition, when receiving device 200 cannot decode all items of encoded data received by way of broadcasting or communication or cannot decode all slice segments or tiles configuring an area selected by a user, receiving device 200 may automatically determine slice segments or tiles which can be decoded in a processing range of a decoder. Further, receiving device 200 may provide a user interface which the user uses to select an area to be decoded. In this case, receiving device 200 may display a warning message indicating that all areas cannot be decoded, or may display information indicating decodable areas or a number of slice segments or tiles.

Further, the above method is applicable to a case where an MMT packet in which slice segments of the same encoded data are stored is transmitted and received by using a plurality of channels for broadcasting and communication, too.

Figure 13:
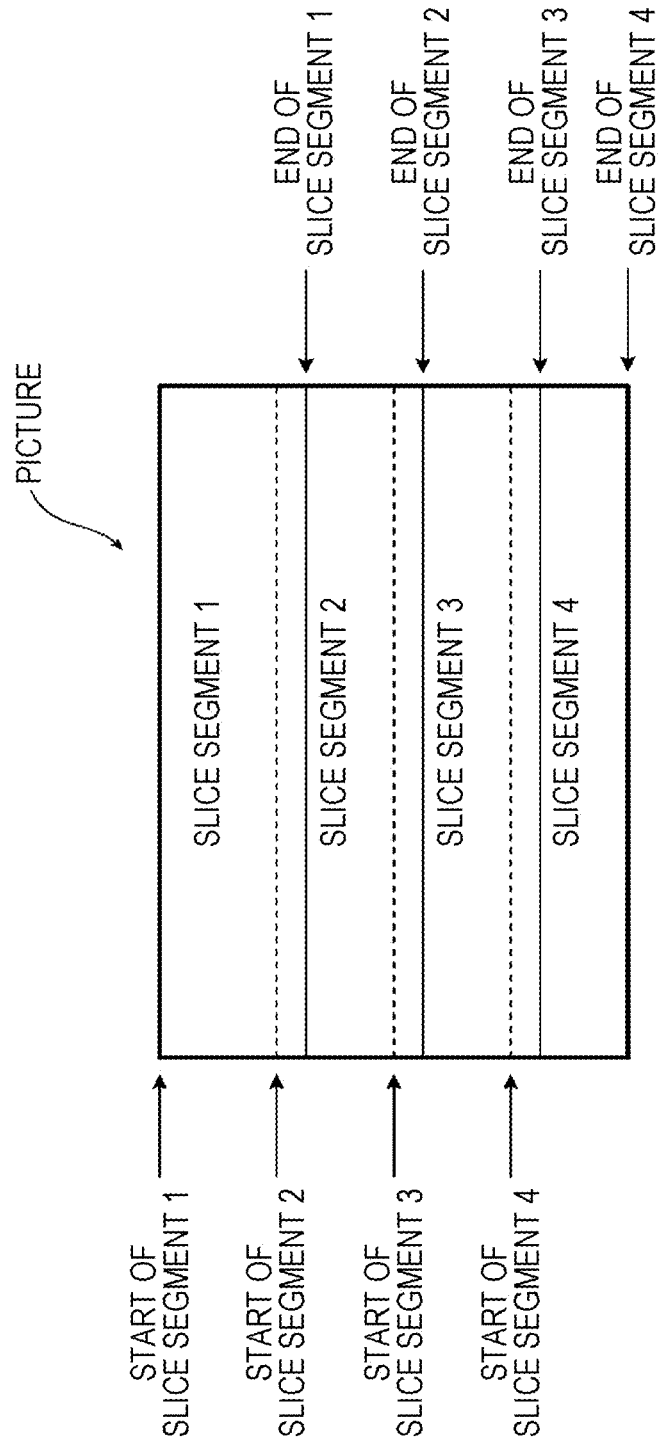
FIG. 13 is a view illustrating a picture division example according to the first exemplary embodiment.

Furthermore, transmitting device 100 may perform encoding such that an area of each slice segment overlaps to make a boundary of a division unit indistinctive. In an example illustrated in FIG. 13, an 8K4K picture is divided into slice segments 1 to 4. Each of slice segments 1 to 3 is, for example, 8K×1.1K, and slice segment 4 is 8K×1K. Further, neighboring slice segments overlap each other. By so doing, it is possible to efficiently perform motion compensation during encoding at a boundary in case where a picture is divided into four as indicated by dotted lines, so that image quality at the boundary portions improves. Thus, it is possible to reduce deterioration of image quality at the boundary portions.

In this case, display 205 clips an 8K×1K area from an 8K×1.1K area, and integrates resulting areas. In addition, transmitting device 100 may separately transmit information which indicates whether or not slice segments overlapping each other are encoded and indicates an overlapping range, and which is included in a multiplexing layer or encoded data.

In addition, when tiles are used, too, the same method is applicable.

Figure 14:
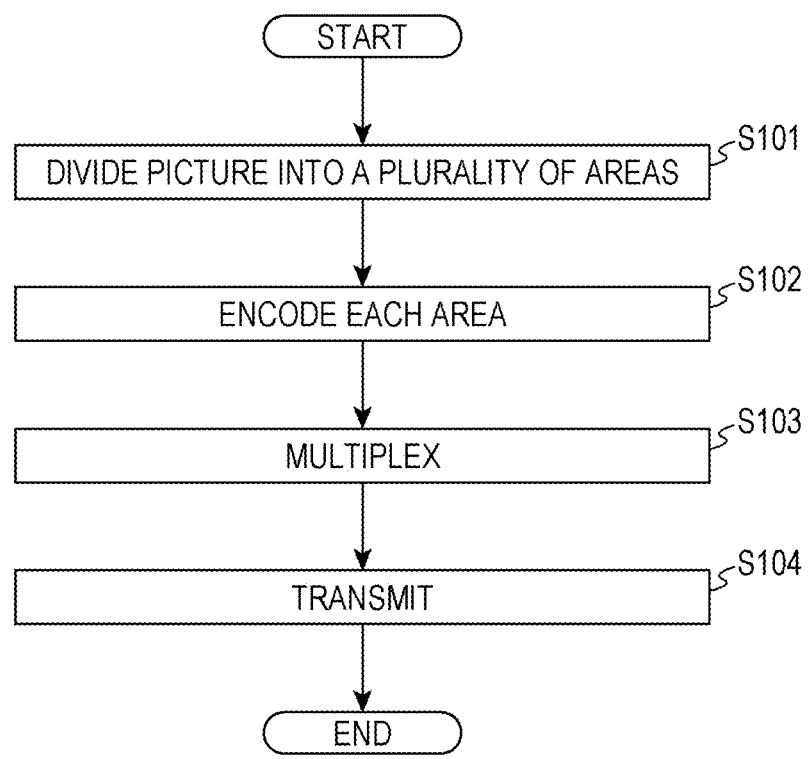
FIG. 14 is a flowchart of a transmitting method according to the first exemplary embodiment.

An operation flow of transmitting device 100 will be described. FIG. 14 is a flowchart illustrating an operation example of transmitting device 100.

First, encoder 101 divides a picture (access unit) into a plurality of slice segments (tiles) which is a plurality of areas (S101). Next, encoder 101 generates encoded data corresponding to each of a plurality of slice segments by encoding a plurality of slice segments such that a plurality of slice segments can be independently decoded (S102). In addition, encoder 101 may encode a plurality of slice segments by using a single encoder or by performing parallel processing in a plurality of encoders.

Next, multiplexer 102 stores a plurality of items of encoded data generated by encoder 101, in a plurality of MMT packets, and multiplexes a plurality of items of encoded data (S103). More specifically, as illustrated in FIGS. 8 and 9, multiplexer 102 stores a plurality of items of encoded data in a plurality of MMT packets such that items of encoded data corresponding to different slice segments are not stored in one MMT packet. Further, as illustrated in FIG. 8, multiplexer 102 stores control information which is commonly used for all decoding units in a picture, in MMT packet #1 different from a plurality of MMT packets #2 to #5 in which a plurality of items of encoded data is stored. The control information includes at least one of an access unit delimiter, an SPS, a PPS and SEI.

In addition, multiplexer 102 may store the control information in the same MMT packet as one of a plurality of MMT packets in which a plurality of items of encoded data is stored. For example, as illustrated in FIG. 9, multiplexer 102 stores control information in a head MMT packet (MMT packet #1 in FIG. 9) of a plurality of MMT packets in which a plurality of items of encoded data is stored.

Lastly, transmitting device 100 transmits a plurality of MMT packets. More specifically, modulator 103 modulates data obtained by multiplexing, and transmitter 104 transmits the modulated data (S104).

Figure 15:
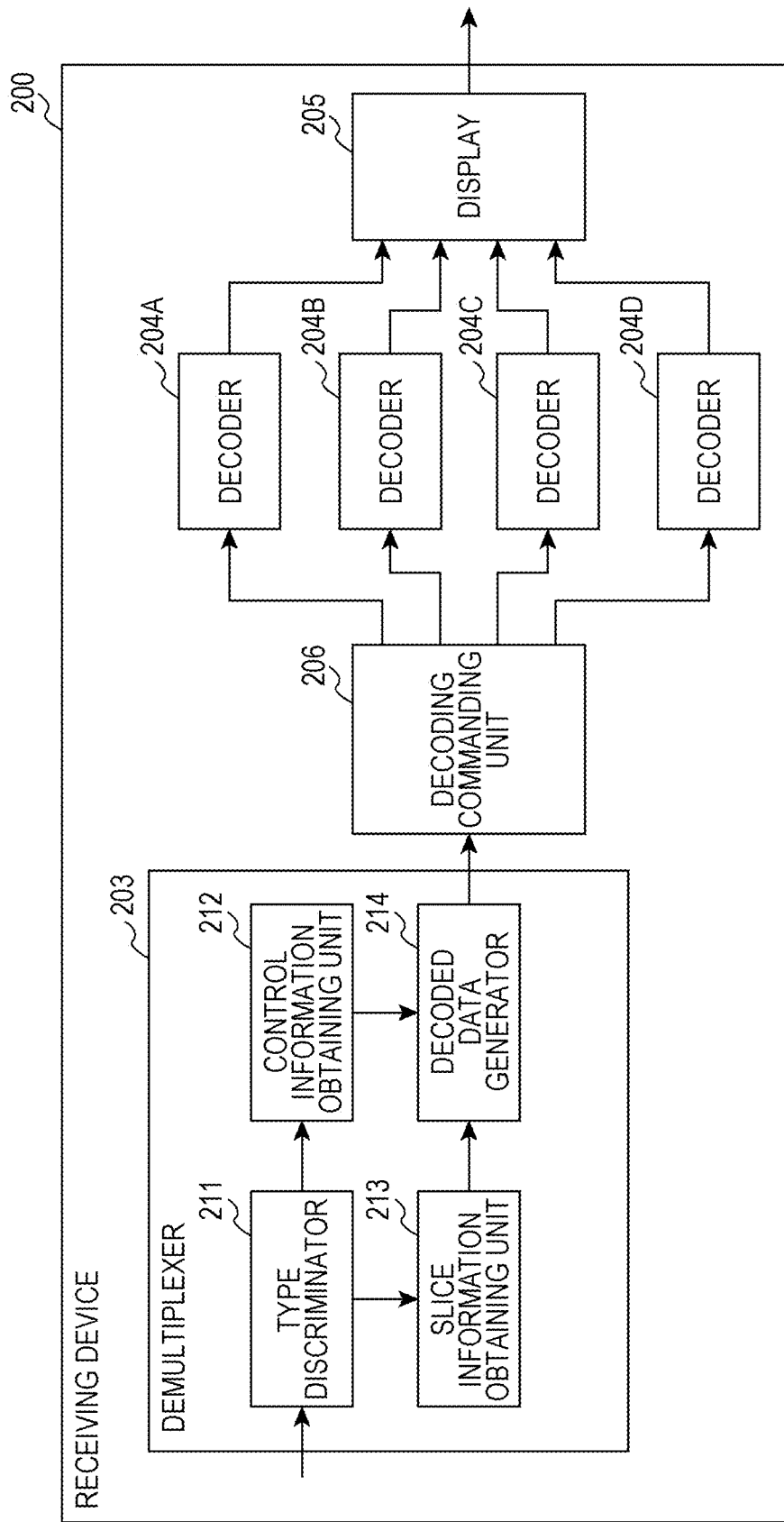
FIG. 15 is a block diagram of the receiving device according to the first exemplary embodiment.

FIG. 15 is a block diagram illustrating a configuration example of receiving device 200, and is a view illustrating a detailed configuration of demultiplexer 203 and a subsequent stage illustrated in FIG. 7. As illustrated in FIG. 15, receiving device 200 further includes decoding commanding unit 206. Further, demultiplexer 203 includes type discriminator 211, control information obtaining unit 212, slice information obtaining unit 213 and decoded data generator 214.

Figure 16:
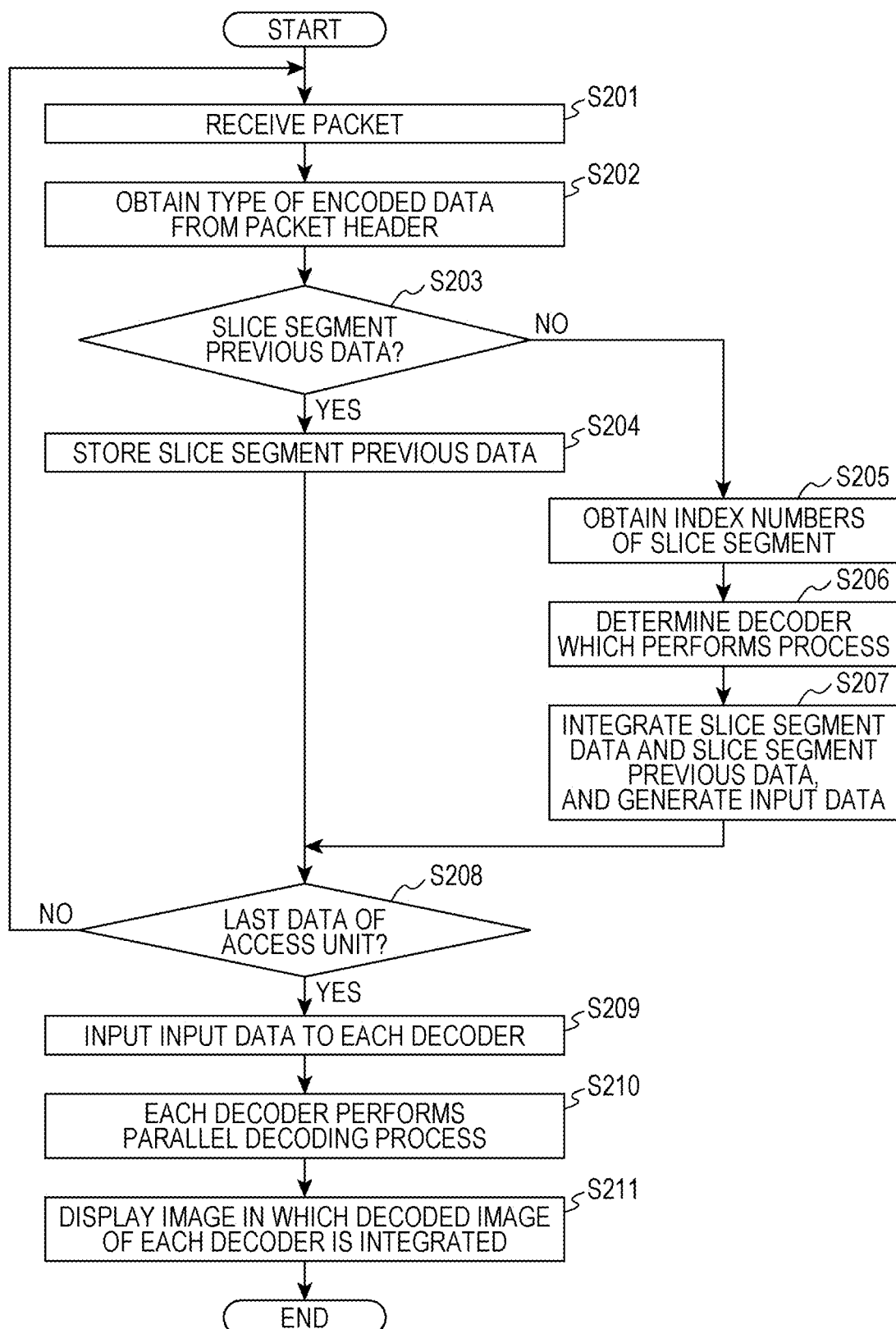
FIG. 16 is a flowchart of a receiving method according to the first exemplary embodiment.

An operation flow of receiving device 200 will be described below. FIG. 16 is a flowchart illustrating an operation example of receiving device 200. Hereinafter, an operation for one access unit will be described. When decoding processing of a plurality of access units is performed, processing of this flowchart is repeated.

First, receiving device 200 receives, for example, a plurality of packets (MMT packets) generated by transmitting device 100 (S201).

Next, type discriminator 211 obtains a type of encoded data stored in the received packet by analyzing a header of the received packet (S202).

Next, type discriminator 211 determines whether the data stored in the received packet is slice segment previous data or slice segment data, based on the type of the obtained encoded data (S203).

When the data stored in the received packets is the slice segment previous data (Yes in S203), control information obtaining unit 212 obtains the slice segment previous data of a processing target access unit from a payload of the received packet, and stores the slice segment previous data in a memory (S204).

Meanwhile, when the data stored in the received packet is the slice segment data (No in S203), receiving device 200 determines which encoded data of an area of a plurality of areas the data stored in the received packet corresponds to by using header information of the received packets. More specifically, slice information obtaining unit 213 obtains index numbers Idx of slice segments stored in the received packet by analyzing the header of the received packet (S205). More specifically, index numbers Idx are index numbers in Movie Fragment of an access unit (a sample according to MMT).

In addition, the processing in this step S205 may be collectively performed in step S202.

Next, decoded data generator 214 determines a decoder which decodes the slice segments (S206). More specifically, index numbers Idx and a plurality of decoders are associated in advance, and decoded data generator 214 determines a decoder which is associated with index number Idx obtained in step S205 as the decoder which decodes the slice segments.

In addition, as described with reference to the example in FIG. 12, decoded data generator 214 may determine a decoder which decodes the slice segments based on at least one of a resolution of an access unit (picture), a method for dividing the access unit into a plurality of slice segments (tiles) and processing performances of a plurality of decoders of receiving device 200. For example, decoded data generator 214 determines an access unit dividing method based on an MMT message or identification information in a descriptor such as a TS section.

Next, decoded data generator 214 generates a plurality of items of input data (coupled data) input to a plurality of decoders by coupling control information which is included in one of a plurality of packets and is commonly used for all decoding units in a picture, and each item of a plurality of items of encoded data of a plurality of slice segments. More specifically, decoded data generator 214 obtains slice segment data from a payload of the received packet. Decoded data generator 214 generates data input to the decoder determined in step S206 by coupling the slice segment previous data stored in the memory in step S204, and the obtained slice segment data (S207).

When data of the received packet is not last data of the access unit after step S204 or S207 (No in S208), processing subsequent to step S201 is performed again. That is, the above processing is repeated until items of input data which correspond to a plurality of slice segments included in the access unit, and are input to a plurality of decoders 204A to 204D are generated.

In addition, a timing to receive a packet is not limited to a timing illustrated in FIG. 16, and a plurality of packets may be received in advance or successively and may be stored in the memory or the like.

Meanwhile, when the data of the received packet is the final data of the access unit (Yes in S208), decoding commanding unit 206 outputs a plurality of items of input data generated in step S207, to corresponding decoders 204A to 204D (S209).

Next, a plurality of decoders 204A to 204D generates a plurality of decoded images by decoding a plurality of items of input data in parallel according to a DTS of the access unit (S210).

Lastly, display 205 generates a display image by coupling a plurality of decoded images generated by a plurality of decoders 204A to 204D, and displays the display image according to a PTS of the access unit (S211).

In addition, receiving device 200 obtains a DTS and a PTS of the access unit by analyzing payload data of an MMT packet in which header information of an MPU or header information of Movie Fragment is stored. Further, receiving device 200 obtains the DTS and the PTS of the access unit from a header of a PES packet when TS is used for a multiplexing method. Receiving device 200 obtains the DTS and the PTS of the access unit from a header of an RTP packet when RTP is used for a multiplexing method.

Further, display 205 may perform filtering processing such as deblock filtering on each boundary of neighboring division units when integrating decoding results of a plurality of decoders. In addition, a filter process is unnecessary when a decoding result of a single decoder is displayed, and therefore display 205 may switch a process according to whether or not to perform a filter process on each boundary of decoding results of a plurality of decoders. Whether or not it is necessary to perform the filter process may be defined in advance according to whether or not division is performed. Alternatively, information indicating whether or not it is necessary to perform filtering processing may be additionally stored in a multiplexing layer. Further, information such as a filter coefficient which is necessary for the filtering processing is stored in an SPS, a PPS, SEI or a slice segment in some cases. Decoders 204A to 204D or demultiplexer 203 obtains these pieces of information by analyzing SEI, and outputs the pieces of obtained information to display 205. Display 205 performs the filtering processing by using these pieces of information. In addition, when these pieces of information are stored in the slice segment, decoders 204A to 204D desirably obtain these pieces of information.

In addition, an example where types of data stored in fragments are two types of slice segment previous data and slice segments has been described above.

The data types may be three types or more. In this case, classification is performed in step S203 according to a type.

Further, transmitting device 100 may fragment slice segments when a data size of the slice segments is large to store in an MMT packet. That is, transmitting device 100 may fragment slice segment previous data and the slice segments. In this case, when an access unit and Data unit are equally set as in the example of packetization illustrated in FIG. 11, the following matter occurs.

When, for example, slice segment 1 is divided into three segments, slice segment 1 is divided into three packets whose Fragment counter values are 1 to 3, and is transmitted. Further, Fragment counter values of slice segment 2 and subsequent slice segments are 4 or more, and the Fragment counter values and data stored in a payload cannot be associated. Therefore, receiving device 200 cannot specify a packet in which head data of the slice segments is stored, based on the header information of an MMT packet.

In such a case, receiving device 200 may analyze data of the payload of the MMT packet, and specify a start position of the slice segments. In this regard, formats for storing NAL units in a multiplexing layer according to H.264 or H.265 includes two types of a format which is called a byte stream format for adding a start code including a specific bit sequence immediately before an NAL unit header, and a format which is called an NAL size format for adding a field indicating an NAL unit size.

The byte stream format is used for an MPEG-2 system and RTP. The NAL size format is used for MP4, and DASH and MMT which use MP4.

When the byte stream format is used, receiving device 200 analyzes whether or not head data of a packet matches with the a start code. When the head data of the packet and the start code match, receiving device 200 can detect whether or not data included in a packet is data of a slice segment by obtaining an NAL unit type from a subsequent NAL unit header.

Meanwhile, in the case of the NAL size format, receiving device 200 cannot detect a start position of an NAL unit based on a bit sequence. Hence, receiving device 200 needs to shift a pointer by reading data corresponding to the NAL unit size in order from a head NAL unit of an access unit to obtain a start position of the NAL units.

However, when a subsample unit size is indicated in an MPU or a header of Movie Fragment according to MMT, and the subsample corresponds to slice segment previous data or a slice segment, receiving device 200 can specify a start position of each NAL unit based on subsample size information. Hence, transmitting device 100 may give information indicating whether or not there is the subsample unit information in an MPU or Movie Fragment, to information such as MMT or MPT (Media Transfer Protocol) obtained when receiving device 200 starts receiving data.

In addition, data of the MPU is extended based on an MP4 format. MP4 includes a mode that parameter sets such as an SPS and a PPS according to H.264 or H.265 can be stored as sample data, and a mode that the parameter sets cannot be stored. Further, information for specifying this mode is indicated as an entry name of SampleEntry. When the mode that the parameter sets can be stored is used and the parameter sets are included in a sample, receiving device 200 obtains the parameter sets according to the above method.

Meanwhile, when the mode that the parameter sets cannot be stored is used, the parameter sets are stored as Decoder Specific Information in SampleEntry or are stored by using a parameter set stream. In this regard, the parameter set stream is not generally used, and therefore transmitting device 100 desirably stores the parameter sets in Decoder Specific Information. In this case, receiving device 200 obtains the parameter sets to which the access unit refers by analyzing SampleEntry transmitted as meta data of the MPU in the MMT packet or as meta data of Movie Fragment.

When the parameter sets are stored as sample data, receiving device 200 can obtain the parameter sets which are necessary for decoding by referring to the sample data without referring to SampleEntry. In this case, transmitting device 100 may not store the parameter sets in SampleEntry. By so doing, transmitting device 100 can use identical SampleEntry in different MPUs, so that it is possible to reduce a process load of transmitting device 100 during generation of MPUs. Further, it is possible to provide an advantage that receiving device 200 does not need to refer to the parameter sets in SampleEntry.

Furthermore, transmitting device 100 may store one default parameter set in SampleEntry, and store parameter sets to which the access unit refers, in sample data. According to conventional MP4, the parameter sets are generally stored in SampleEntry, and therefore when there are no parameter sets in SampleEntry, a receiving device which stops playback may exist. By using the above method, it is possible to solve this matter.

Further, transmitting device 100 may store parameter sets in sample data when parameter sets different from default parameter sets are used.

In addition, both of the modes enable parameter sets to be stored in SampleEntry, and therefore transmitting device 100 may store the parameter sets in VisualSampleEntry and receiving device 200 may obtain parameter sets from VisualSampleEntry.

In addition, according to MMT standards, MP4 header information such as Moov and Moof is transmitted as MPU meta data or movie fragment data. However, transmitting device 100 may not necessarily transmit MPU meta data and movie fragment meta data. Further, receiving device 200 can also determine whether or not an SPS and a PPS are stored in sample data based on whether or not service according to ARIB (Association of Radio Industries and Businesses) standards, an asset type or an MPU meta is transmitted.

Figure 17:
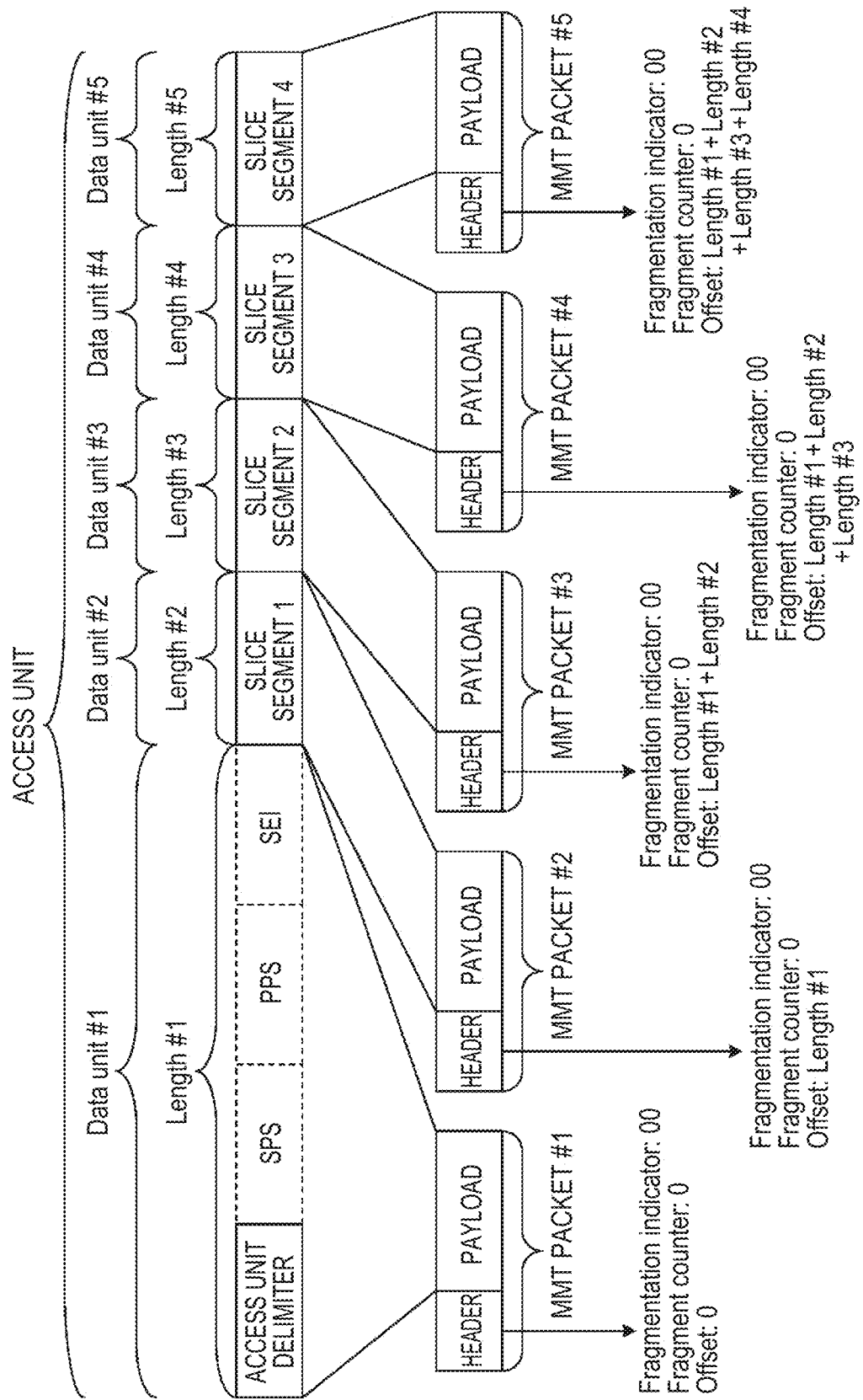
FIG. 17 is a view illustrating an example of the MMT packet and the header information according to the first exemplary embodiment.

FIG. 17 is a view illustrating an example where slice segment previous data and each slice segment are set to different Data units, respectively.

In an example illustrated in FIG. 17, data sizes of slice segment previous data and slice segment 1 to slice segment 4 are Length #1 to Length #5, respectively. Each field value of Fragmentation indicator, Fragment counter and Offset included in a header of an MMT packet are illustrated in FIG. 17.

In this regard, Offset is offset information indicating a bit length (offset) from a head of encoded data of a sample (an access unit or a picture) to which payload data belongs, to a head byte of the payload data (encoded data) included in the MMT packet. In addition, that a value of Fragment counter starts from a value obtained by subtracting 1 from a total number of fragments will be described; however, the value of Fragment counter may start from another value.

Figure 18:
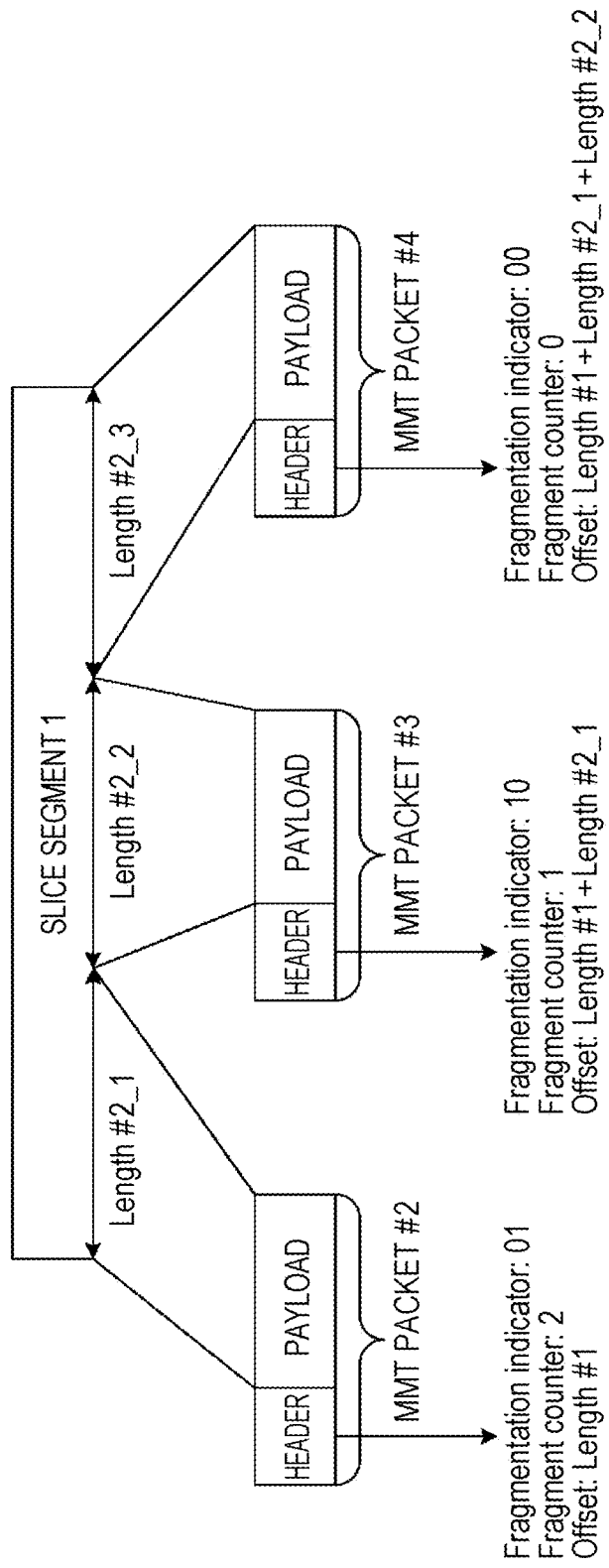
FIG. 18 is a view illustrating an example of the MMT packet and the header information according to the first exemplary embodiment.

FIG. 18 is a view illustrating an example where Data unit is fragmented. In the example illustrated in FIG. 18, slice segment 1 is divided into three fragments, and the fragments are stored in MMT packet #2 to MMT packet #4, respectively. In this case, too, when data sizes of the fragments are Length #2_1 to Length #2_3, each field value is as illustrated in FIG. 18.

Thus, when a data unit such as a slice segment is set to Data unit, a head of an access unit and a head of a slice segment can be determined as follows based on a field value of an MMT packet header.

A head of a payload in a packet in a packet whose Offset value is 0 is a head of an access unit.

A head of a payload of a packet whose Offset value takes a value different from 0 and whose Fragmentation indcatorno value takes 00 or 01 is a head of a slice segment.

Further, when Data unit is not fragmented and packet loss does not occur, either, receiving device 200 can specify index numbers of slice segments to be stored in an MMT packet based on the number of slice segments obtained after the head of the access unit is detected.

Furthermore, even when Data unit of the slice segment previous data is fragmented, receiving device 200 can detect the heads of the access unit and the slice segment likewise.

Still further, even when packet loss occurs or even when an SPS, a PPS and SEI included in slice segment previous data are set to different Data units, receiving device 200 can specify a start position of a slice segment or a tile in a picture (access unit) by specifying an MMT packet in which head data of a slice segment is stored based on an analysis result of an MMT header, and then analyzing a header of the slice segment. A processing amount of slice header analysis is small, and a processing load does not need to be taken into account.

Thus, each item of a plurality of items encoded data of a plurality of slice segments is associated with a basic data unit (Data unit) which is a unit of data to be stored in one or more packets on a one-to-one basis. Further, each item of a plurality of items of encoded data is stored in one or more MMT packets.

Header information of each MMT packet includes Fragmentation indicator (identification information) and Offset (offset information)

Receiving device 200 determines as a head of encoded data of each slice segment a head of payload data included in a packet including header information including Fragmentation indicator whose value is 00 or 01. More specifically, receiving device 200 determines as a head of encoded data of each slice segment a head of payload data included in a packet including header information including offset whose value is not 0 and Fragmentation indicator whose value is 00 or 01.

Further, in an example in FIG. 17, a head of Data unit is one of a head of an access unit and a head of a slice segment, and a value of Fragmentation indicator is 00 or 01. Furthermore, receiving device 200 can also detect a head of an access unit or a head of slice segments without by referring to Offset, by referring to an NAL unit type and by determining whether a head of Data Unit is an access unit delimiter or a slice segment.

Thus, transmitting device 100 performs packetization such that a head of NAL units starts from a head of a payload of an MMT packet. Consequently, even when slice segment previous data is divided into a plurality of Data units, receiving device 200 can detect the access unit or the head of the slice segments by analyzing Fragmentation indicator and the NAL unit header. An NAL unit type is in a head byte of an NAL unit header. Hence, when analyzing a header portion of an MMT packet, receiving device 200 can obtain an NAL unit type by additionally analyzing data of one byte.

In the case of an audio, receiving device 200 only needs to detect a head of an access unit, and perform determination based on whether a value of Fragmentation indicator is 00 or 01.

Further, as described above, when encoded data encoded to enable division and decoding is stored in a PES packet according to MPEG-2 TS, transmitting device 100 can use a data alignment descriptor. An example of a method for storing encoded data in a PES packet will be described below in detail.

According to, for example, HEVC, transmitting device 100 can indicate which one of an access unit, a slice segment and a tile data to be stored in a PES packet corresponds to by using the data alignment descriptor. Alignment types according to HEVC are defined as follows.

Alignment type=8 indicates a slice segment of HEVC. Alignment type=9 indicates a slice segment or an access unit of HEVC. Alignment type=12 indicates a slice segment or a tile of HEVC.

Consequently, transmitting device 100 can indicate which one of the slice segment and slice segment previous data the data of the PES packet corresponds to by, for example, using type 9. Instead of slice segments, a type indicating a slice is additionally defined, so that transmitting device 100 may use a type indicating a slice instead of a slice segment.

Further, a DTS and a PTS included in a header of the PES packet are set in a PES packet including head data of an access unit. Consequently, when the type is 9 and the PES packet includes a field of a DTS or a PTS, receiving device 200 can determine that the entire access unit or a division unit of a head of the access unit is stored in the PES packet.

Further, transmitting device 100 may use a field such as transport_priority indicating a priority of a TS packet in which a PES packet including head data of an access unit is stored to enable receiving device 200 to distinguish data included in a packet. Furthermore, receiving device 200 may determine data included in a packet by analyzing whether or not a payload of the PES packet is an access unit delimiter. Still further, data_alignment_indicator of a PES packet header indicates whether or not data is stored in the PES packet according to these types. It is guaranteed that, when 1 is set to this flag (data_alignment_indicator), data stored in the PES packet conforms to the type indicated in the data alignment descriptor.

Further, transmitting device 100 may use the data alignment descriptor when performing PES packetization in division decodable units such as slice segments. Consequently, receiving device 200 can determine that encoded data is packetized as a PES packet in division decodable units when there is the data alignment descriptor, and can determine that the encoded data is packetized as a PES packet in units of access units when there is no data alignment descriptor. In addition, when data_alignment_indicator is set to 1, and there is no data alignment descriptor, the MPEG-2 TS standards define that a unit of PES packetization unit is an access unit.

Receiving device 200 can determine that encoded data is packetized as a PES packet in division decodable units when a PMT (program Map Table) includes the data alignment descriptor, and generate data input to each decoder based on packetized units. Further, when the PMT does not include the data alignment descriptor and it is determined that it is necessary to decode encoded data in parallel based on program information or information of another descriptor, receiving device 200 generates data input to each decoder by analyzing a slice header of a slice segment. Furthermore, when a single decoder can decode encoded data, receiving device 200 causes the decoder to decode data of the entire access unit. In addition, when information indicating that encoded data is configured by division decodable units such as slice segments or tiles is additionally indicated by the descriptor of the PMT, receiving device 200 may determine whether or not encoded data can be decoded in parallel based on an analysis result of the descriptor.

Further, a DTS and a PTS included in a header of the PES packet are set in a PES packet including head data of an access unit. Therefore, when an access unit is divided and packetized as a PES packet, second and subsequent PES packets do not include information indicating the DTS and the PTS of the access unit. Hence, when decoding processing is performed in parallel, each of decoders 204A to 204D and the display 205 use the DTS and the PTS stored in the header of the PES packet including head data of the access unit.

Second Exemplary Embodiment

A method of storing data of an NAL size format in an MP4 format-based MPU according to MMT will be described in the second exemplary embodiment. In addition, the method for storing data in an MPU used in MMT will be described as an example below. Such a storage method is applicable to the same MP4 format-based DASH, too.

[Storage Method for MPU]

According to an MP4 format, a plurality of access units is collectively stored in one MP4 file. Data of each medium is stored in one MP4 file in an MPU used for MMT, and data can include an arbitrary number of access units. The MPU is a unit which can be decoded alone, and therefore access units are stored in the MPU in GOP (Group Of Picture) units.

Figure 19:
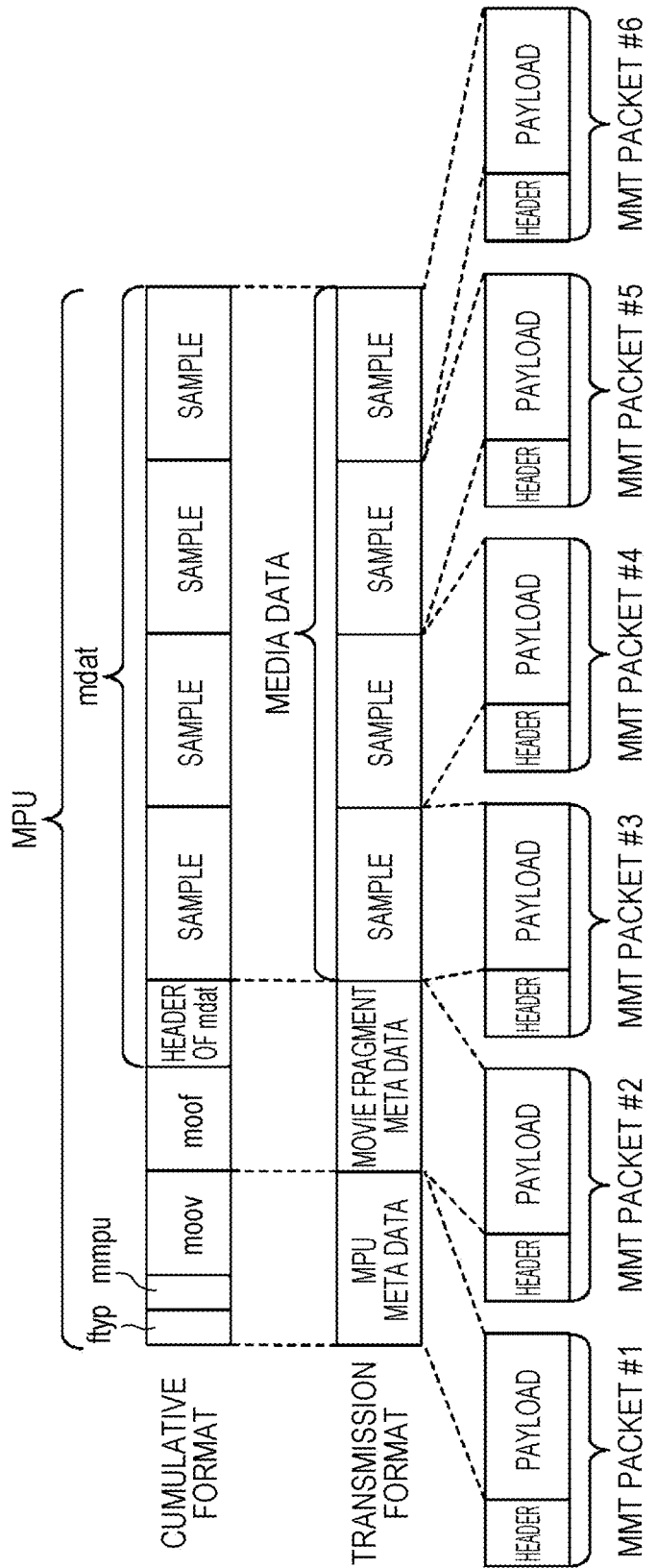
FIG. 19 is a view illustrating a configuration of an MPU (Media Processing Unit)

FIG. 19 is a view illustrating a configuration of an MPU. An MPU head is ftyp, mmpu and moov which are collectively defined as MPU meta data. Initialization information which is common between files, and an MMT hint track are stored in moov.

Further, information (sample_duration, sample_size, and sample_composition_time_offset) which makes it possible to specify initialization information and each size of each sample or each subsample, and a presentation time (PTS) and a decoding time (DTS), and data_offset indicating a data position are stored in moof.

Further, a plurality of access unit is stored as each sample in mdat (mdat box). Data except for samples among moof and mdat is defined as movie fragment meta data (described as MF meta data below), and sample data of mdat is defined as media data.

Figure 20:
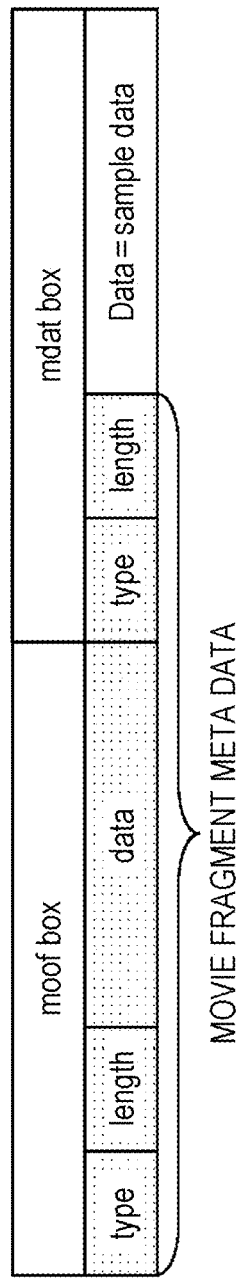
FIG. 20 is a view illustrating a configuration of MF (Movie Fragment) meta data.

FIG. 20 is a view illustrating a configuration of MF meta data. As illustrated in FIG. 20, the MF meta data more specifically includes type, length and data of moof box (moof), and type and length of mdat box (mdat).

When an access unit is stored in MP4 data, there are a mode that parameter sets such as an SPS and a PPS according to H.264 or H.265 can be stored as sample data and a mode that the parameter sets cannot be stored.

In this regard, in the mode that the parameter sets cannot be stored, the parameter sets are stored in Decoder Specific Information of SampleEntry in moov. Further, in the mode that the parameter sets can be stored, the parameter sets are included in a sample.

Each of MPU meta data, MF meta data and media data is stored in an MMT payload, and a fragment type (FT) is stored as an identifier which enables identification of these items of data in a header of the MMT payload. FT=0 indicates MPU meta data, FT=1 indicates MF meta data and FT=2 indicates media data.

In addition, FIG. 19 illustrates an example where MPU meta data units and MF meta data units are stored as data units in an MMT payload. However, units such as ftyp, mmpu, moov and moof may be stored as data units in the MMT payload in units of data units. Similarly, FIG. 19 illustrates an example where sample units are stored as data units in the MMT payload. However, sample units and units of NAL units may configure data units, and these data units may be stored in the MMT payload as units of data units. Units obtained by further fragmenting such data units may be stored in the MMT payload.

[Conventional Transmitting Method, and Matter for which Countermeasure Needs to be Taken]

Conventionally, when a plurality of access units is encapsulated in an MP4 format, and at a point of time at which all samples to be stored in MP4 are ready, moov and moof are created.

When the MP4 format is transmitted in real time by way of broadcasting and when, for example, samples to be stored in one MP4 file are GOP units, time samples of the GOP units are accumulated and then moov and moof are created, and therefore the encapsulation causes a delay. Such encapsulation at the transmission side increases an End-to-End delay by a GOP unit time at all times. Thus, it is difficult to provide service in real time, and service for viewers deteriorates when live content is transmitted.

FIG. 21 are views for explaining a data transmission order. When MMT is applied to broadcasting, and when MMT packets are transmitted in an MPU configuration order (transmitted in order of MMT packets #1, #2, #3, #4, #5 and #6) as illustrated in FIG. 21A, encapsulation causes a delay during transmission of the MMT packets.

Figure 21A:
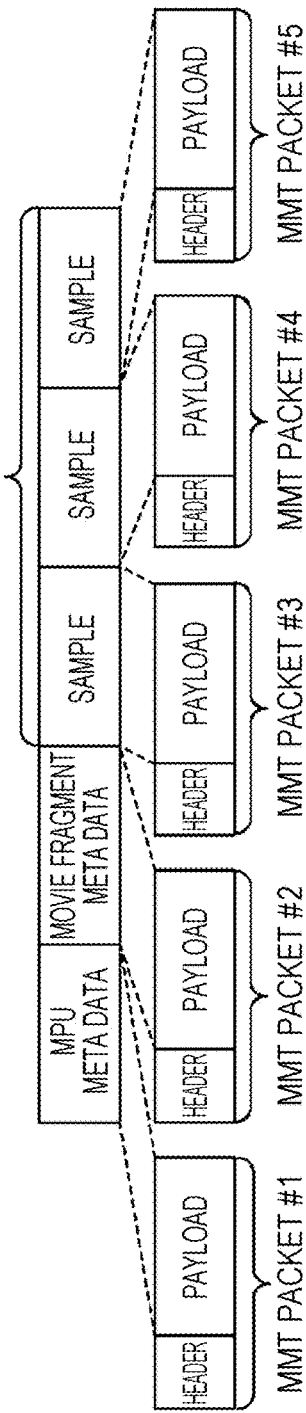
FIG. 21A is a view for explaining a data transmission order.
Figure 21B:
FIG. 21B is a view for explaining a data transmission order.

A method for not transmitting MPU header information such as MPU meta data and MF meta data (not transmitting packets #1 and #2 and transmitting packets #3 to #6 in order) as illustrated in FIG. 21B to prevent this delay caused by encapsulation has been proposed. Further, as illustrated in FIG. 20C, a method for transmitting media data in advance without waiting for creation of MPU header information, and transmitting the MPU header information (transmitting packets #3 to #6, #1 and #2 in order) after transmitting the media data may be used.

The receiving device performs decoding without using the MPU header information when MPU header information is not transmitted, or the receiving device waits for the MPU header information to be obtained, and performs decoding when the MPU header information is transmitted subsequent to media data.

However, it is not guaranteed that conventional MP4-compliant receiving devices perform decoding without using MPU header information. Further, when the receiving device uses a conventional transmitting method to perform decoding without using an MPU header by a special process, the decoding process becomes complicated, and it is highly likely that it is difficult to perform decoding in real time. Furthermore, when the receiving device waits for MPU header information to be obtained, and performs decoding, the receiving device needs to buffer media data until the receiving device obtains the header information. However, a buffer model is not defined, and decoding has not been guaranteed.

Hence, a transmitting device according to the second exemplary embodiment transmits MPU meta data prior to media data by storing common information in the MPU meta data as illustrated in FIG. 20D. Further, the transmitting device according to the second exemplary embodiment transmits, subsequent to media data, MF meta data which is generated with a delay. Thus, there is provided the transmitting method or the receiving method which can guarantee that media data is decoded.

A receiving method in a case where each transmitting method is used in FIGS. 21A to D will be described below.

According to each transmitting method illustrated in FIG. 21, first, MPU data is configured in order by data MPU meta data, MFU meta data and media data.

When the transmitting device transmits items of data in order of the MPU meta data, the MF meta data and the media data as illustrated in FIG. 21A after configuring the MPU data, the receiving device can perform decoding according to one of following methods (A-1) and (A-2).

(A-1) The receiving device obtains the MPU header information (the MPU meta data and the MF meta data), and then decodes the media data by using the MPU header information.

(A-2) The receiving device decodes the media data without using the MPU header information.

According to both of the methods, encapsulation causes a delay at the transmission side. However, there is an advantage that the receiving device does not need to buffer the media data to obtain an MPU header When the receiving device does not perform buffering, a memory for the buffering does not need to be mounted, and, moreover, a buffering delay does not occur. Further, method (A-1) is applicable to conventional receiving devices, too, since decoding is performed by using MPU header information.

When the transmitting device transmits the media data as illustrated in FIG. 21B, the receiving device can perform decoding according to following method (B-1).

(B-1) The receiving device decodes the media data without using the MPU header information.

Further, although not illustrated, when MPU meta data is transmitted before media data in FIG. 21B is transmitted, it is possible to perform decoding according to following method (B-2).

(B-2) The receiving device decodes media data by using MPU meta data.

Both of above methods (B-1) and (B-2) have an advantage that encapsulation does not cause a delay at the transmitting side and it is not necessary to buffer media data to obtain an MPU header. However, according to both of methods (B-1) and (B-2), decoding is not performed by using MPU header information, and therefore it may be necessary to perform special processing for decoding.

Figure 21C:
FIG. 21C is a view for explaining a data transmission order.

When the transmitting device transmits items of data in order of media data, MPU meta data, and MF meta data as illustrated in FIG. 21C, the receiving device can perform decoding according to one of following methods (C-1) and (C-2).

(C-1) The receiving device obtains the MPU header information (the MPU meta data and the MF meta data), and then decodes the media data.

(C-2) The receiving device decodes the media data without using the MPU header information.

However, when above method (C-1) is used, it is necessary to buffer the media data to obtain MPU header information. By contrast with this, when above method (C-2) is used, it is not necessary to perform buffering to obtain the MPU header information.

Further, according to both of above methods (C-1) and (C-2), encapsulation does not cause a delay at the transmission side. Furthermore, according to above (D-2) method, the MPU header information is not used, and therefore it may be necessary to perform a special process.

Figure 21D:
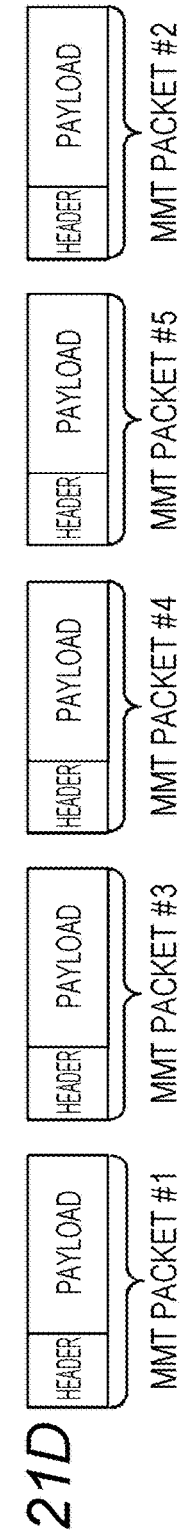
FIG. 21D is a view for explaining a data transmission order.

When the transmitting device transmits items of data in order of MPU meta data, media data and MF meta data as illustrated in FIG. 21D, the receiving device can perform decoding according to one of following methods (D-1) and (D-2).

(D-1) The receiving device obtains MPU meta data, then further obtains MF meta data and subsequently decodes media data.

(D-2) The receiving device obtains the MPU meta data, and then decodes media data without using the MF meta data.

While, when above method (D-1) is used, it is necessary to buffer the media data to obtain the MF meta data, it is not necessary to perform buffering to obtain the MF meta data in the case of above method (D-2).

According to above (D-2) method, decoding is not performed by using MF meta data, and therefore it may be necessary to perform a special process.

As described above, there is an advantage that, when it is possible to perform decoding by using MPU meta data and MF meta data, even conventional MP4 receiving devices can perform decoding.

In addition, in FIG. 21, the MPU data is configured in order of the MPU meta data, the MFU meta data and the media data, and, in moof, position information (offset) of each sample or each subsample is defined in moof based on this configuration. Further, the MF meta data includes data (a size or a type of box), too, other than media data in mdat box.

Hence, when the receiving device specifies the media data based on the MF meta data, the receiving device reconfigures data in an MPU data configuration order irrespectively of a data transmission order, and then performs decoding by using the moov of the MPU meta data or moof of the MF meta data.

In addition, in FIG. 21, the MPU data is configured in order by the MPU meta data, the MFU meta data and the media data. However, the MPU data may be configured in a different order from that in FIG. 21, and position information (offset) may be defined.

For example, MPU data may be configured in order of MPU meta data, media data and MF meta data, and negative position information (offset) may be indicated in MF meta data. In this case, too, irrespectively of a data transmission order, the receiving device reconfigures items of data in an MPU data configuration order at the transmission side, and then performs decoding by using moov or moof.

In addition, the transmitting device may signal information indicating an MPU data configuration order, and the receiving device may reconfigure data based on the signaled information.

As described above, as illustrated in FIG. 21D, the receiving device receives the packetized MPU meta data, the packetized media data (sample data) and the packetized MF meta data in order. In this regard, the MPU meta data is an example of first meta data, and the MF meta data is an example of second meta data.

Next, the receiving device reconfigures the MPU data (MP4 format file) including the received MPU meta data, the received MF meta data and the received sample data. Further, the receiving device decodes the sample data included in the reconfigured MPU data by using the MPU meta data and the MF meta data. The MF meta data is meta data including data (e.g., length stored in mbox) which can be generated after the transmission side generates sample data.

In addition, more specifically, operations of the above receiving device are performed by each component which composes the receiving device. For example, the receiving device includes a receiver which receives the data, a reconfiguring unit which reconfigures the MPU data, and a decoder which decodes the MPU data. In addition, each of the receiver, the generator and the decoder is realized by a microcomputer, a processor or a dedicated circuit.

[Method for Performing Decoding without Using Header Information]

Next, a method for performing decoding without using header information will be described. Hereinafter, a method for performing decoding without using header information in the receiving device irrespectively of whether or not the transmission side transmits the header information will be described. That is, this method is applicable to a case where each transmitting method described with reference to FIG. 21 are used, too. In this regard, part of decoding methods is applicable in the case of a specific transmitting method.

Figure 22:
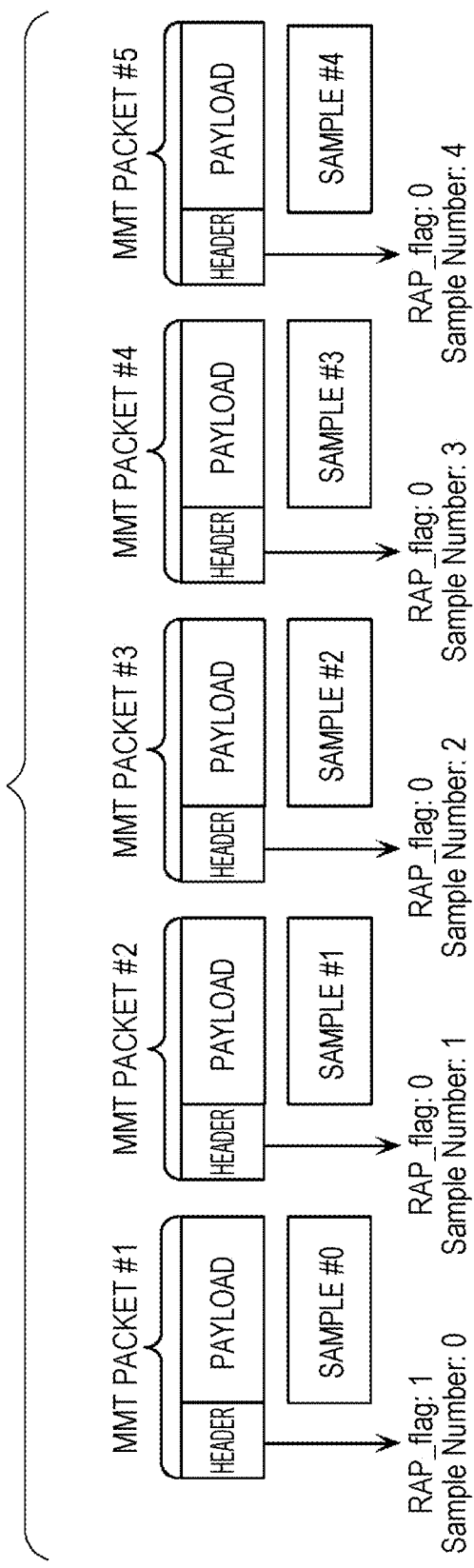
FIG. 22 is a view illustrating an example of a method for performing decoding without using header information.

FIG. 22 is a view illustrating an example of a method for performing decoding without using header information. FIG. 22 illustrates MMT payloads and MMT packets including media data, and does not illustrate MMT payloads and MMT packets including MPU meta data and MF meta data. Further, as described below with reference to FIG. 22, media data belonging to the same MPU is continuously transferred. Furthermore, a case where each sample is stored as media data in each payload will be described as an example. In the following description of FIG. 22, an NAL unit may be stored or fragmented NAL units may be stored.

The receiving device needs to first obtain initialization information necessary for decoding to decode media data. Further, when a medium is a video, the receiving device needs to obtain initialization information of each sample, specify a start position of an MPU which is a random access unit and obtain start positions of a sample and an NAL unit. Furthermore, the receiving device needs to specify a decoding time (DTS) and a presentation time (PTS) of each sample.

Hence, the receiving device can perform decoding by, for example, using the following method without using header information. In addition, when units of NAL units or units obtained by fragmenting NAL units are stored in a payload, a "sample" in the following description needs to be read as "an NAL unit of a sample".

<Random Access (=to Specify Head Sample of MPU)>

When header information is not transmitted, there are following method 1 and method 2 to enable the receiving device to specify a head sample of an MPU. In addition, when header information is transmitted, method 3 can be used.

[Method 1] The receiving device obtains a sample included in an MMT packet of 'RAP_flag=1' in an MMT packet header.

[Method 2] The receiving device obtains a sample of 'sample number=0' in an MMT payload header.

[Method 3] When at least one of MPU meta data and MF meta data is transmitted at least before or after media data, the receiving device obtains a sample included in an MMT payload whose fragment type (FT) in the MMT payload header has been switched to media data.

In addition, according to method 1 and method 2, when there is a mix of a plurality of samples belonging to different MPUs in one payload, it is not possible to determine which NAL unit is a random access point (RAP_flag=1 or sample number=0). Hence, it is necessary to set a limitation that samples of different MPUs are not mixed in one payload, or a limitation that, when samples of different MPUs are mixed in one payload, and a last (or first) sample is a random access point, RAP_flag is 1.

Further, the receiving device needs to shift a pointer by reading data corresponding to the NAL unit size in order from a head NAL unit of a sample to obtain a start position of the NAL unit.

When data is fragmented, the receiving device can specify a data unit by referring to fragment_indicator or fragment_number.

<Determination of DTS of Sample>

A method for determining a DTS of a sample includes following method 1 and method 2.

[Method 1] The receiving device determines a DTS of a head sample based on a predicted structure. In this regard, according to this method, it is necessary to analyze encoded data and it is difficult to decode the encoded data in real time, and therefore next method 2 is desirable.

[Method 2] The receiving device additionally transmits a DTS of a head sample, and obtains a DTS of the transmitted head sample. Transmitting methods for transmitting a DTS of a head sample include, for example, a method for transmitting a DTS of an MPU head sample by using MMT-SI (MMT-Signaling Information), and a method for transmitting a DTS of each sample by using an MMT packet header extended area. In addition, the DTS may be an absolute value or a relative value with respect to a PTS. Further, signaling whether or not a DTS of the head sample is included in the transmission side may be performed.

In addition, according to both of method 1 and method 2, DTSs of subsequent samples are calculated as a fixed frame rate.

Methods for storing a DTS of each sample in a packet header include a method for using an extended area and, in addition, a method for storing a DTS of a sample included in an MMT packet, in an NTP (Network Time Protocol) time stamp field of 32 bits in an MMT packet header. When a DTS cannot be expressed as a number of bits (32 bits) of one packet header, a DTS may be expressed by using a plurality of packet headers or a DTS may be expressed by combining an NTP time stamp field of a packet header and an extended area. When DTS information is not included, a known value (e.g. ALL0) is used.

<Determination of PTS of Sample>

The receiving device obtains a PTS of a head sample from an MPU time stamp descriptor of each asset included in an MPU. The receiving device calculates PTSs of subsequent samples from parameters indicating a sample display order such as a POC (Proof Of Concept) assuming a fixed frame rate. Thus, to calculate a DTS and a PTS without using header information, it is necessary to perform transmission at a fixed frame rate.

Further, when MF meta data is transmitted, the receiving device can calculate absolute values of a DTS and a PTS based on relative time information of the DTS or the PTS of the head sample indicated in the MF meta data, and an absolute value of a time stamp of an MPU head sample indicated in an MPU time stamp descriptor.

In addition, when a DTS and a PTS are calculated by analyzing encoded data, the receiving device may calculate the DTS and the PTS by using SEI information included in an access unit.

<Initialization Information (Parameter Sets)>

[In the Case of Video]

In the case of a video, parameter sets are stored in sample data. Further, it is guaranteed that, when MPU meta data and MF meta data are not transmitted, it is possible to obtain necessary parameter sets for decoding by referring to sample data.

Further, as illustrated in FIG. 21A and FIG. 21D, it may be defined that, when MPU meta data is transmitted prior to media data, parameter sets are not stored in SampleEntry. In this case, the receiving device refers to the parameter sets in a sample without referring to the parameter sets of SampleEntry.

Further, when MPU meta data is transmitted prior to media data, parameter sets which are common between MPUs and default parameter sets are stored in SampleEntry, and the receiving device may refer to parameter sets of Sample Entry and parameter sets in a sample. The parameter sets are stored in SampleEntry, so that even conventional receiving devices can perform decoding when there are no parameter sets in SampleEntry.

[In the Case of Audio]

In the case of an audio, an LATM (Low Overhead Audio Transport Multiplex) header is necessary for decoding, and, according to MP4, an LATM header needs to be included in a sample entry. However, when header information is not transmitted, it is difficult for the receiving device to obtain an LATM header, and therefore the LATM header is additionally included in control information such as SI. In addition, an LATM header may be included in a message, a table or a descriptor. In addition, an LATM header is included in a sample in some cases.

The receiving device obtains the LATM header from the SI before starting decoding, and starts decoding an audio. Alternatively, as illustrated in FIG. 21A and FIG. 21D, when MPU meta data is transmitted prior to media data, the receiving device can receive an LATM header prior to the media data. Consequently, when the MPU meta data is transmitted prior to the media data, it is possible to perform decoding even by using conventional receiving devices.

<Others>

A transmission order or a transmission order type may be notified as an MMT packet header, a payload header, an MPT or control information such as another table, a message or a descriptor. In addition, the transmission order type described herein is, for example, four types of transmission orders in FIGS. 21 A to D, and needs to be stored in a location from which each identifier for identifying each type can be obtained before decoding starts.

Further, for the transmission order types, different types between an audio and a video may be used, or common types between an audio and a video may be used. More specifically, for example, an audio is transmitted in order of MPU meta data, MF meta data, and media data as illustrated in FIG. 21A, and a video may be transmitted in order of MPU meta data, media data and MF meta data as illustrated in FIG. 21D.

According to the above-described method, the receiving device can perform decoding without using header information. Further, when MPU meta data is transmitted prior to media data (FIG. 21A and FIG. 21D), even conventional receiving devices can perform decoding.

Particularly when MF meta data is transmitted subsequent to media data (FIG. 21D), encapsulation does not cause a delay and even conventional receiving devices can perform decoding.

[Configuration and Operation of Transmitting Device]

Figure 23:
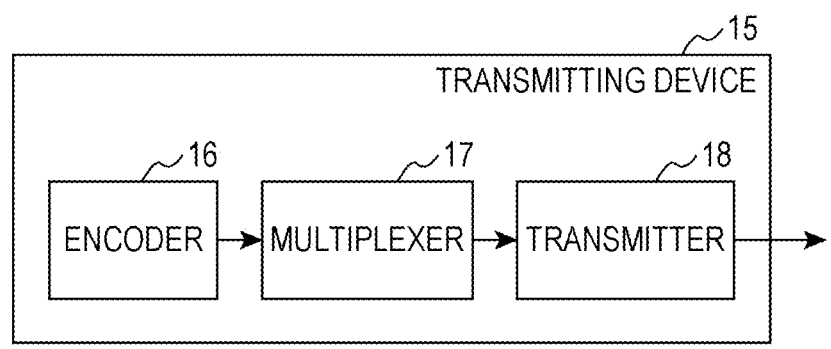
FIG. 23 is a block diagram of a transmitting device according to a second exemplary embodiment.
Figure 24:
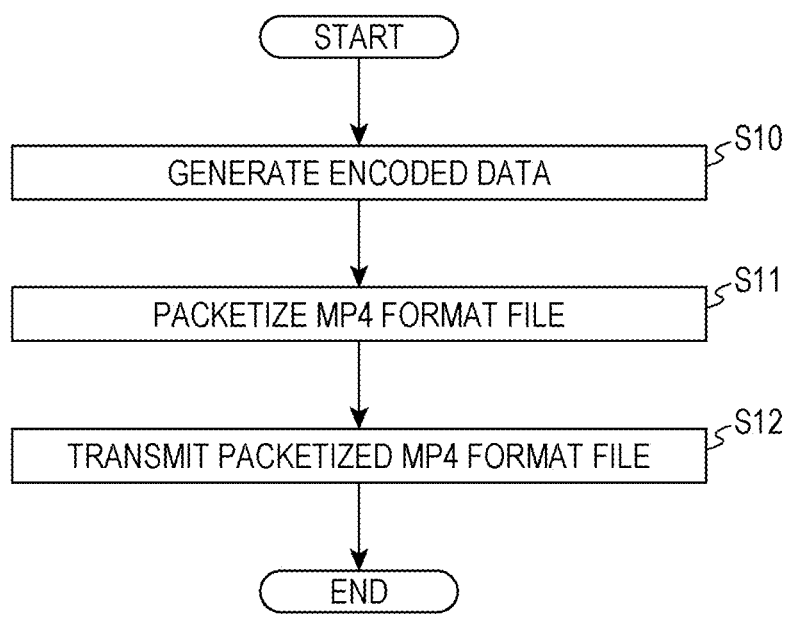
FIG. 24 is a flowchart of a transmitting method according to the second exemplary embodiment.

Next, a configuration and an operation of the transmitting device will be described. FIG. 23 is a block diagram of the transmitting device according to a second exemplary embodiment, and FIG. 24 is a flowchart illustrating a transmitting method according to the second exemplary embodiment.

As illustrated in FIG. 23, transmitting device 15 includes encoder 16, multiplexer 17 and transmitter 18.

Encoder 16 generates encoded data by encoding an encoding target video or audio according to, for example, H.265 (510).

Multiplexer 17 multiplexes (packetizes) the encoded data generated by encoder 16 (511). More specifically, multiplexer 17 packetizes each of sample data, MPU meta data and MF meta data configuring an MP4 format file. The sample data is data obtained by encoding a video signal or an audio signal, the MPU meta data is an example of first meta data and the MF meta data is an example of second meta data. The first meta data and the second meta data are each meta data used for decoding sample data, and differ in that the second meta data includes data which can be generated after the sample data is generated.

In this regard, the data which can be generated after the sample data is generated is, for example, data other than the sample data which is stored in mdat of an MP4 format (data in a header of mdat, i.e., type and length illustrated in FIG. 20). In this regard, the second meta data may include length which is at least part of this data.

Transmitter 18 transmits the packetized MP4 format file (S12). Transmitter 18 transmits the MP4 format file according to, for example, the method illustrated in FIG. 21D. That is, transmitter 18 transmits the packetized MPU meta data, the packetized sample data and the packetized MF meta data in this order.

In addition, each of encoder 16, multiplexer 17 and transmitter 18 is realized by a microcomputer, a processor or a dedicated circuit.

[Configuration of Receiving Device]

Figure 25:
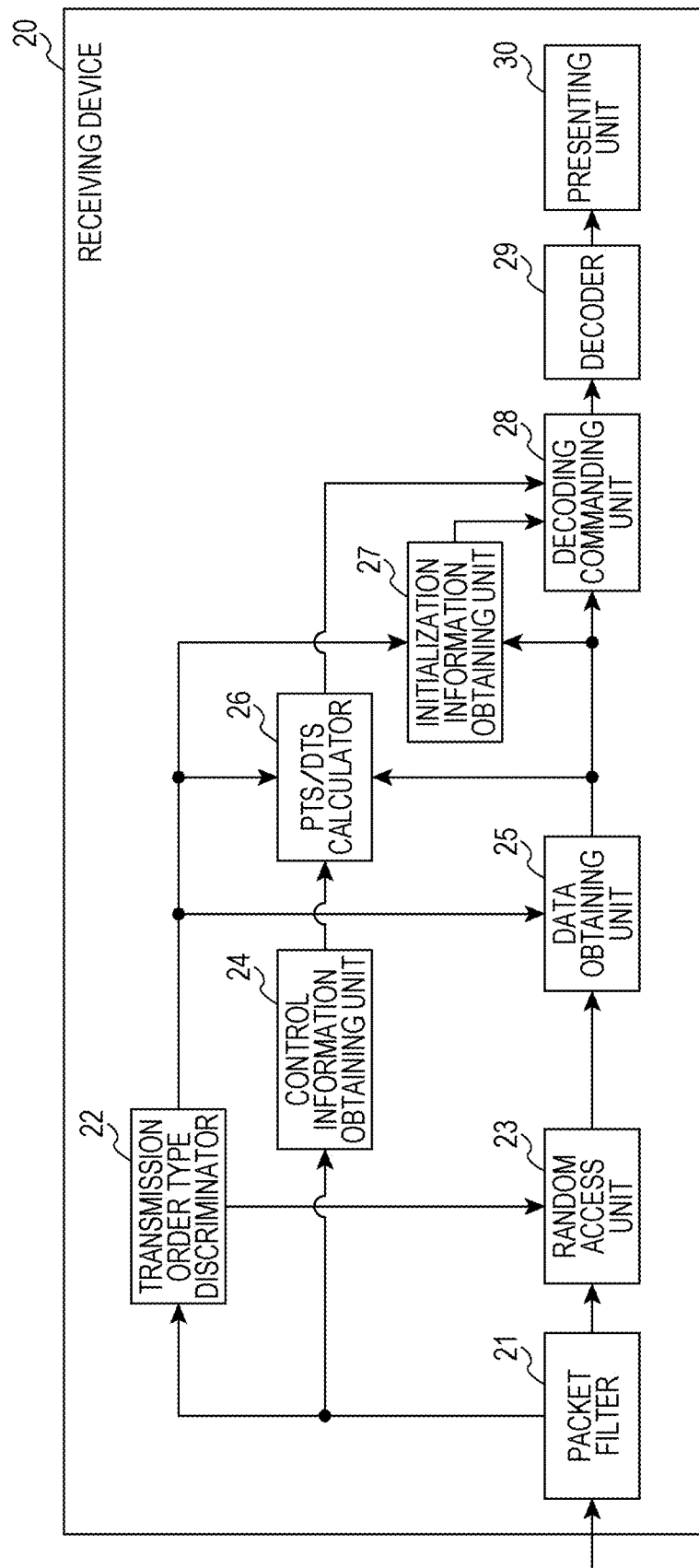
FIG. 25 is a block diagram of a receiving device according to the second exemplary embodiment.

Next, a configuration and an operation of the receiving device will be described. FIG. 25 is a block diagram of the receiving device according to the second exemplary embodiment.

As illustrated in FIG. 25, receiving device 20 includes a packet filter 21, transmission order type discriminator 22, random access unit 23, control information obtaining unit 24, data obtaining unit 25, PTS/DTS calculator 26, initialization information obtaining unit 27, decoding commanding unit 28, decoder 29 and presenting unit 30.

[Operation 1 of Receiving Device]

Figure 26:
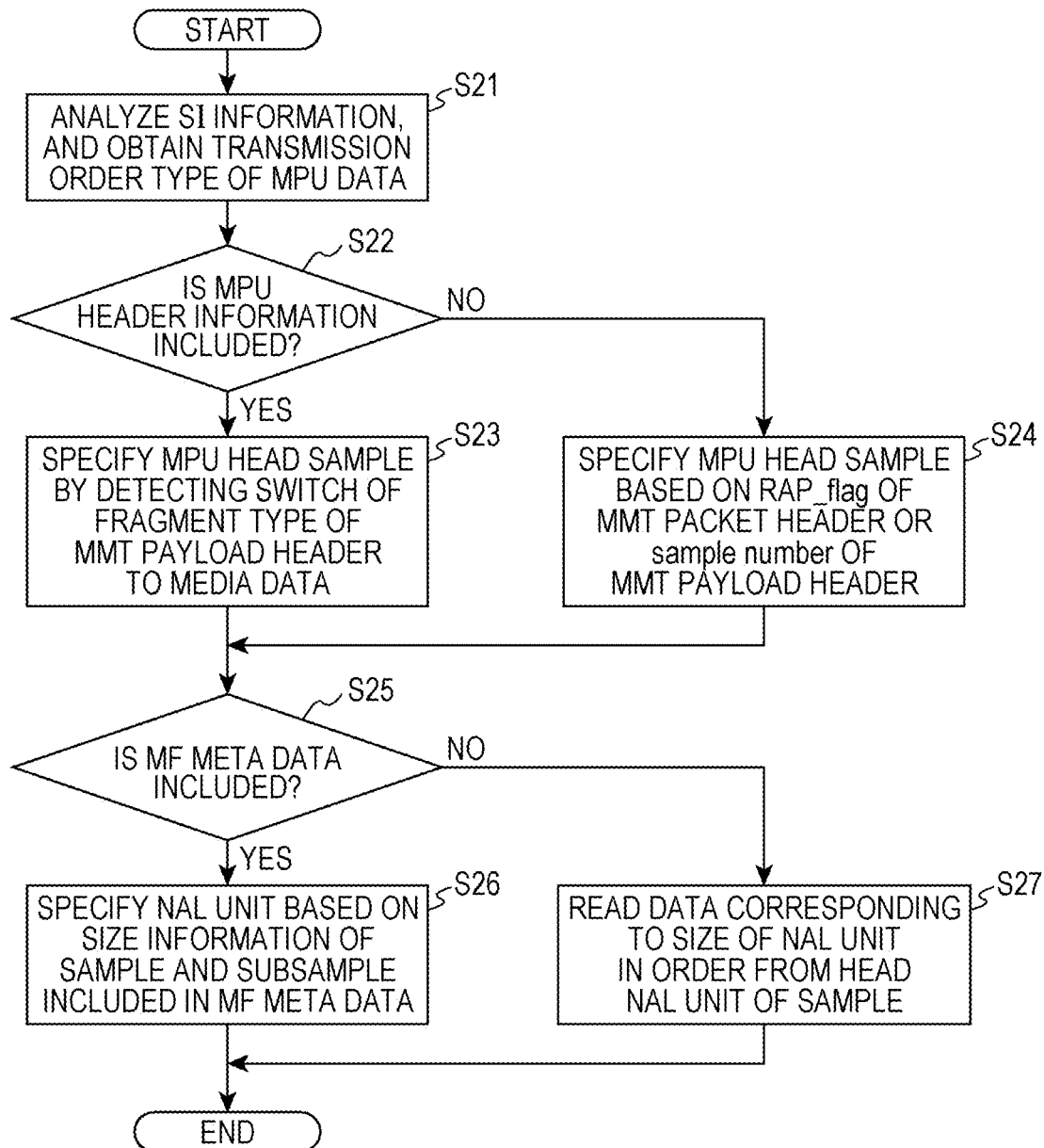
FIG. 26 is a flowchart of an operation of specifying an MPU head position and an NAL (Network Adaptation Layer) unit position.

First, an operation of specifying an MPU head position and an NAL unit position in receiving device 20 in a case where a medium is a video will be described. FIG. 26 is a flowchart illustrating such an operation of receiving device 20. In addition, an MPU data transmission order type is stored in SI information by transmitting device 15 (multiplexer 17).

First, packet filter 21 packet-filters a received file. Transmission order type discriminator 22 analyzes SI information obtained by the packet filtering, and obtains the MPU data transmission order type (S21).

Next, transmission order type discriminator 22 determines (discriminates) whether or not the packet-filtered data includes MPU header information (at least one of MPU meta data or MF meta data) (S22). When the data includes the MPU header information (Yes in S22), random access unit 23 specifies an MPU head sample by detecting a switch of a fragment type of an MMT payload header to media data (S23).

Meanwhile, when the data does not include the MPU header information (No in S22), random access unit 23 specifies an MPU head sample based on RAP_flag of the MMT packet header or sample number of an MMT payload header (S24).

Further, transmission order type discriminator 22 determines whether or not the packet-filtered data includes MF meta data (S25). When it is determined that the data includes the MF data (Yes in S25), data obtaining unit 25 obtains an NAL unit by the reading NAL unit based on an offset of a sample or a subsample and size information included in the MF meta data (S26). Meanwhile, when it is determined that the data does not include the MF meta data (No in S25), data obtaining unit 25 obtains an NAL unit by reading data of an NAL unit size in order from a head NAL unit of the sample (S27).

In addition, even when it is determined in step S22 that the data includes the MPU header information, receiving device 20 may specify an MPU head sample by using the processing in step S24 instead of step S23. Further, when it is determined that the data includes the MPU header information, the processing in step S23 and the processing in step S24 may be used in combination.

Furthermore, even when it is determined in step S25 that the data includes the MF meta data, receiving device 20 may obtain an NAL unit by using the processing in step S27 without using the processing in step S26. Still further, when it is determined that the data includes the MF meta data, the processing in step S23 and the processing in step S24 may be used in combination.

Further, it is assumed that it is determined in step S25 that the data includes MF meta data and the MF meta data is transmitted subsequent to the media data. In this case, the receiving device 20 may buffer the media data, waits for the MF meta data to be obtained and then perform the process in step S26 or receiving device 20 may determine whether or not to perform the process in step S27 without waiting for the MF meta data to be obtained.

For example, receiving device 20 may determine whether or not to wait for the MF meta data to be obtained based on whether or not receiving device 20 includes a buffer of a buffer size which can buffer the media data. Further, receiving device 20 may determine whether or not to wait for the MF meta data to be obtained based on whether or not an End-to-End delay becomes little. Furthermore, receiving device 20 may perform decoding processing by mainly using the processing in step S26, and use the processing in step S27 in a processing mode in a case where packet loss occurs.

In addition, in the case of a predetermined transmission order type, step S22 and step S26 may be skipped, and, in this case, receiving device 20 may determine a method for specifying an MPU head sample and a method for specifying an NAL unit by taking into account a buffer size or an End-to-End delay.

In addition, when a transmission order type is known in advance, receiving device 20 does not need transmission order type discriminator 22.

Further, although not illustrated with reference to FIG. 26, decoding commanding unit 28 outputs to decoder 29 data obtained by the data obtaining unit based on a PTS and a DTS calculated by PTS/DTS calculator 26 and initialization information obtained by initialization information obtaining unit 27. Decoder 29 decodes the data, and presenting unit 30 presents the decoded data.

[Operation 2 of Receiving Device]

Figure 27:
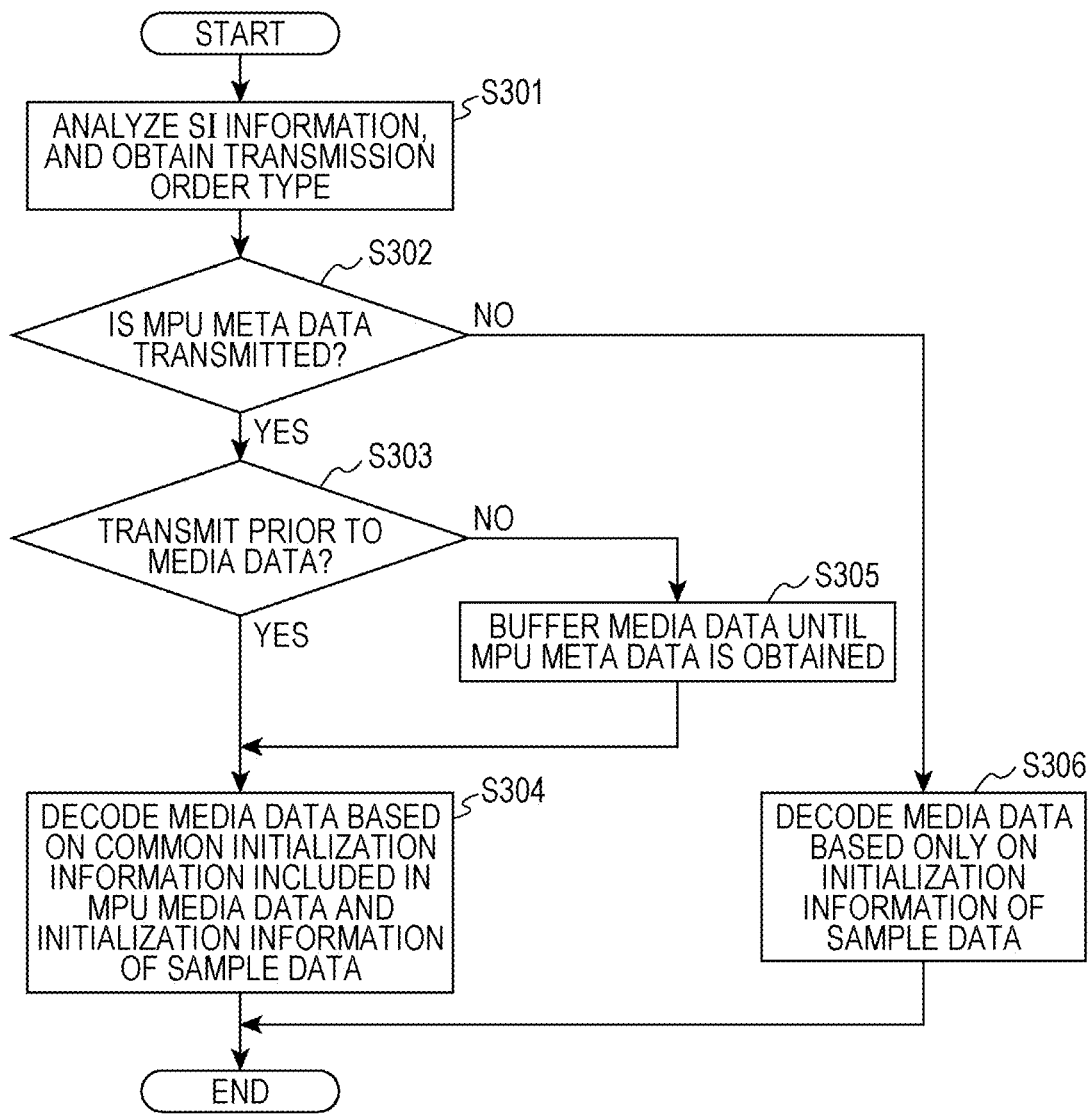
FIG. 27 is a view of a flowchart of an operation of obtaining initialization information based on a transmission order type, and decoding media data based on the initialization information.

Next, an operation of obtaining initialization information based on a transmission order type, and decoding media data based on initialization information in receiving device 20 will be described. FIG. 27 is a flowchart illustrating such an operation.

First, packet filter 21 packet-filters a received file. Transmission order type discriminator 22 analyzes SI information obtained by the packet filtering, and obtains a transmission order type (S301).

Next, transmission order type discriminator 22 determines whether or not MPU meta data has been transmitted (S302). When it is determined that the MPU meta data has been transmitted (Yes in S302), transmission order type discriminator 22 determines whether or not the MPU meta data has been transmitted prior to the media data as a result of analysis in step S301 (S303). In a case where the MPU meta data has been transmitted prior to the media data (Yes in S303), initialization information obtaining unit 27 decodes the media data based on common initialization information included in the MPU meta data and initialization information of sample data (S304).

Meanwhile, when it is determined that the MPU meta data has been transmitted subsequent to the media data (No in S303), data obtaining unit 25 buffers the media data until the MPU meta data is obtained (S305), and performs the processing in step S304 after the MPU meta data is obtained.

Further, when it is determined in step S302 that the MPU meta data has not been transmitted (No in S302), initialization information obtaining unit 27 decodes the media data based on the initialization information of the sample data (S306).

In addition, when it is guaranteed that the transmission side can decode the media data based on the initialization information of the sample data, the processing in step S306 is used without performing processing based on the determination in step S302 and step S303.

Further, receiving device 20 may determine whether or not to buffer the media data before step S305. In this case, receiving device 20 moves to the processing in step S305 when determining to buffer the media data, and moves to the processing in step S306 when determining not to buffer the media data. Whether or not to buffer the media data may be performed based on a buffer size and an occupied amount of receiving device 20 or may be determined by taking into account an End-to-End delay by, for example, selecting a less End-to-End delay.

[Operation 3 of Receiving Device]

Hereinafter, a transmitting method and a receiving method in a case where MF meta data is transmitted subsequent to media data (FIG. 21C and FIG. 21D) will be described in detail. Hereinafter, a case of FIG. 21D will be described as an example. In addition, the method in FIG. 21D is used for transmission, and a transmission order type is not signaled.

As described above, when items of data are transmitted in order of MPU meta data, media data and MF meta data as illustrated in FIG. 21D, (D-1) receiving device 20 obtains the MPU meta data, then further obtains the MF meta data and subsequently decodes the media data.

(D-2) Receiving device 20 obtains the MPU meta data, and then decodes the media data without using the MF meta data.

The above two decoding methods are provided.

In this regard, according to D-1, it is necessary to buffer the media data to obtain the MF meta data; however, it is possible to perform decoding by using MPU header information. Further, according to D-2, it is not necessary to buffer the media data to obtain the MF meta data; however, it is not possible to perform decoding by using the MF meta data, and therefore it is necessary to perform special processing for decoding.

Further, according to the method in FIG. 21D, the MF meta data is transmitted subsequent to the media data, and therefore it is possible to provide an advantage that encapsulation does not cause a delay and it is possible to reduce an End-to-End delay.

Receiving device 20 can select the above two types of decoding methods according to performance of receiving device 20 and service quality provided by receiving device 20.

Transmitting device 15 needs to guarantee that it is possible to reduce occurrence of an overflow or an underflow of a buffer and perform decoding in a decoding operation of receiving device 20. For an element which defines a decoder model for performing decoding by using method D-1, the following parameter can be used, for instance.

Buffer Size (MPU Buffer) for Reconfiguring MPU

For example, buffer size=maximum rate×maximum MPU time×α holds, and the maximum rate is upper limit rate of profile and level of encoded data+overhead of MPU header. Further, a maximum MPU time is a maximum time length of a GOP in case of 1 MPU=1 GOP (video).

In this regard, the audio may be a GOP unit which is common between videos, or may be another unit. α represents a margin for not causing an overflow, and may be multiplied on or added to maximum rate× maximum MPU time. In the case of multiplication, $\alpha \geq 1$ holds, and, in the case of addition, $\alpha \geq 0$ holds.

An Upper Limit of a Decoding Delay Time Until Data is Decoded after the Data is Input to the MPU Buffer. (TSTD-_Delay in STD (System Target Decoder) of Mpeg-Ts)

For example, during transmission, a DTS is set such that obtaining completion time of MPU data in receiver<=DTS holds, by taking into account a maximum MPU time and an upper limit value of a decoding delay time.

Further, transmitting device 15 may allocate a DTS and a PTS according to a decoder model for performing decoding by using method D-1. Thus, transmitting device 15 may guarantee decoding for the receiving device which performs decoding by using method D-1, and transmit auxiliary information which is necessary to perform decoding by using method D-2.

For example, transmitting device 15 can guarantee an operation of the receiving device which performs decoding by using method D-2 by signaling a pre-buffering time in a decoder buffer when performing decoding by using method D-2.

The pre-buffering time may be included in SI control information such as a message, a table or a descriptor, or may be included in a header of an MMT packet or an MMT payload. Further, SEI in encoded data may be overwritten. A DTS and a PTS for performing decoding by using method D-1 may be stored in an MPU time stamp descriptor and SampleEntry, and a DTS and a PTS for performing decoding by using method D-2 or a pre-buffering time may be described in SEI.

Receiving device 20 may select decoding method D-1 when receiving device 20 supports an MP4-compliant decoding operation which uses an MPU header, and may select one of methods D-1 and D-2 when receiving device 20 supports both of the methods D-1 and D-2.

Transmitting device 15 may allocate a DTS and a PTS to guarantee one decoding operation (D-1 in this description), and further transmit auxiliary information for assisting the one decoding operation.

Further, End-to-End delay in method D-2 is likely to be great due to a delay caused by pre-buffering of MF meta data compared to that in method D-1. Hence, receiving device 20 may select method D-2 and perform decoding to reduce an End-to-End delay. For example, receiving device 20 may use method D-2 at all times to reduce an End-to-End delay at all times. Further, receiving device 20 may use method D-2 when operating in a low delay presentation mode for presenting live content, channel selection or a zapping operation with a low delay.

Figure 28:
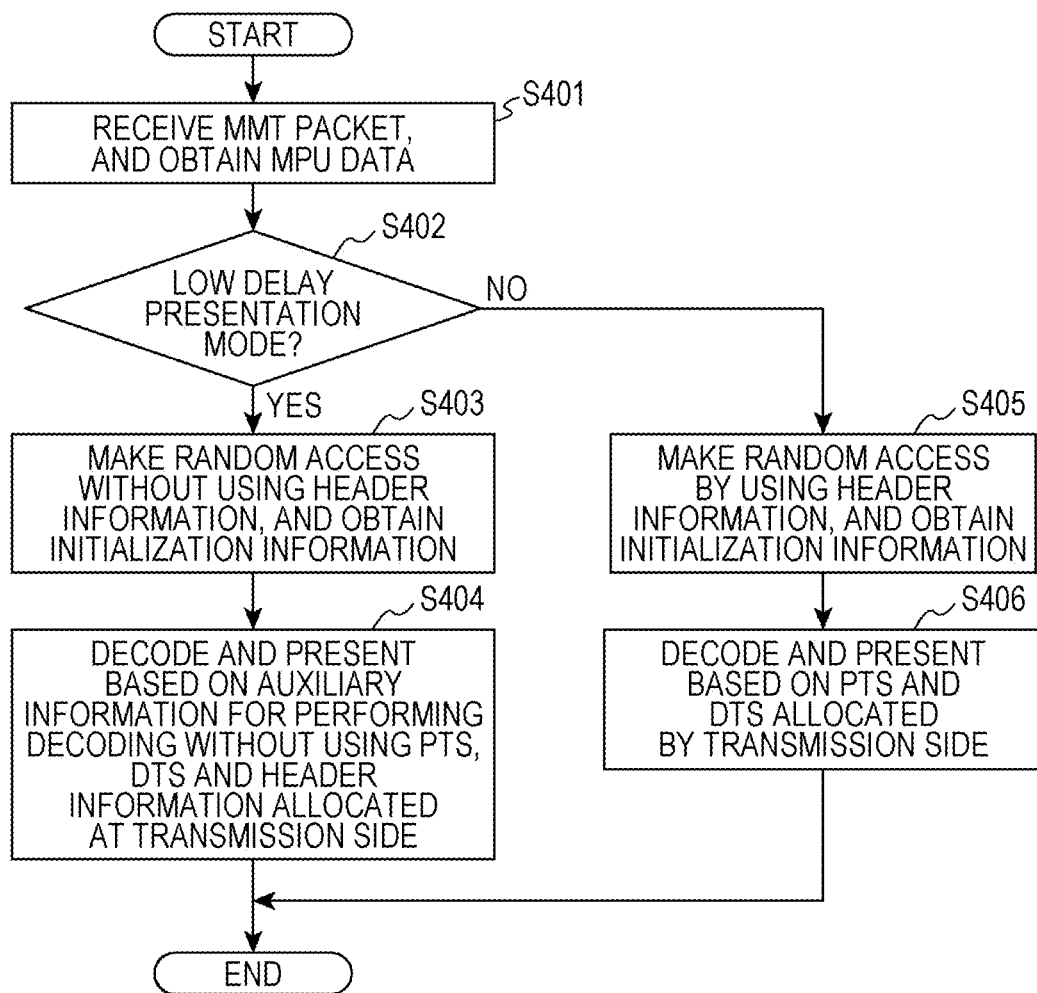
FIG. 28 is a flowchart of an operation of the receiving device in case where low delay presentation mode is provided.

FIG. 28 is a flowchart illustrating such a receiving method.

First, receiving device 20 receives an MMT packet, and obtains MPU data (S401). Further, receiving device 20 (transmission order type discriminator 22) determines whether or not to present the program in the low delay presentation mode (S402).

When not presenting the program in the low delay presentation mode (No in S402), receiving device 20 (random access unit 23 and initialization information obtaining unit 27) makes a random access unit by using header information and obtains initialization information (S405). Further, receiving device 20 (PTS/DTS calculator 26, decoding commanding unit 28, decoder 29 and presenting unit 30) performs decoding and presentation processing based on a PTS and a DTS allocated by a transmission side (S406).

Meanwhile, when presenting the program in the low delay presentation mode (Yes in S402), receiving device 20 (random access unit 23 and initialization information obtaining unit 27) makes a random access by using a decoding method which does not use header information, and obtains initialization information (S403). Further, receiving device 20 performs decoding and the presentation processing based on auxiliary information for performing decoding without using a PTS and a DTS allocated by the transmission side and header information (S404). In addition, in step S403 and step S404, processing may be performed by using MPU meta data.

[Transmitting and Receiving Methods Using Auxiliary Data]

The transmitting and receiving operations in a case where MF meta data is transmitted subsequent to media data (FIG. 21C and FIG. 21D) will be described above. Next, a method for enabling transmitting device 15 to start decoding earlier by transmitting auxiliary data including a function of part of MF meta data and to reduce an End-to-End delay will be described. Hereinafter, an example where auxiliary data is further transmitted based on the transmitting method illustrated in FIG. 21D will be described. However, a method using auxiliary data is applied to the transmitting methods illustrated in FIGS. 21A to C.

FIG. 29A is a view illustrating an MMT packet transmitted by using the method illustrated in FIG. 21D. That is, items of data are transmitted in order of MPU meta data, media data and MF meta data.

In this regard, sample #1, sample #2, sample #3 and sample #4 are samples included in the media data. In addition, an example where media data is stored in sample units in an MMT packet will be described. The media data may be stored in units of NAL units in an MMT packet or may be stored in units obtained by dividing an NAL unit. In addition, a plurality of NAL units is aggregated and is stored in an MMT packet in some cases.

As described above with reference to method D-1, in the case of the method illustrated in FIG. 21D, i.e., when items of data are transmitted in order of MPU meta data, media data and MF meta data, the MPU meta data is obtained, then the MF meta data is further obtained and then the media data is decoded. According to such method D-1, it is necessary to buffer the media data for obtaining the MF meta data; however, decoding is performed by using MPU header information. Consequently, method D-1 is applicable to conventional MP4-compliant receiving devices, too. Meanwhile, receiving device 20 needs to wait for decoding to start until MF meta data is obtained.

By contrast with this, as illustrated in FIG. 29B, according to a method using auxiliary data, auxiliary data is transmitted prior to MF meta data.

MF meta data includes DTSs or PTSs of all samples included in a movie fragment, and information indicating an offset and a size. By contrast with this, auxiliary data includes DTSs or PTSs of part of samples among samples included in a movie fragment, and information indicating an offset and a size.

For example, while MF meta data includes information of all samples (sample #1 to sample #4), auxiliary data includes information of part of samples (samples #1 and #2).

In a case illustrated in FIG. 29B, sample #1 and sample #2 can be decoded by using the auxiliary data, so that an End-to-End delay is little compared to transmitting method D-1. In addition, information of samples may be combined in any way and may be included in the auxiliary data or the auxiliary data may be repeatedly transmitted.

For example, as illustrated in FIG. 29C, transmitting device 15 imparts information of sample #1 to the auxiliary information when transmitting the auxiliary information at timing A, and imparts pieces of information of sample #1 and sample #2 to the auxiliary information when transmitting the auxiliary information at timing B. When transmitting the auxiliary information at timing C, transmitting device 15 imparts pieces of information of sample #1, sample #2 and sample #3 to the auxiliary information.

In addition, MF meta data includes pieces of information of sample #1, sample #2, sample #3 and sample #4 (information of all samples in a movie fragment).

The auxiliary data does not necessarily need to be immediately transmitted after being generated.

In addition, a type indicating that the auxiliary data is stored is specified in a header of an MMT packet or an MMT payload.

When, for example, auxiliary data is stored in an MMT payload by using an MPU mode, a data type indicating auxiliary data is specified as a fragment_type field value (e.g. FT=3). The auxiliary data may be data based on a configuration of moof, or employ another configuration.

When the auxiliary data is stored as a control signal (a descriptor, a table and a message) in an MMT payload, a descriptor tag, a table ID and a message ID indicating the auxiliary data are specified.

Further, a PTS or a DTS may be stored in a header of an MMT packet or an MMT payload.

[Generation Example of Auxiliary Data]

An example where the transmitting device generates auxiliary data based on a configuration of moof will be described below. FIG. 30 are views for explaining an example where the transmitting device generates auxiliary data based on a configuration of moof.

According to general MP4, as illustrated in FIG. 20, moof is created for each movie fragment. moof includes a DTS or a PTS of a sample included in each movie fragment, and information indicating an offset or a size.

In this regard, transmitting device 15 configures MP4 (MP4 file) by using part of items of sample data among items of sample data configuring an MPU, and generates auxiliary data.

Figure 30A:
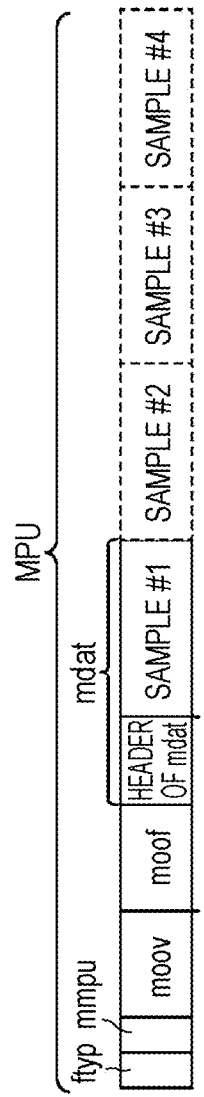
FIG. 30A is a view for explaining an example where the transmitting device generates auxiliary data based on a configuration of moof.

As illustrated in, for example, FIG. 30A, transmitting device 15 generates MP4 by using sample #1 among samples #1 to #4 configuring an MPU, and uses a header of moof+mdat as auxiliary data.

Figure 30B:
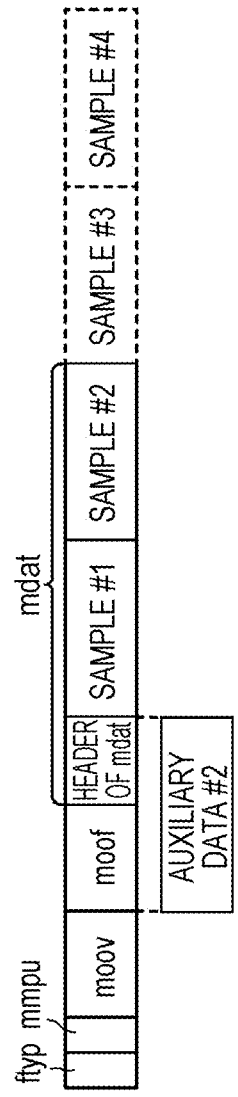
FIG. 30B is a view for explaining an example where the transmitting device generates auxiliary data based on a configuration of moof.

Next, as illustrated in FIG. 30B, transmitting device 15 generates MP4 by using sample #1 and sample #2 among samples #1 to #4 configuring the MPU, and a header of moof+mdat as next auxiliary data.

Figure 30C:
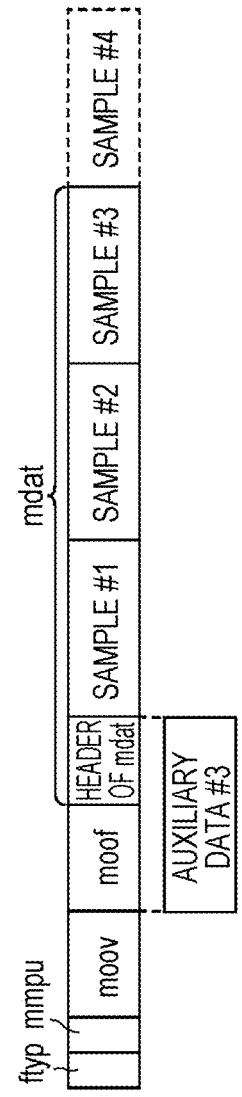
FIG. 30C is a view for explaining an example where the transmitting device generates auxiliary data based on a configuration of moof.

Next, as illustrated in FIG. 30C, transmitting device 15 generates MP4 by using sample #1, sample #2 and sample #3 among samples #1 to #4 configuring the MPU, and a header of moof+mdat as next auxiliary data.

Figure 30D:
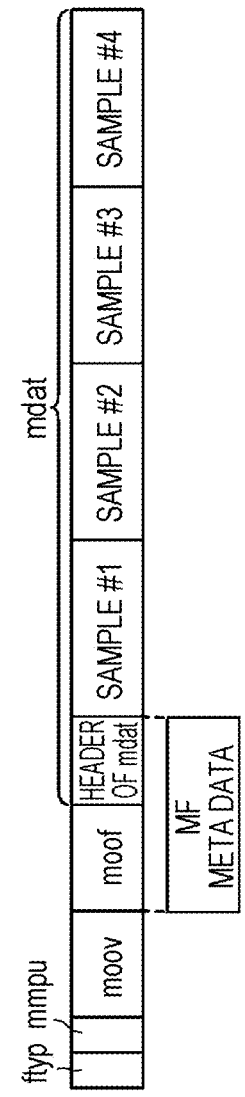
FIG. 30D is a view for explaining an example where the transmitting device generates auxiliary data based on a configuration of moof.

Next, as illustrated in FIG. 30D, transmitting device 15 generates MP4 by using all samples among samples #1 to #4 configuring an MPU, and uses a header of moof+mdat as movie fragment meta data.

In addition, transmitting device 15 generates auxiliary data per sample, yet may generate auxiliary data per N sample. A value of N is an arbitrary numeral, and, when, for example, one MPU is transmitted and auxiliary data is transmitted M times, N=all samples/M may hold.

In addition, information indicating an offset of a sample in moof may take an offset value after a sample entry area of a number of subsequent samples is secured as a NULL area.

In addition, auxiliary data may be generated to fragment MF meta data.

[Example of Receiving Operation Using Auxiliary Data]

Reception of auxiliary data generated as described with reference to FIG. 30 will be described. FIG. 31 are views for explaining reception of auxiliary data. In addition, in FIG. 31A, the number of samples configuring an MPU is 30, and auxiliary data is generated per 10 sample and transmitted.

In FIG. 30A, auxiliary data #1 includes samples #1 to #10, auxiliary data #2 includes samples #1 to #20, and MF meta data includes pieces of sample information of samples #1 to #30.

In addition, samples #1 to #10, samples #11 to #20 and samples #21 to #30 are stored in one MMT payload, however, may be stored in sample units or NAL units or may be stored in fragmented or aggregated units.

Receiving device 20 receives packets of an MPU meta, a sample, an MF meta and auxiliary data.

Receiving device 20 couples items of sample data in a reception order (to a tail of each sample), receives the latest auxiliary data and then updates the items of auxiliary data so far. Further, receiving device 20 can configure a complete MPU by lastly replacing auxiliary data with MF meta data.

At a point of time at which auxiliary data #1 is received, receiving device 20 couples the items of data as in an upper stage in FIG. 31B, and configures MP4. Consequently, receiving device 20 can parse samples #1 to #10 by using MPU meta data and information of auxiliary data #1, and perform decoding based on information of a PTS, a DTS, an offset and a size included in the auxiliary data.

Further, at a point of time at which auxiliary data #2 is received, receiving device 20 couples the items of data as in a middle stage in FIG. 31B, and configures MP4. Consequently, receiving device 20 can parse samples #1 to #20 by using MPU meta data and information of auxiliary data #2, and perform decoding based on information of a PTS, a DTS, an offset and a size included in the auxiliary data.

Further, at a point of time at which MF meta data is received, receiving device 20 couples the items of data as in a lower stage in FIG. 31B, and configures MP4. Consequently, receiving device 20 can parse samples #1 to #30 by using MPU meta data and MF meta data, and perform decoding based on information of a PTS, a DTS and an offset, a size included in the MF meta data.

When there is no auxiliary data, receiving device 20 can obtain pieces of information of samples for the first time after reception of MF meta data, and therefore needs to start decoding after receiving the MF meta data. However, transmitting device 15 generates and transmits auxiliary data, so that receiving device 20 can obtain information of samples by using the auxiliary data without waiting for reception of MF meta data and, consequently, can advance a decoding start time. Further, transmitting device 15 generates auxiliary data based on moof described with reference to FIG. 30, so that receiving device 20 can perform parsing by using a parser of conventional MP4 as is.

Further, auxiliary data and MF meta data to be newly generated include pieces of information of samples which overlap those of auxiliary data transmitted in the past. Hence, even when past auxiliary data cannot be obtained due to packet loss, it is possible to reconfigure MP4 and obtain sample information (a PTS, a DTS, a size and an offset) by using auxiliary data and MF meta data to be newly obtained.

In addition, auxiliary data does not necessarily need to include past sample data. For example, auxiliary data #1 may correspond to items of sample data #1 to #10, and auxiliary data #2 may correspond to items of sample data #11 to #20. As illustrated in, for example, FIG. 31C, transmitting device 15 may successively output, as auxiliary data, units obtained by fragmenting data units which are complete MF meta data.

Further, for a packet loss countermeasure, transmitting device 15 may repeatedly transmit auxiliary data or repeatedly transmit MF meta data.

In addition, an MMT packet and an MMT payload in which auxiliary data is stored includes an MPU sequence number and an asset ID similar to MPU meta data, MF meta data and sample data.

Figure 32:
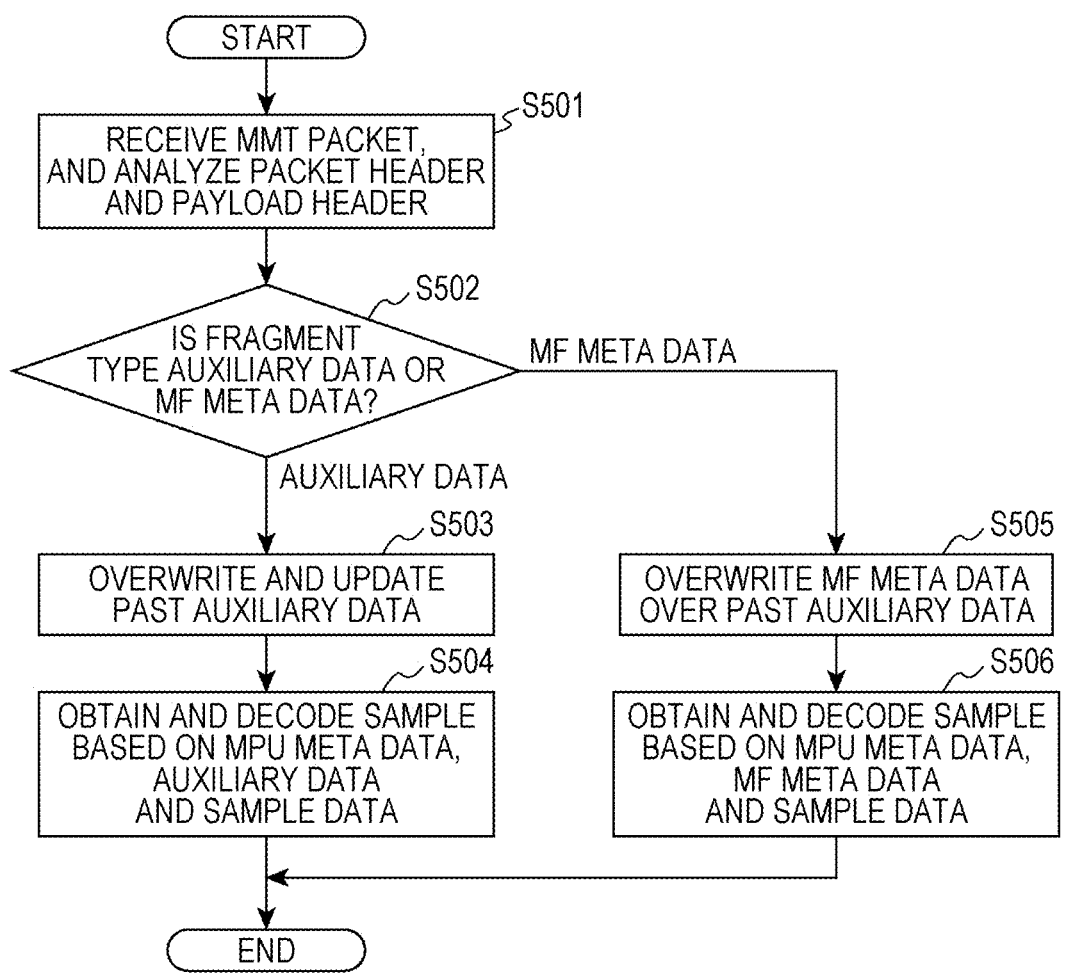
FIG. 32 is a flowchart of a receiving operation using auxiliary data.

The above receiving operation using auxiliary data will be described with reference to a flowchart in FIG. 32. FIG. 32 is a flowchart of the receiving operation using auxiliary data.

First, receiving device 20 receives an MMT packet, and analyzes a packet header and a payload header (S501). Next, receiving device 20 analyzes whether a fragment type is auxiliary data or MF meta data (S502), and overwrites and updates past auxiliary data when the fragment type is the auxiliary data (S503). In this case, when there is no past auxiliary data of the same MPU, receiving device 20 uses received auxiliary data as new auxiliary data. Further, receiving device 20 obtains a sample based on the MPU meta data, the auxiliary data and the sample data to decode (S507).

Meanwhile, when the fragment type is the MF meta data, receiving device 20 overwrites the MF meta data over the past auxiliary data in step S505 (S505). Further, receiving device 20 obtains a sample in a complete MPU form based on the MPU meta data, the MF meta data and the sample data, for performing decoding (S506).

In addition, although not illustrated in FIG. 32, in step S502, receiving device 20 stores data in the buffer when the fragment type is MPU meta data, and stores data coupled to a tail of each sample in the buffer when the fragment type is sample data.

When auxiliary data cannot be obtained due to packet loss, receiving device 20 can overwrite latest auxiliary data over auxiliary data, or decode a sample by using past auxiliary data.

In addition, a transmission cycle and a number of times of transmissions of auxiliary data may take predetermined values. Information of the transmission cycle and the number of times of transmissions (count or count down) may be transmitted together with data. For example, a transmission cycle, the number of times of transmissions, and a time stamp such as initial_cpb_removal_delay may be stored in a data unit header.

By transmitting auxiliary data including information of a first sample of an MPU prior to initial_cpb_removal_delay once or more, it is possible to conform to a CPB (Coded Picture Buffer) buffer model. In this case, in an MPU time stamp descriptor, a value based on picture timing SEI is stored.

In addition, a transmission method for such a receiving operation using such auxiliary data is not limited to an MMT method, and is applicable to MPEG-DASH in a case where packets configured by an ISOBMFF (ISO base media file format) file format are transmitted by way of streaming.

[Transmitting Method in Case where One MPU is Configured by a Plurality of Movie Fragments]

Figure 33:
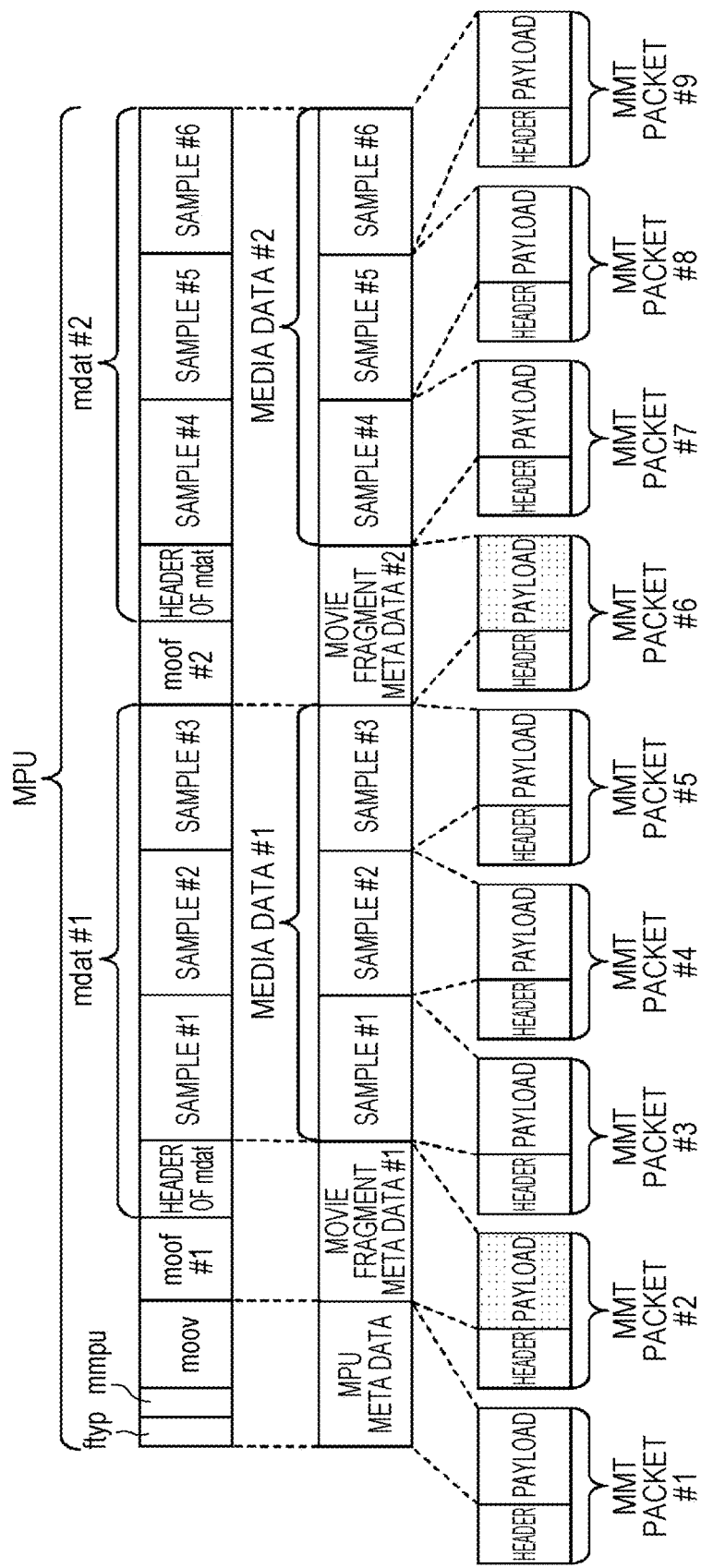
FIG. 33 is a view illustrating a configuration of an MPU configured by a plurality of movie fragments.

A case where one MPU is configured by one movie fragment has been described above with reference to FIG. 19 and subsequent figures. Hereinafter, a case where one MPU is configured by a plurality of movie fragments will be described. FIG. 33 is a view illustrating a configuration of an MPU configured by a plurality of movie fragments.

In FIG. 33, samples (#1 to #6) stored in one MPU are sorted and stored in two movie fragments. A first movie fragment is generated based on samples #1 to #3, and a corresponding moof box is generated. A second movie fragment is generated based on samples #4 to #6, and a corresponding moof box is generated.

Headers of the moof box and the mdat box in the first movie fragment are stored as movie fragment meta data #1 in an MMT payload and an MMT packet. Meanwhile, headers of the moof box and the mdat box in the second movie fragment are stored as movie fragment meta data #2 in an MMT payload and an MMT packet. In addition, in FIG. 33, hatching is applied to MMT payloads in which items of movie fragment meta data are stored.

In addition, the number of samples configuring an MPU and the number of samples configuring a movie fragment are arbitrary. For example, the number of samples configuring an MPU is defined as the number of samples in GOP units, and the number of samples which is half the GOP units is defined as a movie fragment, so that two movie fragments may be configured.

In addition, an example where one MPU includes two movie fragments (the moof box and the mdat box) will be described hereinafter. However, a number of movie fragments included in one MPU may not be two and may be three or more. Further, the number of samples to be stored in a movie fragment may not be equally divided, and may be divided to an arbitrary number of samples.

In addition, in FIG. 33, MPU meta data units and MF meta data units are stored as data units in an MMT payload. However, transmitting device 15 may store units such as ftyp, mmpu, moov and moof as data units in an MMT payload in units of data units, or in an MMT payload in units obtained by fragmenting the data units. Further, transmitting device 15 may store data units in an MMT payload in units obtained by aggregating the data units.

Furthermore, in FIG. 33, samples are stored in an MMT payload in sample units. However, transmitting device 15 may configure data units in units of NAL units or units obtained by aggregating a plurality of NAL units instead of sample units, and store the data units in an MMT payload in the units of the data units. Further, transmitting device 15 may store data units in an MMT payload in units obtained by fragmenting the data units or may store the data units in an MMT payload in units obtained by aggregating the data units.

In addition, in FIG. 33, an MPU is configured in order of moof #1, mdat #1, moof #2 and mdat #2, and offset is allocated to moof #1 assuming that corresponding mdat #1 is allocated subsequent to moof #1. However, offset may be allocated assuming that mdat #1 is allocated prior to moof #1. In this regard, in this case, movie fragment meta data cannot be generated in a form of moof+mdat, and headers of moof and mdat are separately transmitted.

Next, an MMT packet transmission order in a case where the MPU configured described with reference to FIG. 33 is transmitted will be described. FIG. 34 are views for explaining an MMT packet transmission order.

FIG. 34A illustrates a transmission order in a case where MMT packets are transmitted in an MPU configuration order illustrated in FIG. 33. FIG. 34A specifically illustrates an example where an MPU meta, MF meta #1, media data #1 (samples #1 to #3), MF meta #2 and media data #2 (samples #4 to #6) are transmitted in this order.

FIG. 34B illustrates an example where an MPU meta, media data #1 (samples #1 to #3), MF meta #1, media data #2 (samples #4 to #6) and MF meta #2 are transmitted in this order.

FIG. 34C illustrates an example where media data #1 (samples #1 to #3), an MPU meta, MF meta #1, media data #2 (samples #4 to #6) and MF meta #2 are transmitted in this order.

MF meta #1 is generated by using samples #1 to #3, and MF meta #2 is generated by using samples #4 to #6. Hence, when the transmitting method in FIG. 34A is used, encapsulation causes a delay during transmission of sample data.

By contrast with this, when the transmitting methods in FIG. 34B and FIG. 34C are used, it is possible to transmit samples without waiting for generation of an MF meta. Consequently, encapsulation does not cause a delay and it is possible to reduce an End-to-End delay.

Further, according to the transmission order in FIG. 34A, one MPU is divided into a plurality of movie fragments and the number of samples to be stored in an MF meta is small compared to that in FIG. 19. Consequently, it is possible to reduce a delay amount caused by encapsulation compared to that in FIG. 19.

In addition to the methods described herein, transmitting device 15 may couple MF meta #1 and MF meta #2 to collectively transmit at the last of an MPU. In this case, MF metas of different movie fragments may be aggregated and stored in one MMT payload. Further, MF metas of different MPUs may be collectively aggregated and stored in an MMT payload.

[Receiving Method in a Case where One MPU is Configured by a Plurality of Movie Fragments]

Figure 35:
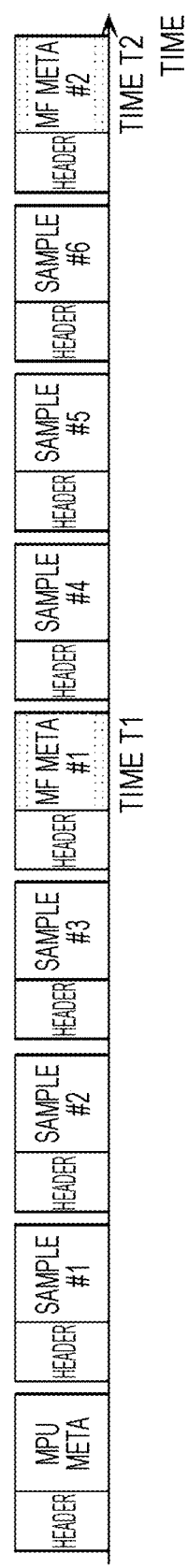
FIG. 35 is a first view for explaining an operation example of the receiving device in a case where one MPU is configured by a plurality of movie fragments.

Hereinafter, an operation example of receiving device 20 of receiving and decoding MMT packets transmitted in the transmission order described with reference to FIG. 34B will be described. FIGS. 35 and 36 are views for explaining a such operation example.

Receiving device 20 receives each MMT packet including an MPU meta, samples and MF metas in a transmission order illustrated in FIG. 35. Sample data is coupled in a reception order.

Receiving device 20 couples items of data as illustrated in FIG. 36A at T1 which is a time at which MF meta #1 is received, and configures MP4. Consequently, receiving device 20 can obtain samples #1 to #3 based on MPU meta data and information of MF meta #1, and perform decoding based on information of a PTS, a DTS, an offset and a size included in the MF meta.

Further, receiving device 20 couples items of data as illustrated in FIG. 36B at T2 which is a time at which MF meta #2 is received, and configures MP4. Consequently, receiving device 20 can obtain samples #4 to #6 based on MPU meta data and information of MF meta #2, and perform decoding based on information of a PTS, a DTS, an offset and a size included in the MF meta. Further, receiving device 20 may couple items of data as illustrated in FIG. 36C and configure MP4, and thereby obtain samples #1 to #6 based on pieces of information of MF meta #1 and MF meta #2.

By dividing one MPU into a plurality of movie fragments, a time taken to obtain a first MF meta of the MPU is reduced, so that it is possible to advance a decoding start time. Further, it is possible to reduce a buffer size for accumulating samples which are not yet decoded.

In addition, transmitting device 15 may set movie fragment division units such that a time taken to transmit (or receive) an MF meta corresponding to a movie fragment after a first sample of the movie fragment is transmitted (or received) is shorter than initial_cpb_removal_delay specified by an encoder. By making such settings, a reception buffer can conform to a CPB buffer and realize decoding with a low delay. In this case, it is possible to use absolute times based on initial_cpb_removal_delay for a PTS and a DTS.

Further, transmitting device 15 may divide a movie fragment at equal intervals or may divide subsequent movie fragments at intervals shorter than those of previous movie fragments. Consequently, receiving device 20 can receive an MF meta including information of samples without fail before decoding the samples, and perform continuous decoding.

For a method for calculating absolute times of a PTS and a DTS, the following two methods can be used.

(1) The absolute times of the PTS and the DTS are determined based on a reception time (T1 or T2) of MF meta #1 or MF meta #2 and relative times of the PTS and the DTS included in the MF meta.

(2) The absolute times of the PTS and the DTS are determined based on an absolute time such as an MPU time stamp descriptor signaled from the transmission side and the relative times of the PTS and the DTS included in the MF meta.

Further, (2-A) the absolute time signaled from transmitting device 15 may be an absolute time calculated based on initial_cpb_removal_delay specified by the encoder.

(2-B) The absolute time signaled from transmitting device 15 may be an absolute time calculated based on a prediction value of a reception time of an MF meta.

In addition, MF meta #1 and MF meta #2 may be repeatedly transmitted. MF meta #1 and MF meta #2 are repeatedly transmitted, so that receiving device 20 can obtain the MF meta again even when the MF meta cannot be obtained due to packet loss.

In a payload header of an MFU including a sample configuring a movie fragment, an identifier indicating a movie fragment order can be stored. Meanwhile, an identifier indicating an order of MF metas configuring a movie fragment is not included in an MMT payload. Hence, receiving device 20 identifies an order of MF metas according to packet_sequence_number. Alternatively, transmitting device 15 may store an identifier indicating which movie fragment an MF meta belongs to, in control information (a message, a table or a descriptor), an MMT header, an MMT payload header or a data unit header to signal.

In addition, transmitting device 15 may transmit an MPU meta, MF metas and samples in a predetermined transmission order determined in advance, and receiving device 20 may perform reception processing based on the predetermined transmission order determined in advance. Further, transmitting device 15 may signal the transmission order and receiving device 20 may select (determine) reception processing based on the signaling information.

Figure 37:
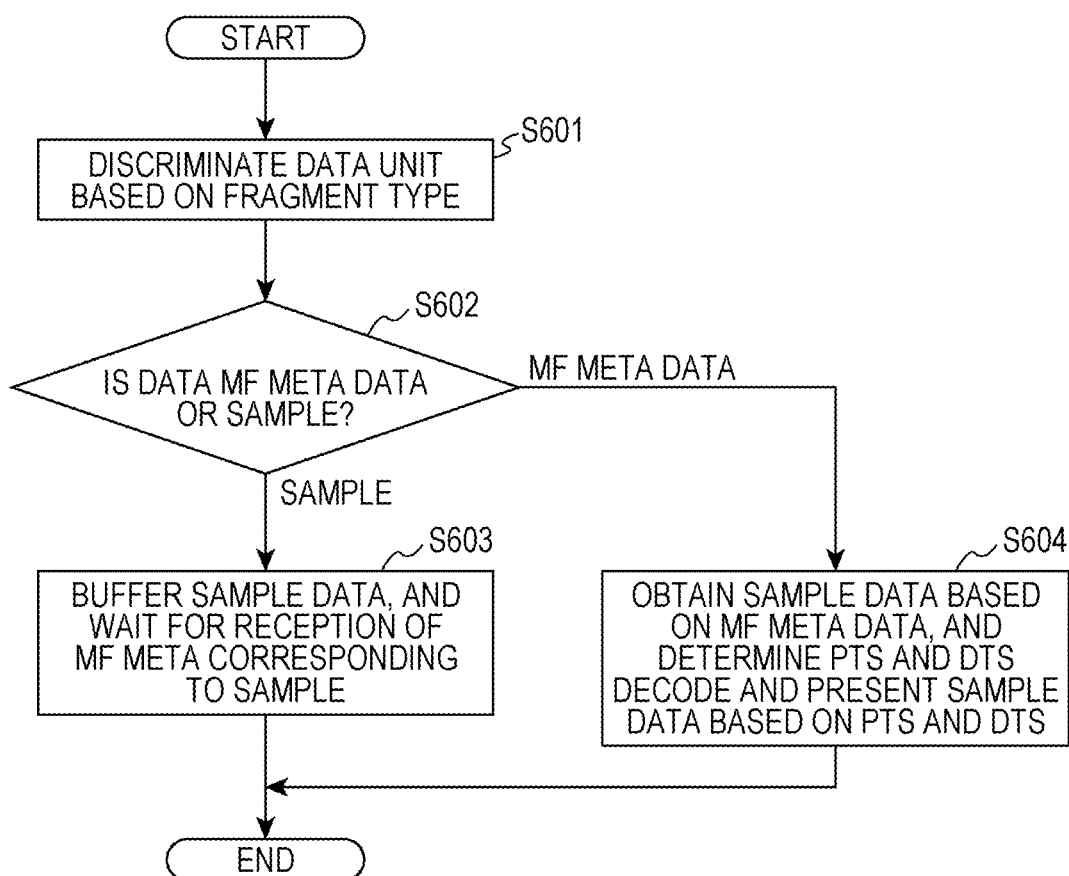
FIG. 37 is a flowchart of an operation of a receiving method described with reference to FIGS. 35 and 36.

The above receiving method will be described with reference to FIG. 37. FIG. 37 is a flowchart of an operation of the receiving method described with reference to FIGS. 35 and 36.

First, receiving device 20 discriminates (identifies) whether data included in a payload is MPU meta data, MF meta data, or sample data (MFU) according to a fragment type included in an MMT payload (S601 and S602). When the data is sample data, receiving device 20 buffers the sample, and waits for MF meta data corresponding to the sample to be received and start being decoded (S603).

Meanwhile, when the data is the MF meta data in step S602, receiving device 20 obtains information (a PTS, a DTS, position information and a size) of the sample from the MF meta data, obtains the sample based on the obtained sample information, and decodes and presents the sample based on the PTS and the DTS (S604).

In addition, although not illustrated, when the data is MPU meta data, the MPU meta data includes initialization information which is necessary for decoding. Hence, receiving device 20 accumulates this initialization information to decode sample data in step S604.

In addition, when accumulating items of received data of the MPU (MPU meta data, MF meta data and sample data) in an accumulating device, receiving device 20 accumulates the MPU data after rearranging the items of data to an MPU configuration described with reference to FIG. 19 or 33.

In addition, the transmission side allocates a packet sequence number of a packet having the same packet ID to an MMT packet. In this case, packet sequence numbers may be allocated after MMT packets including MPU meta data, MF meta data and sample data are rearranged in a transmission order, or packet sequence numbers may be allocated in an order before a rearrangement.

When the packet sequence numbers are allocated in the order before the rearrangement, receiving device 20 can rearrange items of data in an MPU configuration order based on the packet sequence numbers, so that the items of data can be easily accumulated.

[Method for Detecting Head of Access Unit and Head of Slice Segment]

A method for detecting a head of an access unit and a head of a slice segment based on an MMT packet header and information of an MMT payload header will be described.

In this regard, two examples of a case where non-VCL NAL units (an access unit delimiter, a VPS, an SPS, a PPS and SEI) are collectively stored as data units in an MMT payload, and a case where non-VOL NAL units are used data units and the data units are aggregated and stored in one MMT payload will be described.

Figure 38:
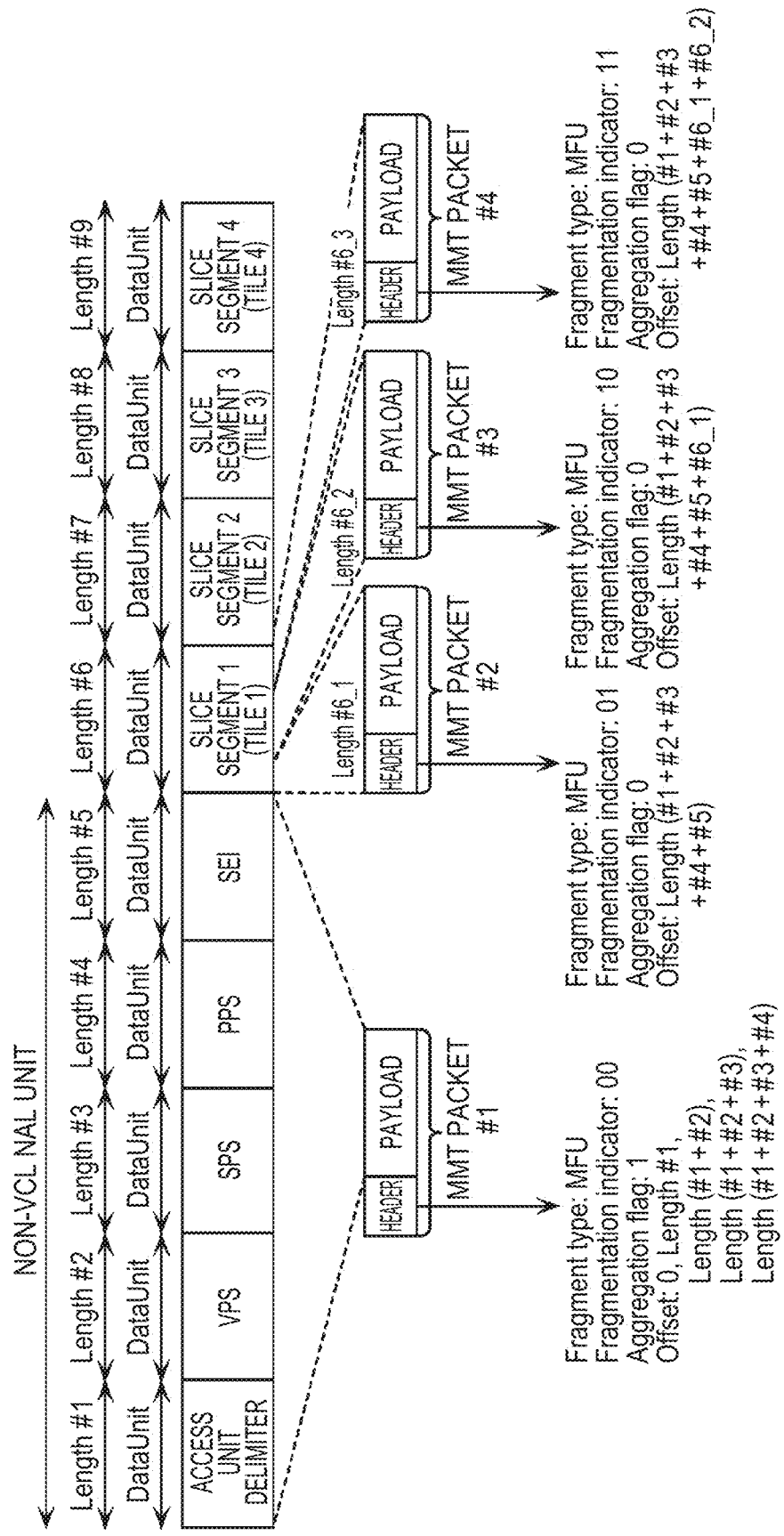
FIG. 38 is a view illustrating that non-VCL (Video Coding Layer) NAL units are individual data units and are aggregated.

FIG. 38 is a view illustrating that non-VOL NAL units are individually defined as data units and are aggregated.

In the case of FIG. 38, the head of the access unit is an MMT packet whose fragment_type value is an MFU, and is head data of an MMT payload including a data unit whose aggregation_flag value is 1 and whose offset value is 0. In this case, a Fragmentation_indicator value takes 0.

Further, in case of FIG. 38, the head of the slice segment is an MMT packet whose fragment_type value is an MFU, and is head data of an MMT payload whose aggregation_flag value is 0 and whose fragmentation_indicator value is 00 or 01.

Figure 39:
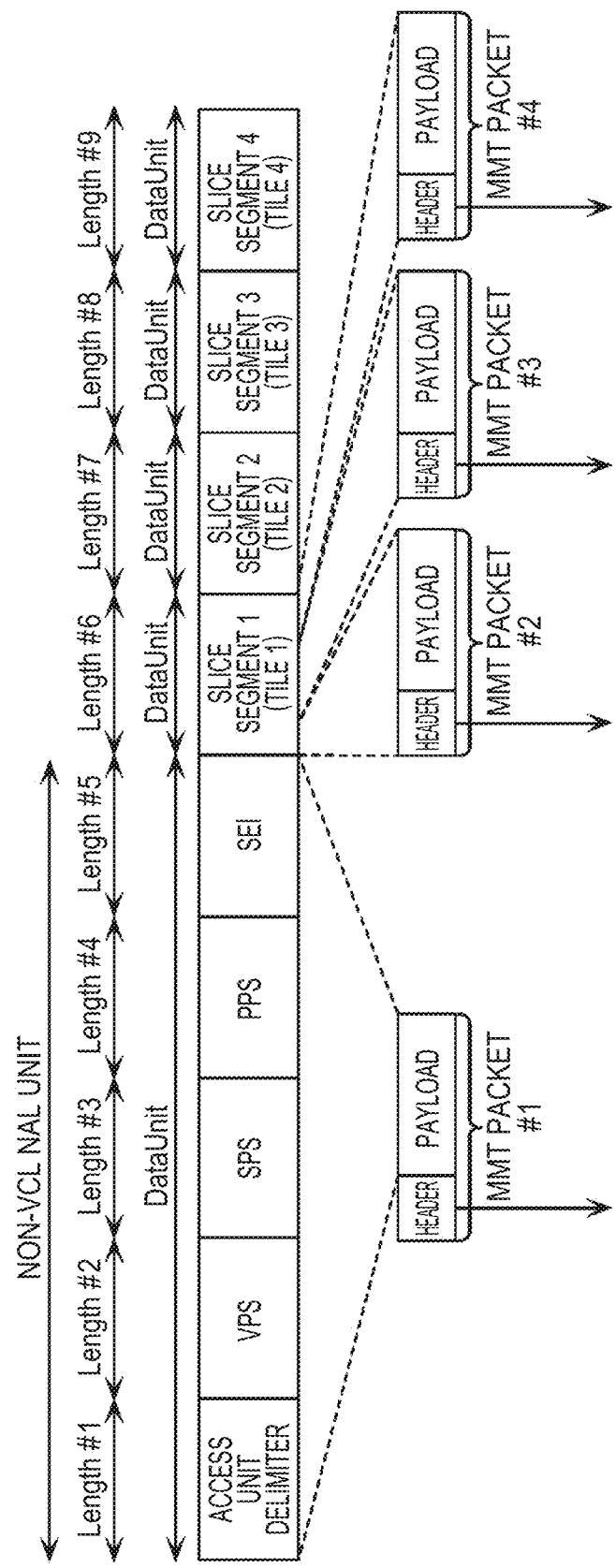
FIG. 39 is a view illustrating that non-VCL NAL units are collectively used as data units.

FIG. 39 is a view illustrating that non-VCL NAL units are collectively used as data units. In addition, a field value of a packet header is as illustrated in FIG. 17 (or FIG. 18).

In the case of FIG. 39, at a head of an access unit, head data of a payload in a packet whose Offset value is 0 is the head of the access unit.

Further, in the case of FIG. 39, the head of the slice segment takes is head data of a payload of a packet whose Offset value takes a value different from 0 and whose Fragmentation indicator value is 00 or 01.

[Reception Processing in Case where Packet Loss Occurs]

Generally, when MP4 format data is transmitted in environment in which packet loss occurs, receiving device 20 recovers packets by way of ALFEC (Application Layer FEC) and packet retransmission control or the like.

However, when packet loss occurs in a case where ALFEC is not used for streaming such as broadcasting, it is not possible to recover packets.

Receiving device 20 needs to resume decoding a video or an audio after data is lost due to packet loss. Hence, receiving device 20 needs to detect a head of an access unit or an NAL unit, and start decoding from the head of the access unit or the NAL unit.

However, a start code is not allocated to the head of the MP4 format NAL unit, and therefore, receiving device 20 cannot detect the head of the access unit or the NAL unit by analyzing a stream.

Figure 40:
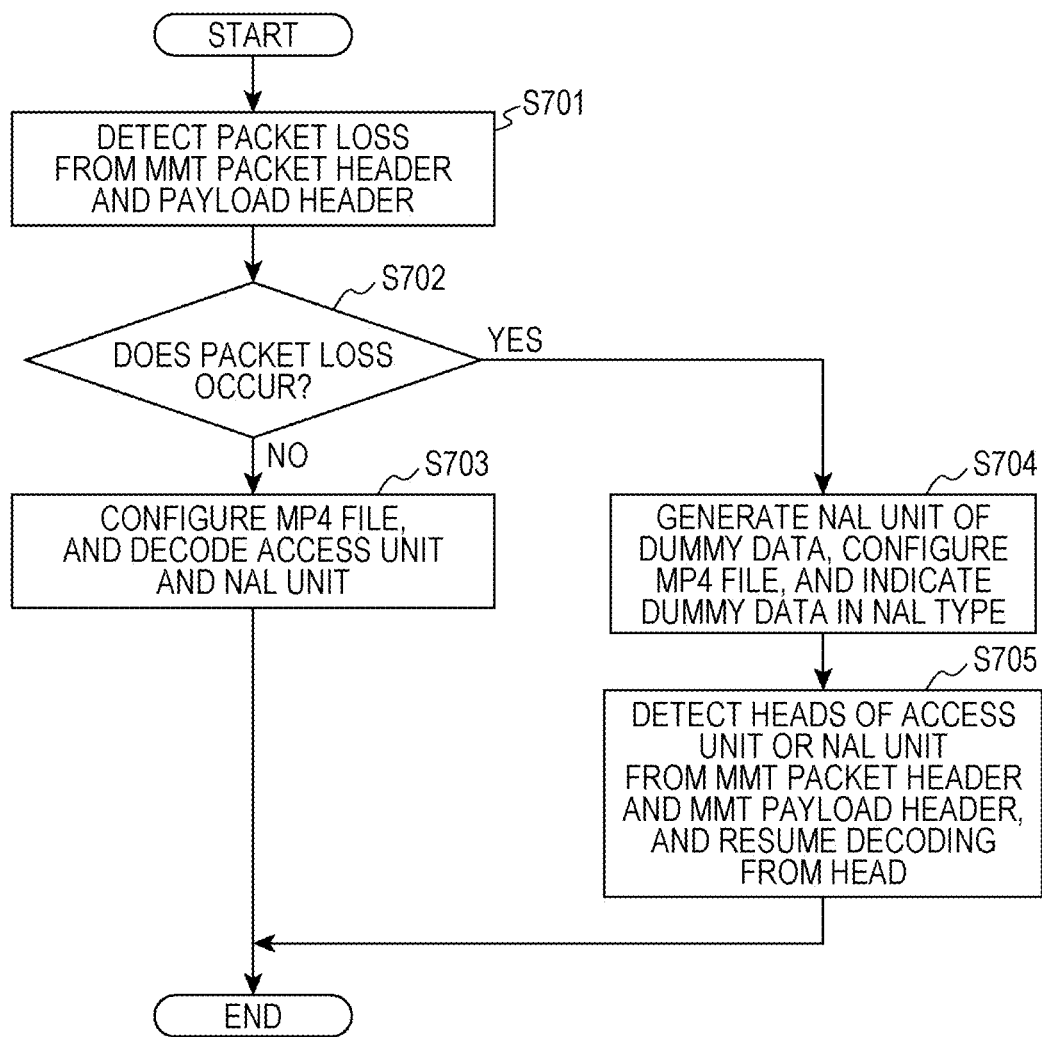
FIG. 40 is a flowchart of an operation of the receiving device in a case where packet loss occurs.

FIG. 40 is a flowchart of an operation of receiving device 20 when packet loss occurs.

Receiving device 20 detects packet loss based on Packetsequence number, packet counter or fragment counter in a header of an MMT packet or an MMT payload (S701), and determines which packet has been lost based on a preceding and subsequent relationship (S702).

When it is determined that packet loss does not occur (No in S702), receiving device 20 configures an MP4 file, and decodes an access unit or an NAL unit (S703).

When it is determined that packet loss occurs (Yes in S702), receiving device 20 generates an NAL unit corresponding to an NAL unit whose packet has been lost by using dummy data, and configures an MP4 file (S704). When inputting the dummy data in the NAL unit, receiving device 20 indicates the dummy data in an NAL unit type.

Further, receiving device 20 can resume decoding by detecting a head of a next access unit or NAL unit and inputting head data to a decoder based on the methods described with reference to FIGS. 17, 18, 38 and 39 (S705).

In addition, when packet loss occurs, receiving device 20 may resume decoding from the head of the access unit or the NAL unit based on information detected based on a packet header, or may resume decoding from the head of the access unit or the NAL unit based on header information of a reconfigured MP4 file including the NAL unit of the dummy data.

When accumulating MP4 files (MPU), receiving device 20 may additionally obtain and accumulate (replace) packet data (NAL units) whose packet has been lost, by way of broadcasting or communication.

In this case, when obtaining a lost packet by way of communication, receiving device 20 notifies the server of information of the lost packet (a packet ID, an MPU sequence number, a packet sequence number, an IP data flow number and an IP address), and obtains this packet. Receiving device 20 may simultaneously obtain not only lost packets but also a packet group prior to and subsequent to the lost packets.

[Method for Configuring Movie Fragment]

Hereinafter, a method for configuring a movie fragment will be described in detail.

As described with reference to FIG. 33, the number of samples configuring a movie fragment and the number of movie fragments configuring one MPU are arbitrary. For example, the number of samples configuring a movie fragment and the number of movie fragments configuring one MPU may be fixed predetermined numbers or may be dynamically determined.

In this regard, a movie fragment is configured to satisfy the following conditions at the transmitting side (transmitting device 15), so that it is possible to guarantee low-delay decoding in receiving device 20.

The conditions are as follows.

Transmitting device 15 generates and transmits an MF meta as a movie fragment in units obtained by dividing sample data to enable receiving device 20 to receive the MF meta including information of arbitrary samples without fail before a decoding time (DTS(i)) of the arbitrary samples (Sample(i)).

More specifically, transmitting device 15 configures a movie fragment by using encoded samples (including an ith sample) before DTS(i).

For a method for dynamically determining the number of samples configuring a movie fragment and the number of movie fragments configuring one MPU to guarantee low-delay decoding, for example, the following method is used.

(1) At a start of decoding, decoding time DTS(0) of sample Sample(0) of a GOP head is a time based on initial_cpb_removal_delay. The transmitting device configures a first movie fragment by using encoded samples at a time before DTS(0). Further, transmitting device 15 generates MF meta data corresponding to the first movie fragment, and transmits the MF meta data at a time before DTS(0).

(2) Transmitting device 15 configures a movie fragment to satisfy the above conditions for subsequent samples.

When, for example, a head sample of a movie fragment is a kth sample, an MF meta of the movie fragment including the kth sample is transmitted by decoding time DTS(k) of the kth sample, When an encoding completion time of a Ith sample is before DTS(k) and an encoding completion time of a (I+1)th sample is after DTS(k), transmitting device 15 configures a movie fragment by using the kth sample to the Ith sample.

In addition, transmitting device 15 may configure a movie fragment by using samples from the kth sample to a sample before the Ith sample.

(3) Transmitting device 15 finishes encoding a last sample of an MPU, configures a movie fragment by using the rest of samples and generates, and transmits MF meta data corresponding to this movie fragment.

In addition, transmitting device 15 may configure a movie fragment by using part of encoded samples without configuring a movie fragment by using all encoded samples.

In addition, an example where the number of samples configuring a movie fragment and the number of movie fragments configuring one MPU are dynamically determined based on the above conditions to guarantee low-delay decoding has been described above. However, the method for determining the number of samples and the number of movie fragments is not limited to this. For example, the number of movie fragments configuring one MPU may be fixed to a predetermined value, and the number of samples may be determined to satisfy the above conditions. Further, the number of movie fragments configuring one MPU and a time at which the movie fragments are divided (or an encoding amount of the movie fragments) may be fixed to predetermine values, and the number of samples may be determined to satisfy the above conditions.

Furthermore, when an MPU is divided into a plurality of movie fragments, information indicating whether or not the MPU is divided into a plurality of movie fragments, attributes of the divided movie fragments or an attribute of an MF meta for the divided movie fragments may be transmitted.

In this regard, each movie fragment attribute is information indicating whether the movie fragment is a head movie fragment of an MPU, a last movie fragment of the MPU, or the other movie fragment.

Further, each MF meta attribute is information indicating whether each MF meta indicates an MF meta corresponding to a head movie fragment of an MPU, an MF meta corresponding to a last movie fragment of the MPU or an MF meta corresponding to the other movie fragment.

In addition, transmitting device 15 may store the number of samples configuring a movie fragment and the number of movie fragments configuring one MPU as control information, and transmit the control information.

[Operation of Receiving Device]

The operation of receiving device 20 based on movie fragments configured as described will be described.

Receiving device 20 determines each absolute time of a PTS and a DTS based on MPU time stamp descriptors such as an absolute time signaled from the transmission side and relative times of the PTS and the DTS included in an MF meta.

Receiving device 20 performs processing as follows based on attributes of divided movie fragments when an MPU is divided based on information indicating whether or not the MPU is divided into a plurality of movie fragments.

(1) When a movie fragment is a head movie fragment of the MPU, receiving device 20 generates absolute times of a PTS and a DTS by using an absolute time of the PTS of a head sample included in an MPU time stamp descriptor, and relative times of a PTS and a DTS included in the MF meta.

(2) When the movie fragment is not a head movie fragment of the MPU, receiving device 20 generates absolute times of the PTS and the DTS by using relative times of the PTS and the DTS included in an MF meta without using information of the MPU time stamp descriptor.

(3) When the movie fragment is a last movie fragment of the MPU, receiving device 20 calculates the absolute times of PTSs and DTSs of all samples and then resets processing of calculating the PTSs and the DTSs (relative time addition process). In addition, the reset processing may be performed on the head movie fragment of the MPU.

Receiving device 20 may determine whether or not a movie fragment is divided as described below. Further, receiving device 20 may obtain attribute information of movie fragments as follows.

For example, receiving device 20 may determine whether or not a movie fragment is divided based on an identifier movie_fragment_sequence_number field value indicating an order of the movie fragment indicated in an MMTP payload header.

More specifically, when the number of movie fragments included in one MPU is 1, the movie_fragment_sequence_number field value is 1 and there is the field value whose value is 2 or more, receiving device 20 may determine that the MPU is divided into a plurality of movie fragments.

Further, when the number of movie fragments included in one MPU is 1, the movie_fragment_sequence_number field value is 0 and there is the field value whose value is other than 0, receiving device 20 may determine that the MPU is divided into a plurality of movie fragments.

Attribute information of the movie fragment may be also determined based on movie_fragment_sequence_number likewise.

In addition, whether or not a movie fragment is divided and attribute information of the movie fragment may be determined by counting the number of times of transmissions of movie fragments or MF metas included in one MPU without using movie_freagment_sequence_number.

According to the configurations of transmitting device 15 and receiving device 20 described above, receiving device 20 can receive movie fragment meta data at shorter intervals than that of an MPU and start low-delay decoding. Further, it is possible to perform low-delay decoding by using decoding processing based on an MP4 parsing method.

Figure 41:
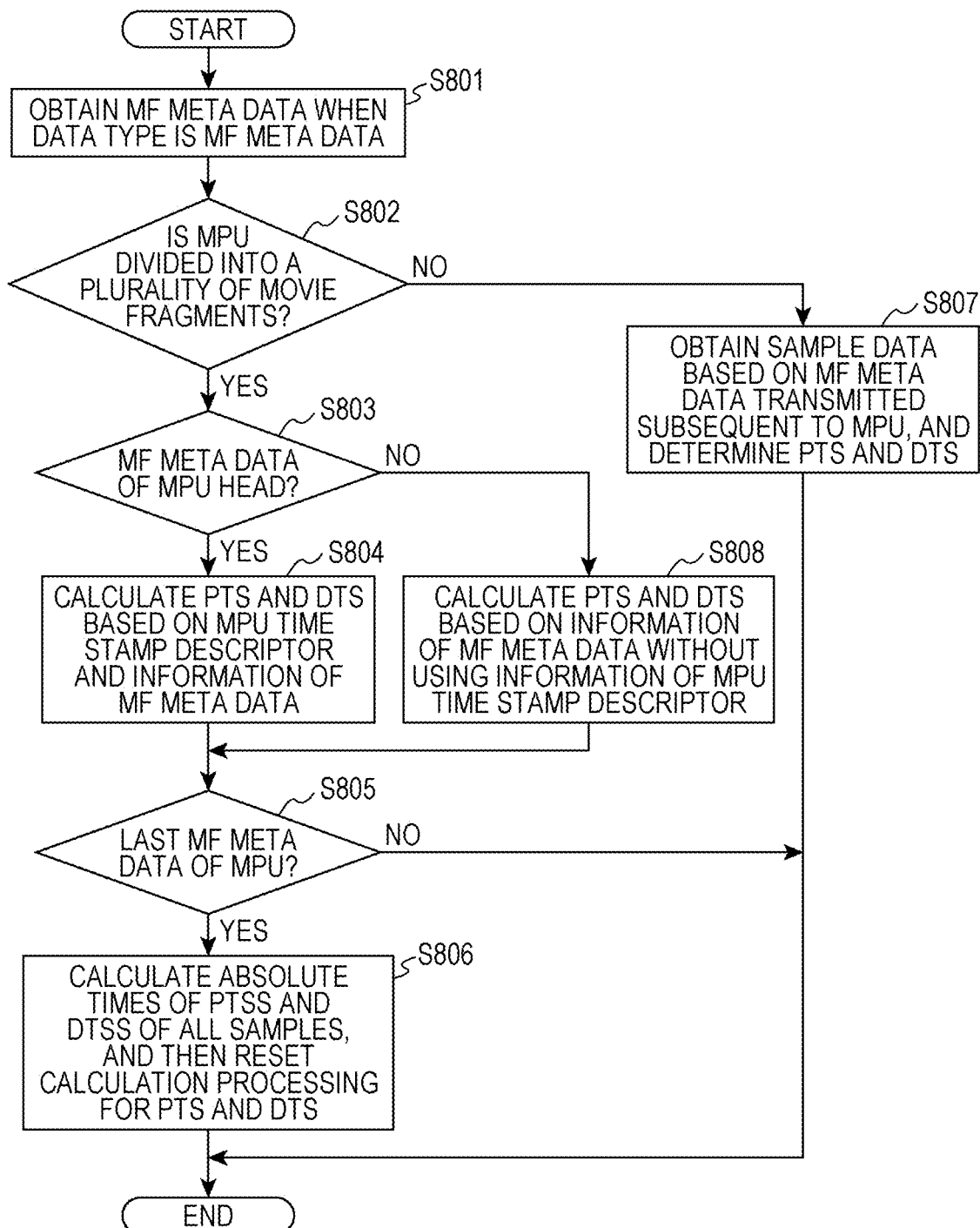
FIG. 41 is a flowchart of a receiving operation in a case where an MPU is divided into a plurality of movie fragments.

A receiving operation in a case where an MPU is divided into a plurality of movie fragments as described above will be described with reference to a flowchart. FIG. 41 is a flowchart of the receiving operation in a case where an MPU is divided into a plurality of movie fragments. In addition, this flowchart illustrates the operation in step S604 in FIG. 37 in more detail.

First, receiving device 20 obtains MF meta data based on a data type indicated in an MMTP payload header when the data type is an MF meta (S801).

Next, receiving device 20 determines whether or not an MPU is divided into a plurality of movie fragments (S802), and determines whether or not the received MF meta data is head meta data of the MPU (S803) when the MPU is divided into a plurality of movie fragments (Yes in S802). Receiving device 20 calculates absolute times of a PTS and a DTS based on an absolute time of the PTS indicated in an MPU time stamp descriptor and relative times of the PTS and the DTS indicated in the MF meta data (S804) when the received MF meta data is the head MF meta data of the MPU (Yes in S803), and determines whether or not the meta data is last meta data of the MPU (S805).

Meanwhile, receiving device 20 calculates the absolute times of the PTS and the DTS by using the relative times of the PTS and the DTS indicated in the MF meta data without using the information of the MPU time stamp descriptor (S808) when the received MF meta data is not the head MF meta data of the MPU (No in S803), and moves to processing in step S805.

When it is determined in step S805 that the MF meta data is the last MF meta data of the MPU (Yes in S805), receiving device 20 calculates absolute times of PTSs and DTSs of all samples, and then resets processing of calculating the PTS and the DTS. When it is determined in step S805 that the MF meta data is not the last MF meta data of the MPU (No in S805), receiving device 20 finishes the process.

Further, when it is determined in step S802 that the MPU is not divided into a plurality of movie fragments (No in S802), receiving device 20 obtains sample data based on MF meta data transmitted subsequent to the MPU, and determines the PTS and the DTS (S807).

Furthermore, although not illustrated, receiving device 20 finally performs decoding processing and presentation processing based on the determined PTS and DTS.

[Matter which Arises when Movie Fragment is Divided and for which Countermeasure Needs to be Taken, and Solution of Matter]

A method for reducing an End-to-End delay by dividing a movie fragment has been described so far. Hereinafter, a matter which newly arises when a movie fragment is divided, and for which a countermeasure needs to be taken and a solution of the matter will be described.

Figure 42:
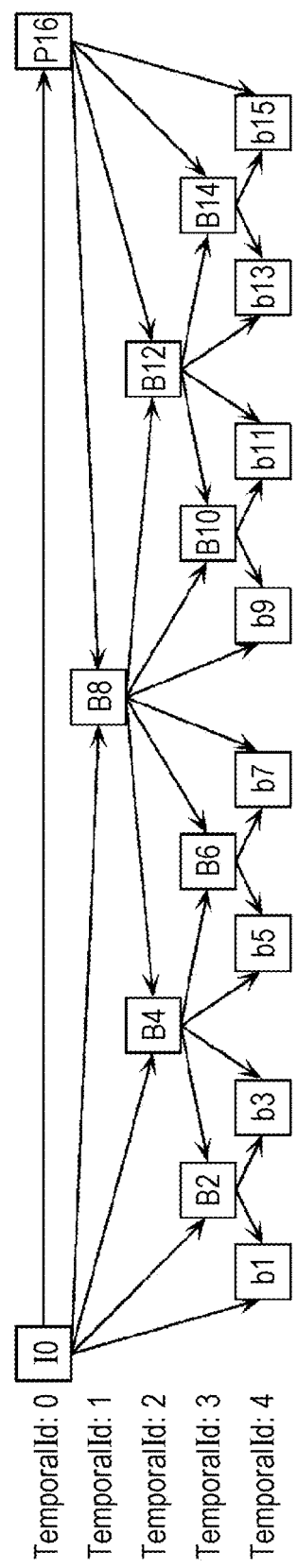
FIG. 42 is a view illustrating an example of a picture predicted structure of each TemporalId in a case where temporal scalability is realized.

First, a picture structure of encoded data will be described as a background. FIG. 42 is a view illustrating an example of a picture predicted structure for each TemporalId when temporal scalability is realized.

According to encoding methods such as MPEG-4 AVC and HEVC (High Efficiency Video Coding), it is possible to realize scalability (temporal scalability) in a time domain by using picture B (bidirectional reference predicted picture) which can be referred from another picture.

TemporalId illustrated in FIG. 42 is an identifier of a layer of an encoding structure, and TemporalId having a higher value indicates a deeper layer. Each square block indicates a picture, Ix in a block represents picture I (intra-plane predicted picture), Px represents picture P (forward reference predicted picture), and Bx and bx represent pictures B (bidirectional reference predicted picture). x of Ix/Px/Bx indicates a display order, and represents an order to display pictures. Each arrow between pictures indicates a reference relationship and, for example, picture B4 indicates that a predicted image is generated by using I0 and B8 as reference images. In this regard, using another picture having a higher TemporalId than TemporalId of one picture as a reference image is forbidden. Layers are defined to secure temporal scalability, and, by, for example, decoding all pictures in FIG. 42, a video of 120 fps (frame per second) is obtained and, by decoding layers whose TemporalIds are 0 to 3, a video of 60 fps is obtained.

Figure 43:
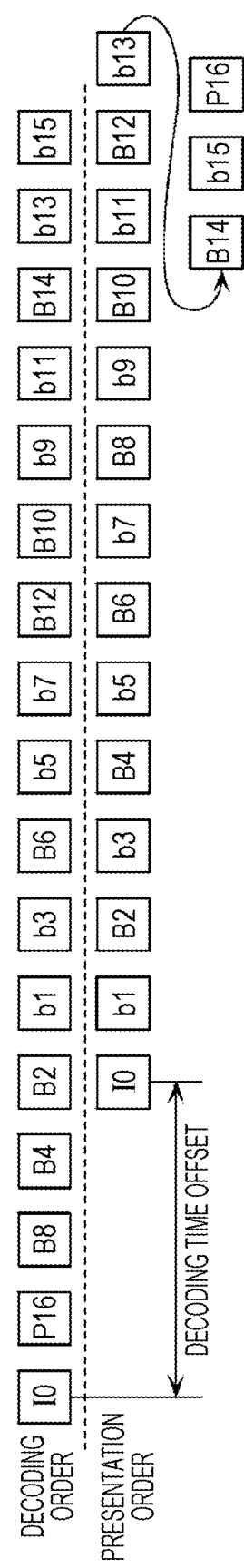
FIG. 43 is a view illustrating a relationship between a decoding time (DTS) and a presentation time (PTS) of each picture in FIG. 42.

FIG. 43 is a view illustrating a relationship between a decoding time (DTS) and a presentation time (PTS) of each picture in FIG. 42. For example, picture I0 illustrated in FIG. 43 is displayed after decoding B4 is finished so as not to produce a gap between decoding and display.

As illustrated in FIG. 43, when picture B is included in a predicted structure, a decoding order and a display order are different. Therefore, receiving device 20 needs to perform picture delay processing and picture rearrangement (reorder) processing after decoding a picture.

Figure 44:
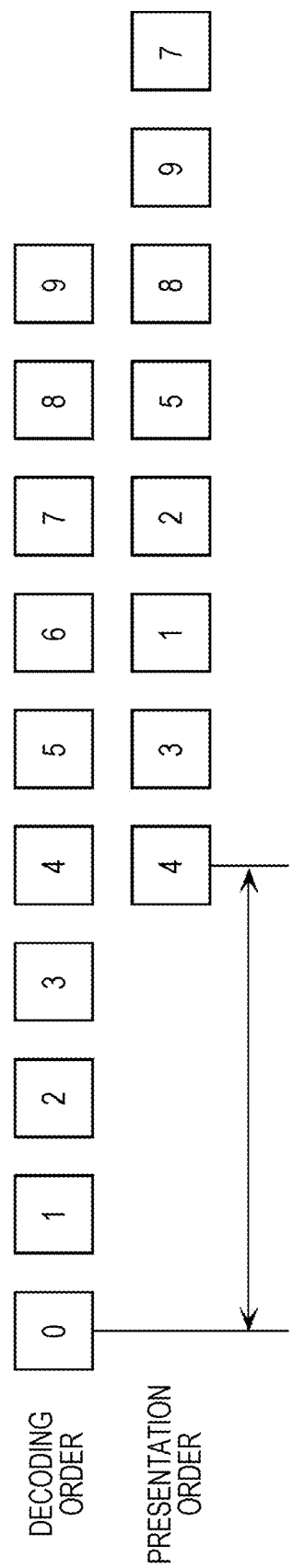
FIG. 44 is a view illustrating an example of a picture predicted structure for which picture delay processing and reorder processing need to be performed.

An example of a picture predicted structure for securing scalability in the time domain has been described. Even when scalability in the time domain is not used, it is necessary to perform the picture delay processing and the reorder processing depending on predicted structures. FIG. 44 is a view illustrating a picture predicted structure example for which a picture delay process and a reorder process need to be performed. In addition, numbers in FIG. 44 indicate a decoding order.

As illustrated in FIG. 44, depending on predicted structures, a head sample in a decoding order and a head sample in a presentation order are different in some cases. In FIG. 44, the head sample in the presentation order is a fourth sample in the decoding order. In addition, FIG. 44 illustrates an example of a predicted structure, and the predicted structure is not limited to such a structure. According to another predicted structure, too, a head sample in a decoding order and a head sample in a presentation order are different in some cases.

Figure 45:
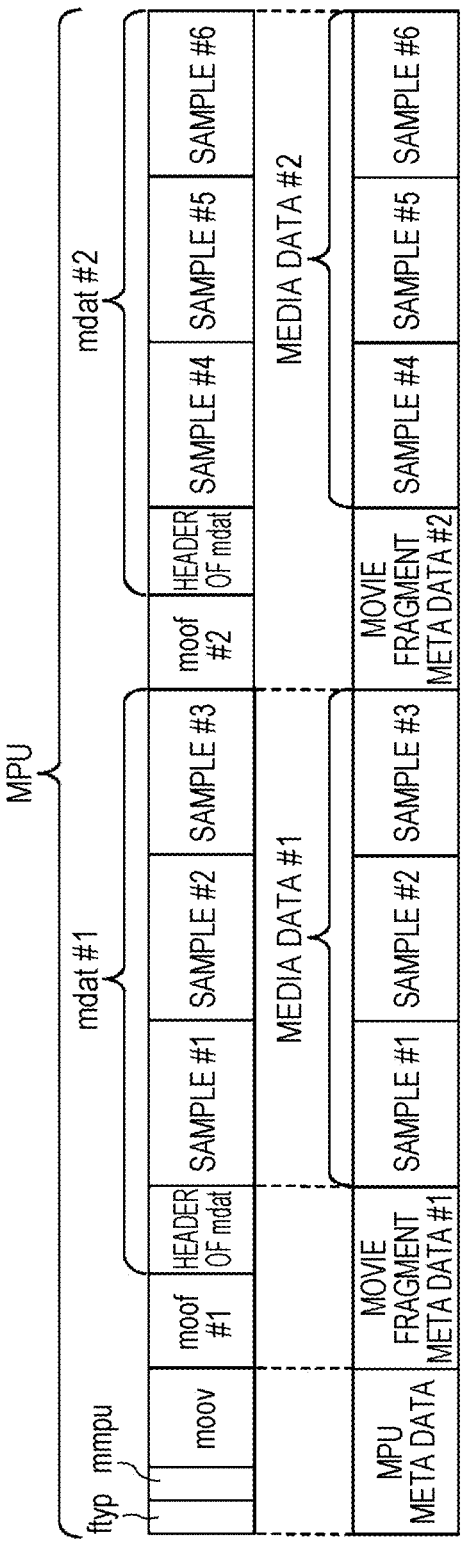
FIG. 45 is a view illustrating an example where an MPU configured by an MP4 format is divided into a plurality of movie fragments, and is stored in an MMTP (MPEG Media Transport Protocol) payload and an MMTP packet.

Similar to FIG. 33, FIG. 45 is a view illustrating an example where an MPU configured by an MP4 format is divided into a plurality of movie fragments, and is stored in an MMTP payload and an MMTP packet. In addition, the number of samples configuring an MPU and the number of samples configuring a movie fragment are arbitrary. For example, the number of samples configuring an MPU is defined as the number of samples in GOP units, and the number of samples which is half the GOP units is defined as a movie fragment, so that two movie fragments may be configured. One sample may be one movie fragment or samples configuring an MPU may not be divided.

FIG. 45 illustrates an example where one MPU includes two movie fragments (a moof box and a mdat box). The number of movie fragments included in one MPU may not be two. The number of movie fragments included in one MPU may be three or more or may be the number of samples included in the MPU. Further, the number of samples to be stored in a movie fragment may not be an equally divided number of samples, and may be divided to an arbitrary number of samples.

Movie fragment meta data (MF meta data) includes information of a PTS, a DTS, an offset and a size of a sample included in a movie fragment, and receiving device 20 extracts the PTS and the DTS from the MF meta including the information of the sample and determines a decoding timing and a presentation timing when decoding the sample.

Hereinafter, for more detailed description, an absolute value of a decoding time of sample i is described as DTS(i), and an absolute time of a presentation time is described as PTS(i).

Information of the ith sample of time stamp information stored in moof of an MF meta is more specifically relative values of decoding times of the ith sample and (i+1)th sample and relative values of the decoding time and a presentation time of the ith sample which will be referred to as DT(i) and CT(i) below.

Movie fragment meta data #1 includes DT(i) and CT(i) of samples #1 to #3, and movie fragment meta data #2 includes DT(i) and CT(i) of samples #4 to #6.

Further, an absolute value of a PTS of a head access unit of an MPU is stored in an MPU time stamp descriptor, and receiving device 20 calculates a PTS and a DTS based on PTS_MPU of the head access unit of the MPU, a CT and a DT.

FIG. 46 are views for explaining a method for calculating a PTS and a DTS in a case where samples #1 to #10 configure an MPU, and a matter for which the countermeasure needs to be taken.

FIG. 46A illustrates an example where an MPU is not divided into movie fragments. FIG. 46B illustrates an example where an MPU is divided into two movie fragments in five sample units. FIG. 46C illustrates an example where an MPU is divided into ten movie fragments in sample units.

As described with reference to FIG. 45, when a PTS and a DTS are calculated by using an MPU time stamp descriptor and time stamp information in MP4 (a CT and a DT), the head sample in the presentation order in FIG. 44 is the fourth sample in the decoding order. Hence, the PTS stored in the MPU time stamp descriptor is a PTS (absolute value) of the fourth sample in the decoding order. In addition, hereinafter, this sample is referred to as sample A. Further, a head sample in a decoding order is referred to as sample B.

Absolute time information related to a time stamp is information of an MPU time stamp descriptor. Therefore, receiving device 20 cannot calculate PTSs (absolute times) and DTSs (absolute times) of other samples until sample A arrives. Receiving device 20 calculates neither a PTS nor a DTS of sample B.

In an example in FIG. 46A, sample A is included in the same movie fragment as that of sample B, and is stored in one MF meta. Consequently, receiving device 20 can immediately determine a DTS of sample B after receiving the MF meta.

In an example in FIG. 46B, sample A is included in the same movie fragment as that of sample B, and is stored in one MF meta. Consequently, receiving device 20 can immediately determine a DTS of sample B after receiving the MF meta.

In an example in FIG. 46C, sample A and sample B are included in different movie fragments. Hence, receiving device 20 can determine a DTS of sample B only after receiving an MF meta including a CT and a DT of a movie fragment including sample A.

Hence, in the case of the example in FIG. 46C, receiving device 20 cannot immediately start decoding after sample B arrives.

Thus, when a movie fragment including sample B does not include sample A, receiving device 20 can only start decoding sample B after receiving an MF meta related to a movie fragment including sample A.

When a head sample in the presentation order and a head sample in the decoding order do not match, a movie fragment is divided until sample A and sample B stop being stored in the same movie fragment, and therefore this matter for which the countermeasure needs to be taken occurs. Further, this matter for which the countermeasure needs to be taken occurs irrespectively of whether an MF meta is transmitted earlier or later.

Thus, when the head sample in the presentation order and the head sample in the decoding order do not match, and when sample A and sample B are not stored in the same movie fragment, it is not possible to immediately determine a DTS after reception of sample B. Hence, transmitting device 15 transmits additionally a DTS (absolute value) of sample B or information for enabling the reception side to calculate a DTS (absolute value) of sample B. Such information may be transmitted by using control information, a packet header or the like.

Figure 47:
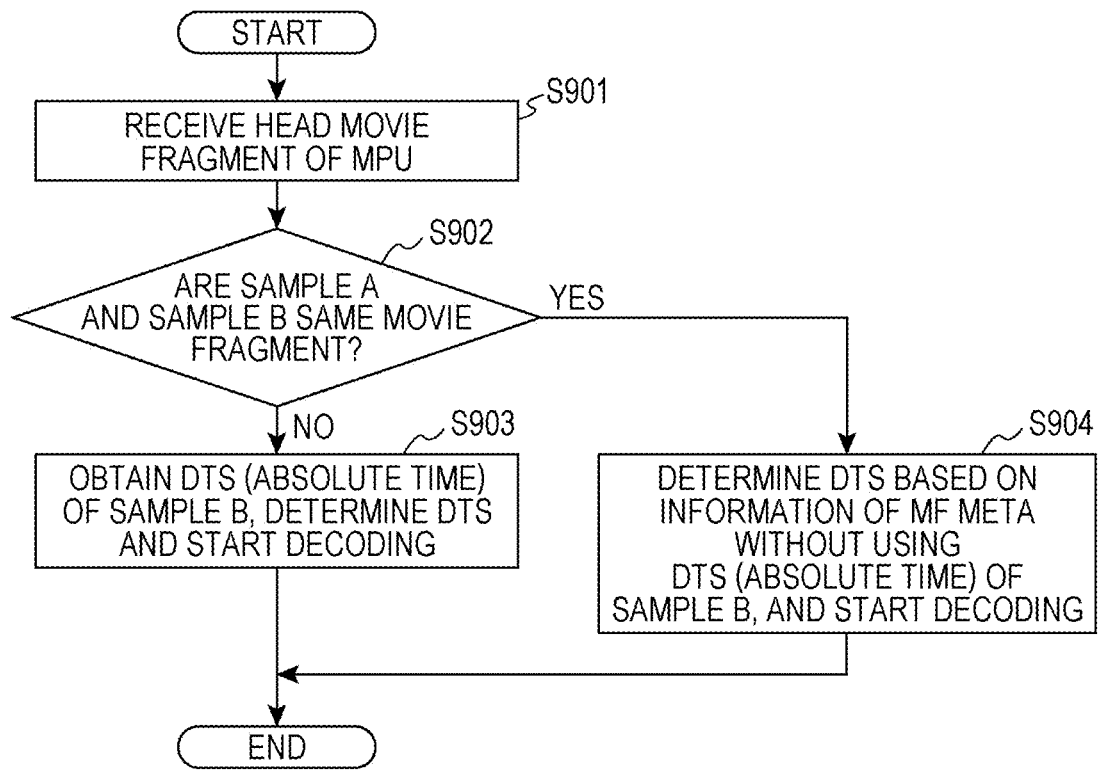
FIG. 47 is a flowchart of a receiving operation in a case where a DTS is calculated by using DTS calculation information.

Receiving device 20 calculates a DTS (absolute value) of sample B by using such information. FIG. 47 is a flowchart of a receiving operation when a DTS is calculated by using such information.

Receiving device 20 receives a head movie fragment of an MPU (S901), and determines whether or not sample A and sample B are stored in the same movie fragment (S902). When sample A and sample B are stored in the same movie fragment (Yes in S902), receiving device 20 calculates a DTS by using information of an MF meta without using the DTS (absolute time) of sample B, and starts decoding (S904). In addition, in step S904, receiving device 20 may determine a DTS by using the DTS of sample B.

Meanwhile, when sample A and sample B are not stored in the same movie fragment in step S902 (No in S902), receiving device 20 obtains the DTS (absolute time) of sample B, determines the DTS and starts decoding (S903).

In addition, an example where an absolute value of a decoding time of each sample and an absolute time of a presentation time are calculated by using an MF meta (time stamp information stored in moof of an MP4 format) according to MMT standards is described above. However, an MF meta may be replaced with arbitrary control information which can be used to calculate an absolute value of a decoding time of each sample and an absolute value of a presentation time to carry out the calculation. Such control information includes, for example, control information in which relative values CT(i) of decoding times of the ith sample and the (i+1)th sample are replaced with relative values of presentation times of the ith sample and the (i+1)th sample, and control information including both of relative values CT(i) of decoding times of the ith sample and (i+1)th sample, and relative values of presentation times of the ith sample and the (i+1)th sample.

[Complement]

Figure 48:
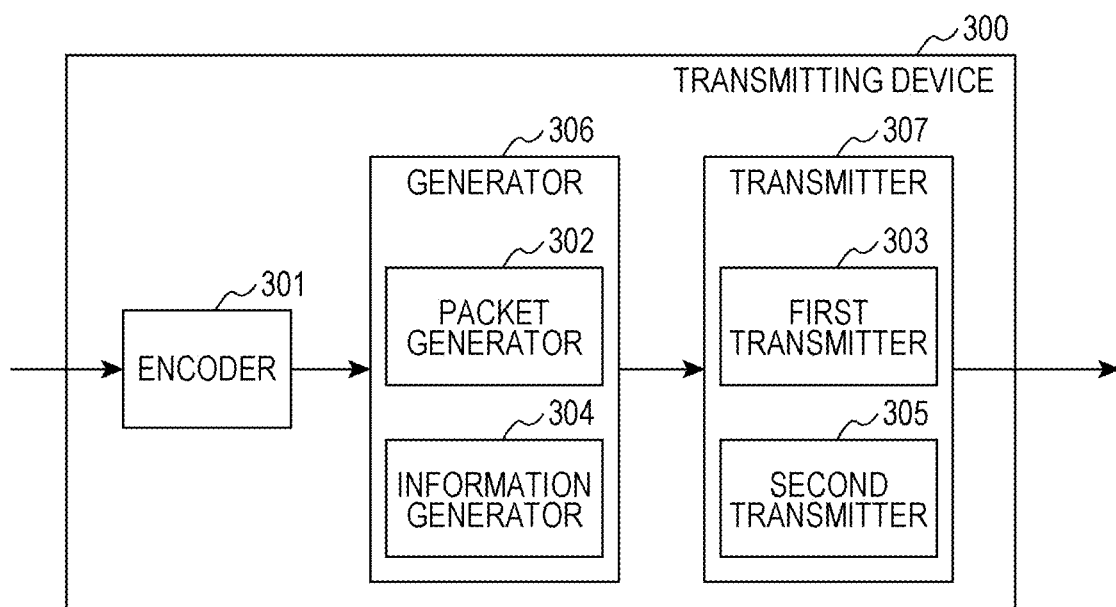
FIG. 48 is a view illustrating another example of a configuration of the transmitting device.

The transmitting device which transmits, as control information, a DTS (absolute value) of sample B and information for enabling the reception side to calculate the DTS (absolute value) of sample B can also be configured as illustrated in FIG. 48. FIG. 48 is a view illustrating another example of a configuration of the transmitting device.

Transmitting device 300 includes encoder 301, packet generator 302, first transmitter 303, information generator 304 and second transmitter 305. In addition, as illustrated in FIG. 48, packet generator 302 and information generator 304 may be realized as one generator 306, and first transmitter 303 and second transmitter 305 may be realized as one transmitter 307.

Encoder 301 encodes a video signal, and generates encoded data including a plurality of access units.

Packet generator 302 stores a plurality of access units in a packet in a unit that defines one access unit as one unit or in a unit defined by dividing one access unit, and generates a packet group.

First transmitter 303 transmits the generated packet group as data.

Information generator 304 generates first information which indicates a presentation time of an access unit which is presented first among a plurality of access units, and second information which is used to calculate decoding times of a plurality of access units. In this regard, the first information is, for example, an MPU time stamp descriptor, and the second information is, for example, auxiliary information such as time stamp information of MF meta data (or information whose part of time stamp information has been corrected).

Second transmitter 305 transmits the generated first information and second information as control information.

Figure 49:
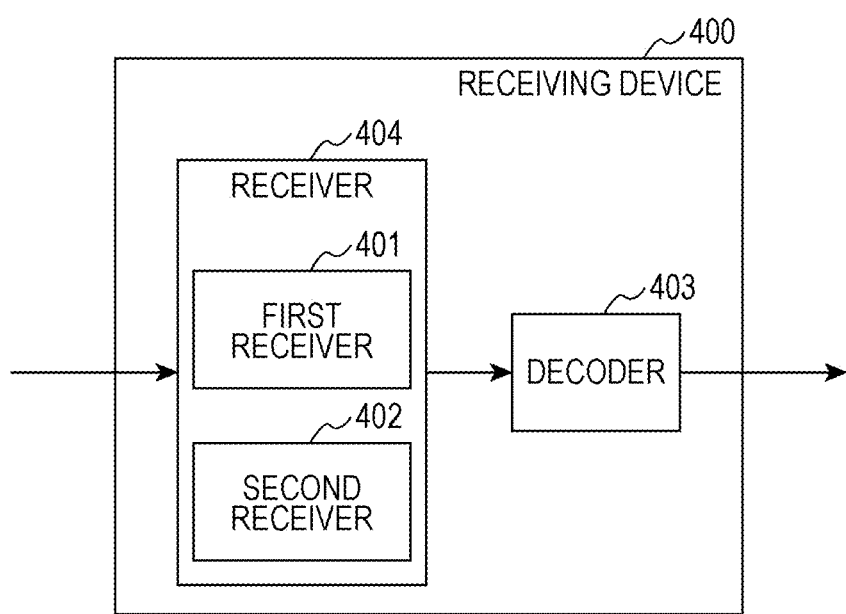
FIG. 49 is a view illustrating another example of a configuration of the receiving device.

Further, the receiving device which supports transmitting device 300 may be configured as illustrated in, for example, FIG. 49. FIG. 49 is a view illustrating another example of a configuration of the receiving device.

Receiving device 400 includes first receiver 401, second receiver 402 and decoder 403. In addition, as illustrated in FIG. 49, first receiver 401 and second receiver 402 may be realized as one receiver 404.

First receiver 401 receives a packet group which is obtained by packetizing encoded data including a plurality of access units in a unit that defines one access unit as one unit or in a unit defined by dividing one access unit.

Second receiver 402 receives control information including first information which indicates a presentation time of an access unit which is presented first among a plurality of access units, and second information which is used to calculate decoding times of a plurality of access units.

Decoder 403 decodes access units included in the received packet group based on the first information and the second information.

Other Exemplary Embodiments

The transmitting device, the receiving device, the transmitting method and the receiving method according to one or a plurality of exemplary embodiments of the present disclosure have been described above based on the exemplary embodiments. However, the present disclosure is not limited to these exemplary embodiments.

Further, each processor included in the transmitting device and the receiving device according to the exemplary embodiment is typically realized as an LSI which is an integrated circuit including an input terminal and an output terminal. These circuits may be individually realized as one chip or may be realized as one chip including part or all of the circuits.

Further, each processor to be realized as an integrated circuit is not limited to an LSI, and each processor may be realized as a dedicated circuit or a general-purpose processor. An FPGA (Field Programmable Gate Array) which can be programmed after an LSI is manufactured or a reconfigurable processor which can reconfigure connection or a setting of circuit cells inside the LSI may be used.

In each of the above exemplary embodiments, each component may be configured by dedicated hardware or may be realized by executing a software program suitable to each component. Each component may be realized by causing a program executing unit such as a CPU or a processor to read a software program recorded on a recording medium such as a hard disk or a semiconductor memory and execute the software program.

In other words, the transmitting device and the receiving device each include a processing circuit (processing circuitry), and a storage device (storage) which is electrically connected to the processing circuit (is accessible from the control circuit). The processing circuit includes at least one of dedicated hardware and the program executing unit. Further, when the processing circuit includes the program executing unit, the storage device stores a software program which is executed by the program executing unit. The processing circuit executes the transmitting method and the receiving method according to the exemplary embodiments by using the storage device.

Further, the present disclosure may be the software program or may be a non-transitory computer-readable recording medium on which the program is recorded. Furthermore, naturally, the program can be distributed via a transmission medium such as the Internet.

Still further, all numbers used above are exemplary numbers to specifically describe the present disclosure, and the present disclosure is not limited to the illustrated numbers.

Moreover, division of a functional block in each block diagram is an example, and a plurality of functional blocks may be realized as one functional block, one functional block may be divided into a plurality of functional blocks or part of functions may be transferred to other functional blocks. Besides, single hardware or software may process functions of a plurality of functional blocks including similar functions in parallel or by way of time division.

Further, an order to execute the steps included in the above transmitting method or receiving method is an exemplary order for specifically describing the present disclosure, and may be other than the above order. Furthermore, part of the above steps may be executed at the same time as those of (in parallel to) other steps.

The transmitting device, the receiving device, the transmitting method and the receiving method according to one or a plurality of exemplary embodiments of the present disclosure have been described above based on the exemplary embodiments. However, the present disclosure is not limited to these exemplary embodiments. The scope of one or a plurality of exemplary embodiments of the present disclosure may include exemplary embodiments obtained by applying, to the present exemplary embodiments, various deformations one of ordinary skill in the art conceives, and exemplary embodiments obtained by combining the components according to the different exemplary embodiments without departing from the spirit of the present disclosure.

The present disclosure is applicable to devices and equipment which transport media such as video data and audio data.

What is claimed is:

1. A transmitting method comprising:
dividing an access unit into slice segments or tiles, encoding the slice segments or the tiles, and storing at least one of the encoded slice segments or at least one of the encoded tiles in a network abstraction layer (NAL) unit, the access unit being an image included in a video signal;
storing the NAL unit in a data unit;
storing, in a NAL unit different from the NAL unit in which the video signal is stored, a parameter set for encoding the video signal;
storing the data unit in a packet, in units of one data unit, in units of a plurality of data units including the data unit, or in units of portions into which the data unit is divided, and generating a packet group, the packet in which the data unit is stored being different from a packet in which a data unit including the parameter set is stored;
transmitting the generated packet group as data;
generating control information, the control information including presentation time information of a first access unit, and information used to calculate a decoding time of the plurality of access units; and
transmitting the control information,
wherein the control information is stored and transmitted in a payload of a different packet, the different packet including a header and the payload and the different packet including the payload being different from a packet in which the data is stored.

2. A receiving method comprising:
receiving a packet group, the packet group being obtained by dividing an access unit into slice segments or tiles, encoding the slice segments or the tiles, storing at least one of the encoded slice segments or at least one of the encoded tiles in a network abstraction layer (NAL) unit wherein the access unit is an image included in a video signal, storing the NAL unit in a data unit, and storing in a NAL unit different from the NAL unit in which the video signal is stored, a parameter set for encoding the video signal;
receiving control information, the control information including presentation time information of a first access unit, and information used to calculate a decoding time of the plurality of access units; and
decoding the access units included in the received packet group based on the control information,
wherein the control information is stored and transmitted in a payload of a different packet, the different packet including a header and the payload and the different packet including the payload being different from a packet in which the data is stored, and
the data unit is stored in a packet, in units of one data unit, in units of a plurality of data units including the data unit, or in units of portions into which the data unit is divided, the packet in which the data unit is stored being different from a packet in which a data unit including the parameter set is stored.

3. A transmitting device comprising:
encoding circuitry which, in operation, divides an access unit into slice segments or tiles, encodes the slice segments or the tiles, and stores a least one of the encoded slice segments or at least one of the encoded tiles in a network abstraction layer (NAL) unit, the access unit being an image included in a video signal;

packet generating circuitry which, in operation, 1) stores the NAL unit in a data unit, 2) stores in an NAL unit different from the NAL unit in which the video signal is stored, a parameter set for encoding the video signal, and 3) stores the data unit in a packet, in units of one data unit, in units of a plurality of data units including the data unit, or in units of portions into which the data unit is divided, the packet in which the data unit is stored being different from a packet in which a data unit including the parameter set is stored;

first transmitting circuitry which, in operation, transmits the generated packet group as data;

information generating circuitry which, in operation, generates control information, the control information including presentation time information of a first access unit, and the information used to calculate a decoding time of the plurality of access units; and second transmitting circuitry which, in operation, transmits the control information, wherein the control information is stored and transmitted in a payload of a different packet, the different packet including a header and the payload and the different packet including the payload being different from a packet in which the data is stored.

4. A receiving device comprising:

first receiving circuitry which, in operation, receives a packet group, the packet group being obtained by dividing an access unit into slice segments or tiles, encoding the slice segments or the tiles, storing at least one of the encoded slice segments or at least one of the encoded tiles in a network abstraction layer (NAL) unit wherein the access unit is an image included in a video signal, storing the NAL unit in a data unit, and storing in an NAL unit different from the NAL unit in which the video signal is stored, a parameter set for encoding the video signal;

second receiving circuitry which, in operation, receives control information, the control information including presentation time information of a first access unit, and information used to calculate a decoding time of the plurality of access units; and decoding circuitry which, in operation, decodes the access units included in the received packet group based on the control information, wherein the control information is stored and transmitted in a payload of a different packet, the different packet including a header and the payload and the different packet including the payload being different from a packet in which the data is stored, and the data unit is stored in a packet, in units of one data unit, in units of a plurality of data units including the data unit, or in units of portions into which the data unit is divided, the packet in which the data unit is stored being different from a packet in which a data unit including the parameter set is stored.

* * * * *